Sept. 4, 1951 A. W. MILLS ET AL 2,566,952

COMBINED TYPEWRITER RECORDING AND COMPUTING MACHINE OF THE RECORD CONTROLLED TYPE

Filed March 26, 1949 34 Sheets-Sheet 1

INVENTORS
ALBERT W. MILLS
FRANK J. FURMAN
HAROLD L. READ

BY A. W. Lowenitzer
ATTORNEY

INVENTORS
ALBERT W. MILLS
FRANK J. FURMAN
HAROLD L. READ
BY
G. W. Lowenitzer
ATTORNEY Sept. 4, 1951 A. W. MILLS ET AL 2,566,952

COMBINED TYPEWRITER RECORDING AND COMPUTING MACHINE OF THE RECORD CONTROLLED TYPE

Filed March 26, 1949 34 Sheets-Sheet 3

INVENTORS
ALBERT W. MILLS
FRANK J. FURMAN
HAROLD L. READ

BY J. W. Lowenitzer
ATTORNEY

Sept. 4, 1951 A. W. MILLS ET AL 2,566,952

COMBINED TYPEWRITER RECORDING AND COMPUTING MACHINE OF THE RECORD CONTROLLED TYPE

Filed March 26, 1949 34 Sheets-Sheet 4

INVENTORS
ALBERT W. MILLS
FRANK J. FURMAN
HAROLD L. READ

BY J. W. Lounitzel
ATTORNEY

Sept. 4, 1951 A. W. MILLS ET AL 2,566,952

COMBINED TYPEWRITER RECORDING AND COMPUTING MACHINE OF THE RECORD CONTROLLED TYPE

Filed March 26, 1949 34 Sheets-Sheet 5

INVENTORS
ALBERT W. MILLS
FRANK J. FURMAN
HAROLD L. READ
BY F. W. Lorimitzer
ATTORNEY Sept. 4, 1951 A. W. MILLS ET AL 2,566,952

COMBINED TYPEWRITER RECORDING AND COMPUTING MACHINE OF THE RECORD CONTROLLED TYPE

Filed March 26, 1949 34 Sheets-Sheet 6

INVENTORS
ALBERT W. MILLS
FRANK J. FURMAN
HAROLD L. READ
BY J. W. Lowrutzel
ATTORNEY Sept. 4, 1951 A. W. MILLS ET AL 2,566,952

COMBINED TYPEWRITER RECORDING AND COMPUTING MACHINE OF THE RECORD CONTROLLED TYPE

Filed March 26, 1949 34 Sheets-Sheet 7

INVENTORS
ALBERT W. MILLS
FRANK J. FURMAN
HAROLD L. READ

BY J. W. Lorenitzer
ATTORNEY

Sept. 4, 1951 A. W. MILLS ET AL 2,566,952

COMBINED TYPEWRITER RECORDING AND COMPUTING MACHINE OF THE RECORD CONTROLLED TYPE

Filed March 26, 1949 34 Sheets-Sheet 8

INVENTORS
ALBERT W. MILLS
FRANK J. FURMAN
HAROLD L. READ
BY J. W. Lowinitzke
ATTORNEY Sept. 4, 1951 A. W. MILLS ET AL 2,566,952

COMBINED TYPEWRITER RECORDING AND COMPUTING MACHINE OF THE RECORD CONTROLLED TYPE

Filed March 26, 1949 34 Sheets-Sheet 9

INVENTORS
ALBERT W. MILLS
FRANK J. FURMAN
HAROLD L. READ

BY F. W. Lorenitzer
ATTORNEY

Sept. 4, 1951 A. W. MILLS ET AL 2,566,952

COMBINED TYPEWRITER RECORDING AND COMPUTING MACHINE OF THE RECORD CONTROLLED TYPE

Filed March 26, 1949 34 Sheets-Sheet 10

INVENTORS
ALBERT W. MILLS
FRANK J. FURMAN
HAROLD L. READ

BY G. W. Lorentzen
ATTORNEY

Sept. 4, 1951 A. W. MILLS ET AL 2,566,952

COMBINED TYPEWRITER RECORDING AND COMPUTING MACHINE OF THE RECORD CONTROLLED TYPE

Filed March 26, 1949 34 Sheets-Sheet 11

INVENTORS
ALBERT W. MILLS
FRANK J. FURMAN
HAROLD L. READ

BY J. W. Lounitzer
ATTORNEY

INVENTORS
ALBERT W. MILLS
FRANK J. FURMAN
HAROLD L. READ
BY
J. W. Lounutzh
ATTORNEY INVENTORS
ALBERT W. MILLS
FRANK J. FURMAN
HAROLD L. READ
BY
F. W. Lowinske
ATTORNEY INVENTORS
ALBERT W. MILLS
FRANK J. FURMAN
HAROLD L. READ
BY G. W. Lorenitzer
ATTORNEY Sept. 4, 1951 A. W. MILLS ET AL 2,566,952

COMBINED TYPEWRITER RECORDING AND COMPUTING MACHINE OF THE RECORD CONTROLLED TYPE

Filed March 26, 1949 34 Sheets-Sheet 15

INVENTORS
ALBERT W. MILLS
FRANK J. FURMAN
HAROLD L. READ
BY F. W. Lonnitzer
ATTORNEY Sept. 4, 1951 A. W. MILLS ET AL 2,566,952

COMBINED TYPEWRITER RECORDING AND COMPUTING MACHINE OF THE RECORD CONTROLLED TYPE

Filed March 26, 1949 34 Sheets-Sheet 16

INVENTORS
ALBERT W. MILLS
FRANK J. FURMAN
HAROLD L. READ

BY F. W. Lonnitzer
ATTORNEY

INVENTORS
ALBERT W. MILLS
FRANK J. FURMAN
HAROLD L. READ
BY F. W. Lowenitzer
ATTORNEY

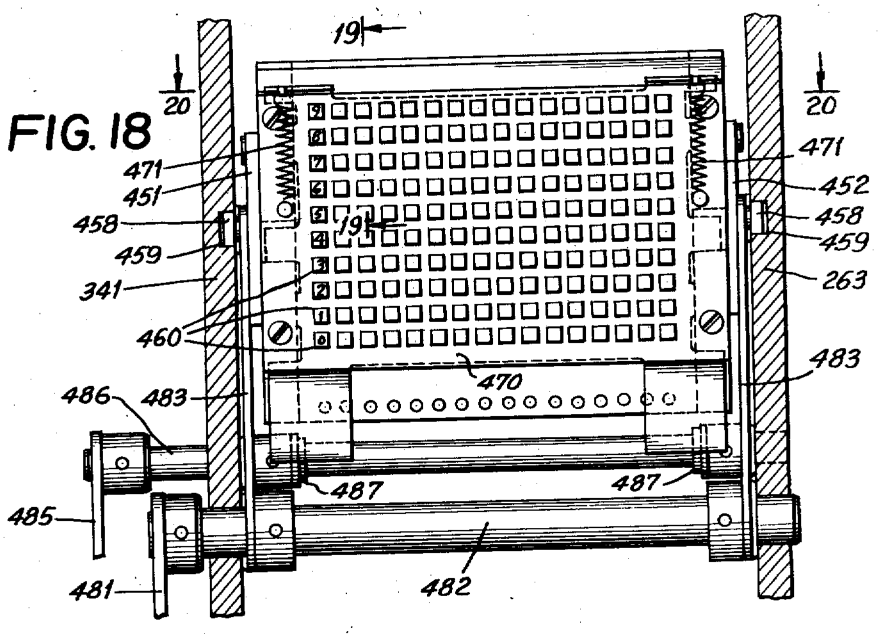
FIG. 18
FIG. 19
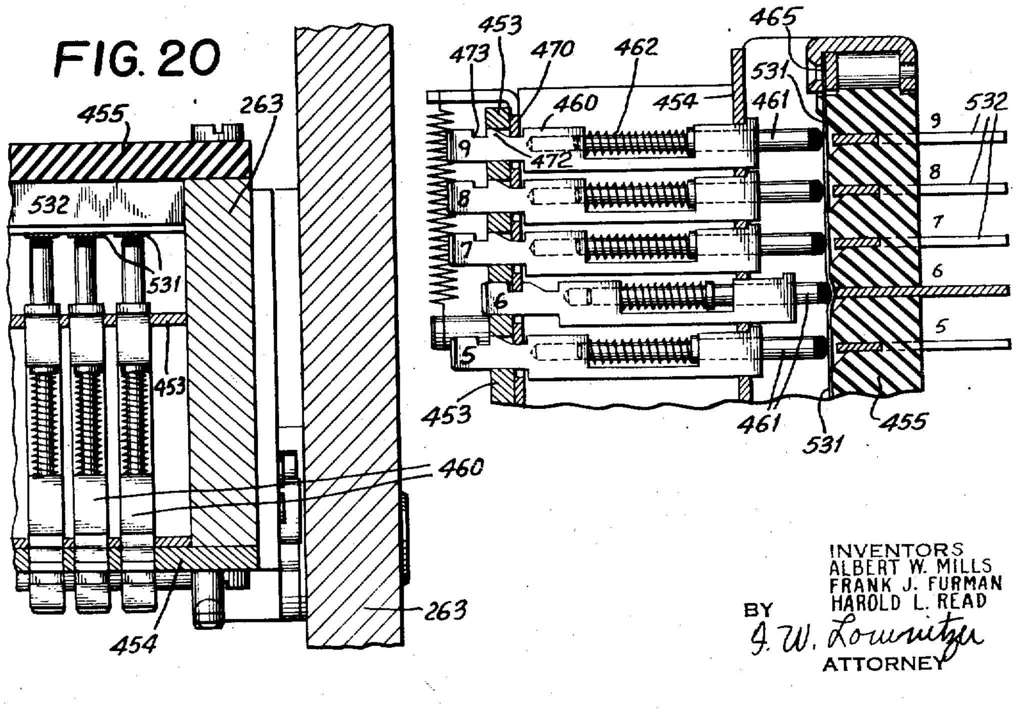
FIG. 20
INVENTORS
ALBERT W. MILLS
FRANK J. FURMAN
HAROLD L. READ
BY J. W. Lowuitzer
ATTORNEY INVENTORS
ALBERT W. MILLS
FRANK J. FURMAN
HAROLD L. READ
BY I. W. Lowenitz
ATTORNEY Sept. 4, 1951 A. W. MILLS ET AL 2,566,952

COMBINED TYPEWRITER RECORDING AND COMPUTING MACHINE OF THE RECORD CONTROLLED TYPE

Filed March 26, 1949 34 Sheets-Sheet 20

INVENTORS
ALBERT W. MILLS
FRANK J. FURMAN
HAROLD L. READ

BY F. W. Lorenitzer
ATTORNEY

Sept. 4, 1951 A. W. MILLS ET AL 2,566,952

COMBINED TYPEWRITER RECORDING AND COMPUTING MACHINE OF THE RECORD CONTROLLED TYPE

Filed March 26, 1949 34 Sheets-Sheet 21

INVENTORS
ALBERT W. MILLS
FRANK J. FURMAN
HAROLD L. READ
BY A. W. Rommitzer
ATTORNEY INVENTORS
ALBERT W. MILLS
FRANK J. FURMAN
HAROLD L. READ
BY
F. W. Lowenitzle
ATTORNEY INVENTORS
ALBERT W. MILLS
FRANK J. FURMAN
HAROLD L. READ
BY G. W. Lowinger
ATTORNEY INVENTORS
ALBERT W. MILLS
FRANK J. FURMAN
HAROLD L. READ
BY F. W. Lonuitzer
ATTORNEY Sept. 4, 1951 A. W. MILLS ET AL 2,566,952

COMBINED TYPEWRITER RECORDING AND COMPUTING MACHINE OF THE RECORD CONTROLLED TYPE

Filed March 26, 1949 34 Sheets-Sheet 25

INVENTORS
ALBERT W. MILLS
FRANK J. FURMAN
HAROLD L. READ
BY
F. W. Lorenitzer
ATTORNEY Sept. 4, 1951 A. W. MILLS ET AL 2,566,952

COMBINED TYPEWRITER RECORDING AND COMPUTING MACHINE OF THE RECORD CONTROLLED TYPE

Filed March 26, 1949 34 Sheets-Sheet 26

INVENTORS
ALBERT W. MILLS
FRANK J. FURMAN
HAROLD L. READ

BY J. W. Lomnitzer
ATTORNEY

INVENTORS
ALBERT W. MILLS
FRANK J. FURMAN
HAROLD L. READ
BY F. W. Lorenitzer
ATTORNEY INVENTORS
ALBERT W. MILLS
FRANK J. FURMAN
HAROLD L. READ
BY
F. W. Lorenitzer
ATTORNEY INVENTORS
ALBERT W. MILLS
FRANK J. FURMAN
HAROLD L. READ
BY
A. W. Lowenitzer
ATTORNEY INVENTORS
ALBERT W. MILLS
FRANK J. FURMAN
HAROLD L. READ
BY
F. W. Komnitzer
ATTORNEY INVENTORS
ALBERT W. MILLS
FRANK J. FURMAN
HAROLD L. READ
BY F. W. Lounitzer
ATTORNEY INVENTORS
ALBERT W. MILLS
FRANK J. FURMAN
HAROLD L. READ
BY
F. W. Louwitzer
ATTORNEY Sept. 4, 1951 A. W. MILLS ET AL 2,566,952

COMBINED TYPEWRITER RECORDING AND COMPUTING MACHINE OF THE RECORD CONTROLLED TYPE

Filed March 26, 1949 34 Sheets-Sheet 33

INVENTORS
ALBERT W. MILLS
FRANK J. FURMAN
HAROLD L. READ
BY F. W. Lonnitzer
ATTORNEY Sept. 4, 1951    A. W. MILLS ET AL    2,566,952

COMBINED TYPEWRITER RECORDING AND COMPUTING MACHINE OF THE RECORD CONTROLLED TYPE

Filed March 26, 1949    34 Sheets-Sheet 34

INVENTORS
ALBERT W. MILLS
FRANK J. FURMAN
HAROLD L. READ

BY F. W. Lonnitzer
ATTORNEY

Patented Sept. 4, 1951 2,566,952

UNITED STATES PATENT OFFICE 2,566,952

COMBINED TYPEWRITER RECORDING AND COMPUTING MACHINE OF THE RECORD CONTROLLED TYPE

Albert W. Mills, Bradenton, Fla., and Frank J. Furman and Harold L. Read, Endicott, N. Y., assignors to International Business Machines Corporation, New York, N. Y., a corporation of New York Application March 26, 1949, Serial No. 83,742

16 Claims. (Cl. 235—61.6)

This invention relates to accounting machines and more particularly to the type controlled by perforated records.

The principal object of the invention is to devise a new combinational arrangement of card reading, accumulating, and printing units required in accounting machines of the record controlled type which will give all the needed results and flexibility but at the same time provide a relatively less expensive form of machine. This reduction in manufacturing costs is attained by the invention in a manner which provides all the basic functions and results of a satisfactory and useful record controlled accounting machine, and thus answers the needs of offices where the costs of the present machines are prohibitive.

The principal object of the invention is attained primarily by utilizing a power operated typewriter of a well known commercial design for the printing or recording functions and incorporating an accumulating unit with sufficient accumulating capacity of a much less expensive design, and embodying a perforated card reader of a relatively new and different type for record controlled machines which steps the card in such manner so as to sense or read a perforated card column by column. As is customary in machines having the automatic group control feature the card reader is provided with two reading stations, one of which is a printing and accumulating control station, and the other a control station when the group control function is utilized.

Much of the reduction in costs over previous machines is obtained by embodying a typewriter of a well known commercial design for recording functions. These recording functions are typing numerical data, typing alphabetical data, and typing the digits of the total. To this end there is provided a series of so-called code analysis relays which are selectively energized according to the perforations read in each column and for totals according to the digit representation on an accumulator, and further means under control of such relays to energize the typewriter digit key operating solenoids to thus type the desired digits on a sheet in the typewriter. The code analysis relays represent not only numerical data to be typed by energizing the numeral typewriter key operating solenoids, but according to well known alphabetical representing code perforations may represent alphabetical data to thus translate by the code of relays energized the alphabet type bar operating solenoids so as to type, at desired places on the typewriter sheet, alphabetical data, punctuation marks, symbols, or the like. It is obvious that by such an arrangement the typewriter fulfills the necessity of typing numerical data, alphabetical data and total results, as is required in the present commercial record controlled accounting machines.

A further object of the invention relating to the use of the typewriter for recording is to provide selective means which may be under control of a card perforation, a column readout device of the typewriter, the card reader, or the automatic group control device, to call at will the typewriter into operation to effect the desired result typing operations.

In connection with the card reader, a novel design of the card reader enables the independent feeding of the card from the supply magazine by engagement of the downwardly moved picker knives with the top longitudinal edge of the card to continuously rotating rolls which convey the card to a so-called "pusher station." The independent feed from the magazine gives sufficient time to get the card to the pusher station. Further feeding means in the form of conventional feed rolls, operating independently of the card picker operating means convey the card from the pusher station to the two card reading stations, successively. The step-by-step feed of the card is effected by an electromechanically controlled clutch which drives the feed rolls to feed the card column by column so that sensing pins may read the columns successively. The means for positioning the sensing pins and the means to press feed rolls together are tied together so that the sensing pins are moved away from the card surface as the rolls are pressed together to feed the card a column.

The use of the mentioned electromechanically controlled clutch enables the clutch to be engaged automatically to space the card column by column, with a positioning of the sensing pins into the perforations after each column space of the card.

In connection with the card reader, the above novel design includes suitable electrical controls whereby the card to be read is spaced column by column or by continuous engagement of the electromechanically controlled clutch the sensing pins are held out of contact with the card and the card is fed uninterruptedly. This feature is known as the "skip feature" of the machine and saves considerable time in the operation of the machine when blank or certain perforated columns are not to be read and thus omitted.

Another feature of the invention, which is particularly concerned with the selective and flexible operation of the machine, is to provide means whereby the skipping operation can be called into operation at certain positions of the card and then the card feed operation resumed in such manner that column by column reading will ensue.

A further object of the invention is to so design the card reading and feeding portion of the reading unit so that reading of the card columns occurs with sufficient rapidity and to include coordinating means so that the typewriter and the perforation sensing means will be operated in consonance. Thus, the high speed typing operation is efficiently utilized in the present design.

In connection with the typewriter a further object is to enable certain functional operations, such as tabulate, carriage return, etc., to be called into operation at desired times, thus enabling typing of data to be made at desired portions of the result sheet, and the typewriter conditioned according to the results desired.

It is a further object of the invention to provide a separately actuated accumulating unit callable into operation at desired times. To provide separate classifications of items, the unit includes five totalizers, a common set of operating racks, and an electromechanically controlled accumulator engaging and disengaging mechanism individual to each totalizer. This unit is called into operation by a clutch and by selective control means for the clutch the accumulator unit may be called into operation to accumulate the numerical data at desired column positions of the reader, or typewriter.

A further object of the invention in connection with the means to determine the differential positions of the racks is to provide a plurality of sets of denominationally arranged storage relays which are successively picked up by the code analysis relays to represent a digit according to a combination code, and electrical translating means to convert the reading of the storage relays to a digital equivalent and thus stop the differential position of the operating racks to thereby enter the sensed amount.

In connection with the entering mechanism it is then a further object of the invention to provide storage relays to set up data according to a 4-unit code and to provide associated translator mechanism which will establish the decimal digital positions of operating racks. This enables a considerable reduction in the number of relays.

A further object of the invention is to include in the machine flexible controls whereby, for example, the accumulator unit may be called into operation for an entry cycle at desired positions of the typewriter carriage or reader, suspend in the interim card reading and typing operations while the accumulating function is being performed, and then after the completion of the accumulating cycle of operation again resume card feeding and, if so desired, the listing of data by the typewriter and storage of this data for a later entry.

It is then a further object of the invention to provide selective means which are called into operation at a desired position of the card reader or typewriter for setting up the storage relays, select a desired totalizer, and for effecting addition or subtraction of the amounts set up in the storage relays, and then continue with desired operations.

In some detail, each totalizer comprises a series of digit gear wheels, associated units carry segments and a conventional mechanical units carry mechanism. While, in its basic form it generally resembles the construction utilized in a known commercial form of accounting machine, its principal difference is that the accumulating function, such as addition or subtraction, grand total taking, subtotal taking, etc., may be controlled by electromechanical means called into operation at desired times.

Another object of the invention to provide total taking means which enables either grand totals or subtotals to be taken from the selected accumulators and set up in a total storage readout. By storing the total a cycle of operation of the readout at a desired time can be effected. The readout is read in successive denominational order and picks up the code analysis relays which selectively energize the typewriter solenoids to type, as in listing operations, the digits of the total in succession to represent either a grand total or a subtotal, depending upon the result desired.

A further object of the invention is to include in the machine a zero suppression mechanism of the electrical type which functions commonly for not only listing of numerical data but also in a total typing operation. As is well known in this art this eliminates the typing of zeros at the left of the highest order significant digit and enables the insertion of the desired intermediate zeros.

A still further object of the invention is to selectively place the zero suppression mechanism under a desired program of control so that it may be called into operation as desired.

A further object of the invention is to include in the machine the well known group control detecting means whereby corresponding numerical or alphabetical columns of data of successive cards may be analyzed and upon ascertaining a disagreement thereof desired functions may be called into operation, such as an automatic start of numeral listing, card reading operations, or the total taking mechanism. To further extend the feature of flexibility a control is provided for the group control means so that it may be called into operation, when desired.

It will be noted that in listing the principal features of the invention the arrangement is usually such that desired functions may be called into operation at will. This selective arrangement of the machine may be summarized by stating that, in general, by means of plug connections from a column emitter of the reader, or a column readout of the recording machine, a desired program of operations may be set up by the operator which will call the different units of the machine into operation to carry out their functions. This wide flexibility in the machine will satisfy the needs of different bookkeeping and accounting systems, since it is obvious that according to the exigencies of the situation the machine will have to operate in different ways to get different results.

The preceding enumeration of the objects of the invention are in no sense complete since the outstanding and principal features of the machine have only been listed. There are incidental but nevertheless other relatively important features of the machine pertaining not only to the basic design of each of the units but also to the specific design thereof. It should be understood, therefore, that the enumeration of the preceding objects is not complete. It should be also understood that the present design is merely an illustrative form of the embodiment and should not be considered as restricted. Wide variations may take place in the form and design of the units which nevertheless may come within the spirit and scope of the pending claims.

Other objects of the invention will be pointed out in the following description and illustrated in the accompanying drawings, which disclose, by way of example, the principle of the invention and the best mode, which has been contemplated, of applying that principle.

In said drawings:

Figs. 1 to 8, inclusive, represent the construction of the card reader unit.

Figs. 9 to 20, inclusive, show the construction of the accumulator and total readout unit.

Figure 9:
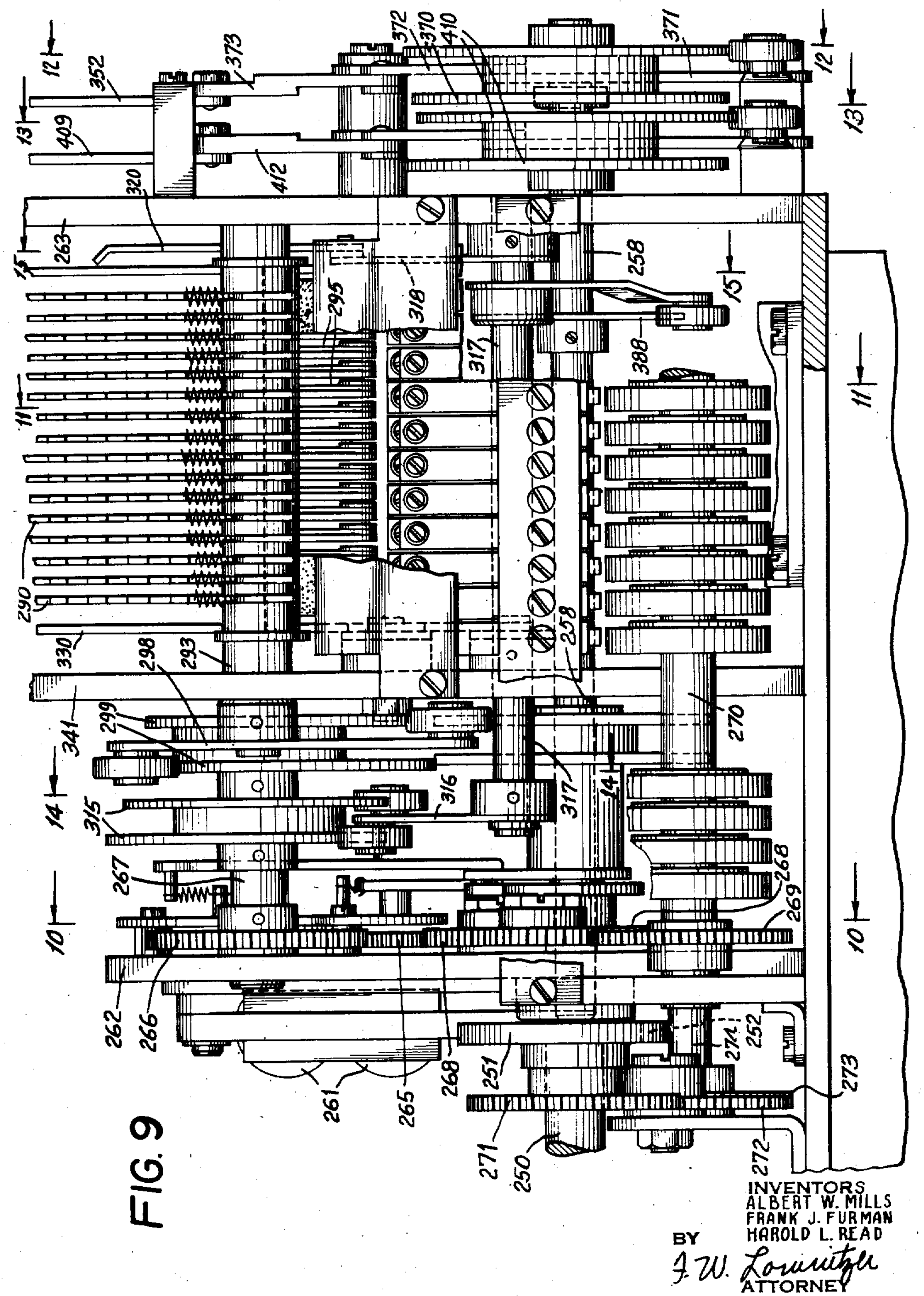

Fig. 9 is a view in side elevation of the accumulator unit mainly showing gear drive connections and the drive shafts of the unit.

Figure 10:
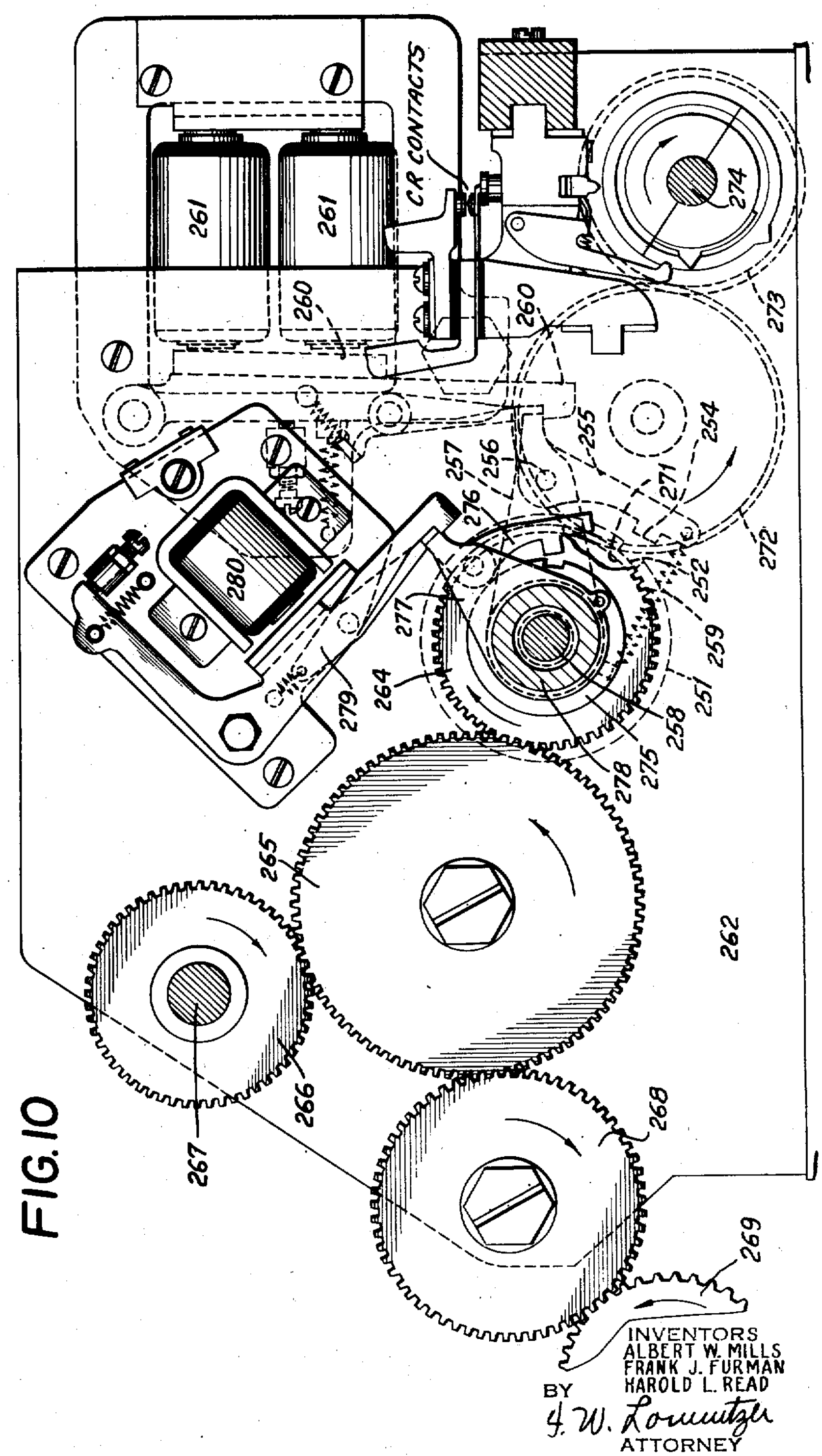

Fig. 10 is a transverse sectional view taken on the line 10—10 of Fig. 9 and shows particularly the gearing and the associated pair of electromagnetically controlled clutches.

Figure 11:
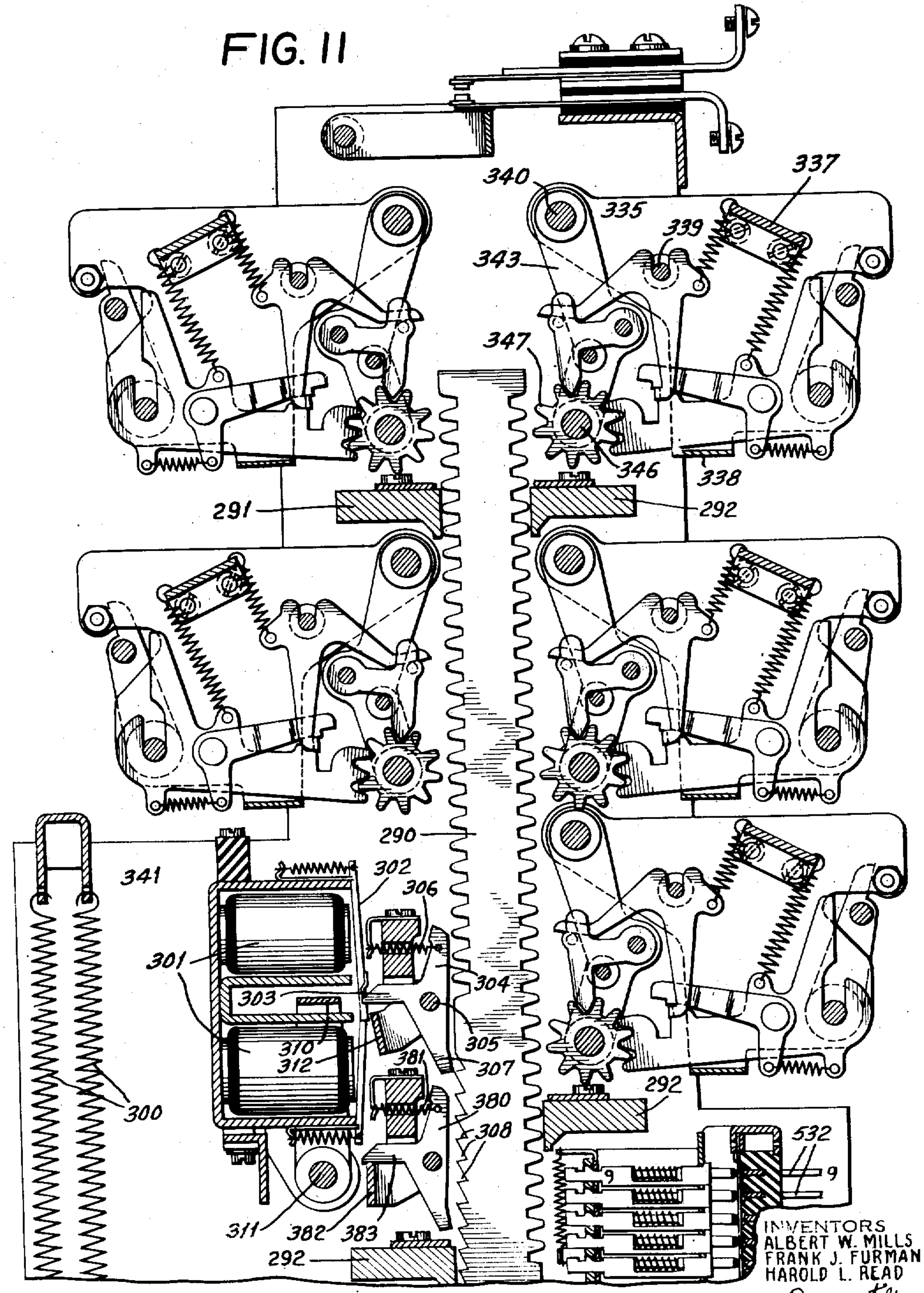
Figure 11A:
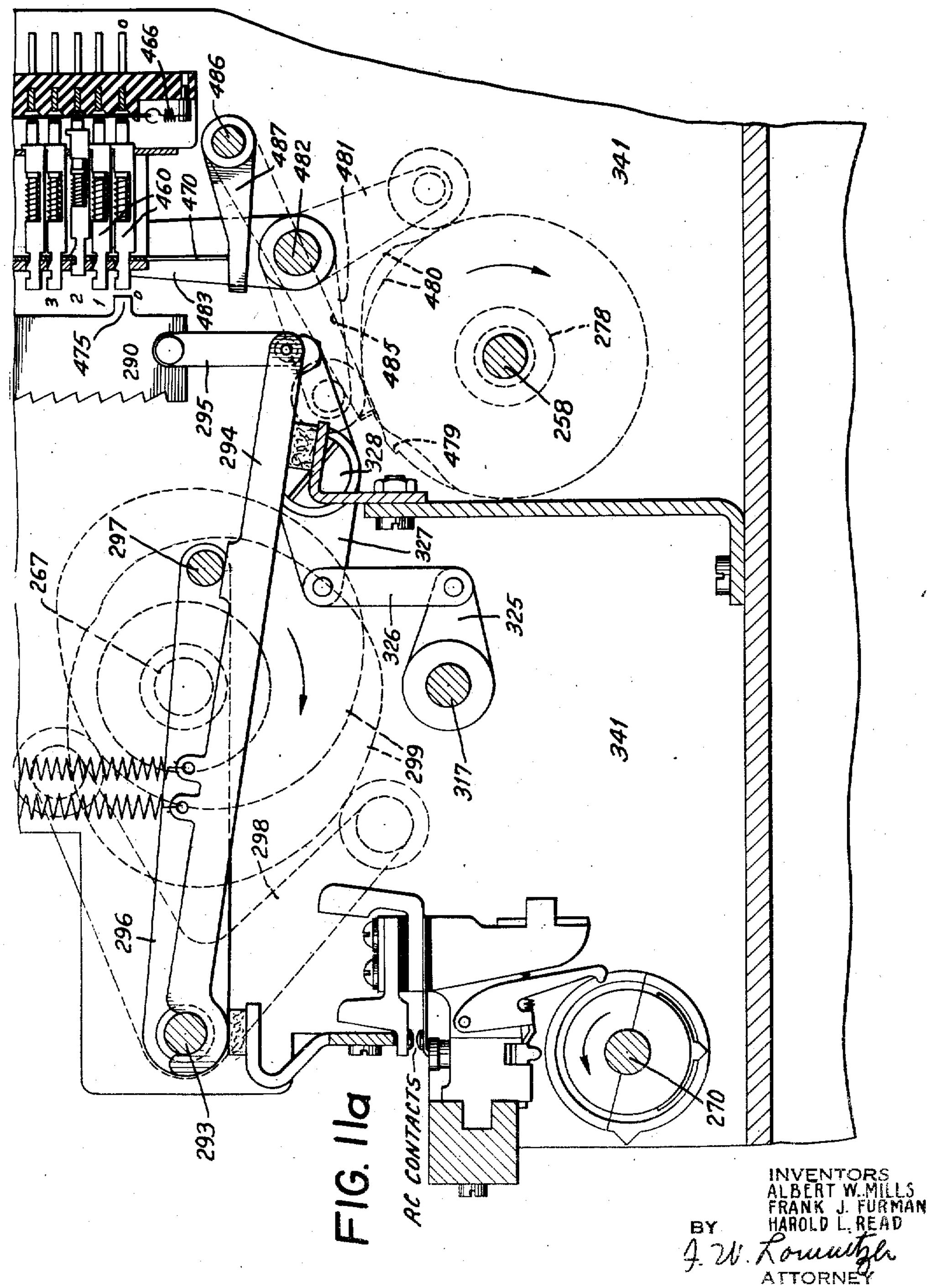

Figs. 11 and 11*a* taken together with Fig. 11 on top represent a transverse sectional view taken on the line 11—11 of Fig. 9 and show mainly the relation of the actuating mechanism and its operating devices with the five accumulators. This view also shows a relationship between the racks and the total readout.

Figure 12:
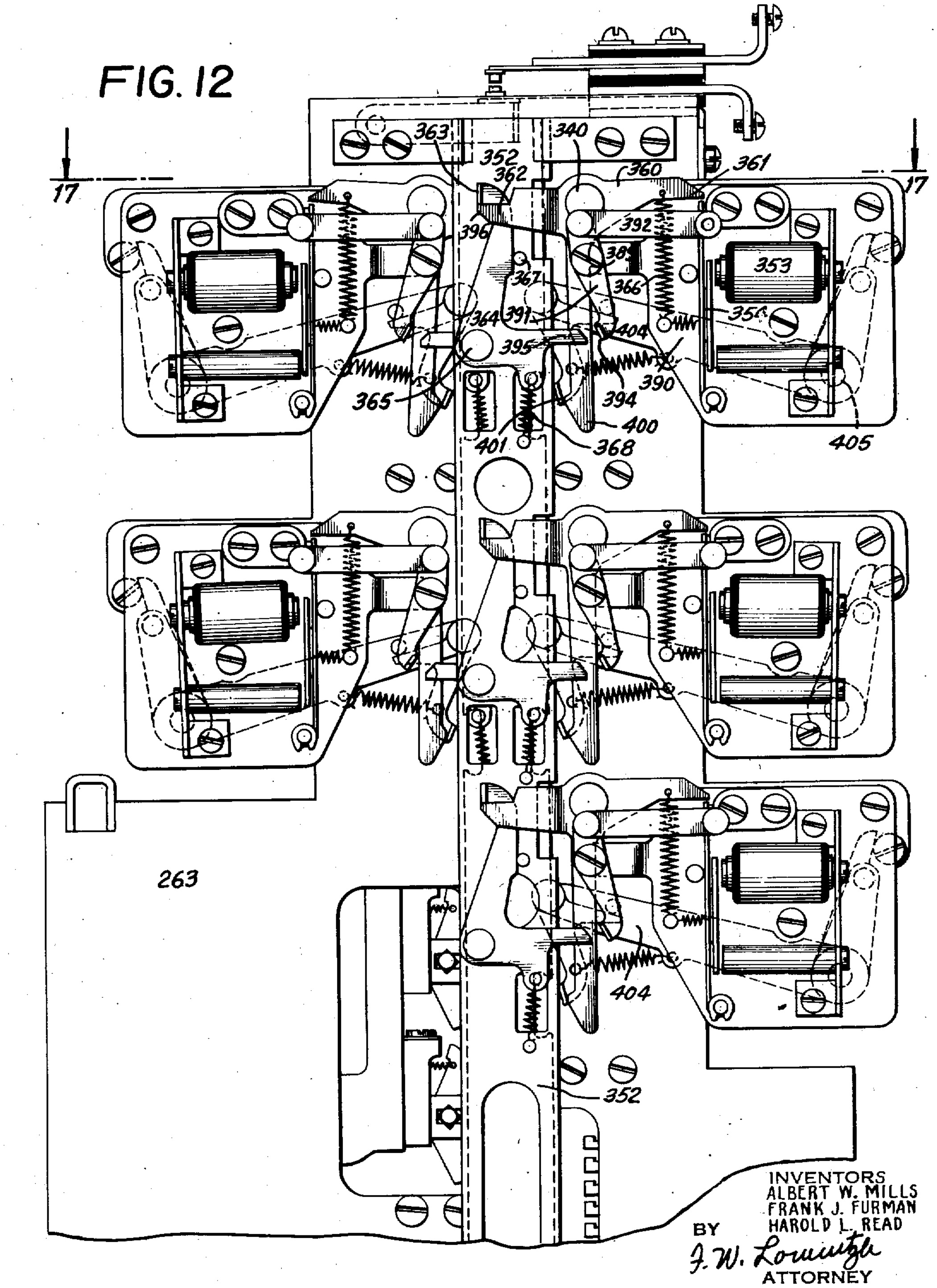
Figure 12A:
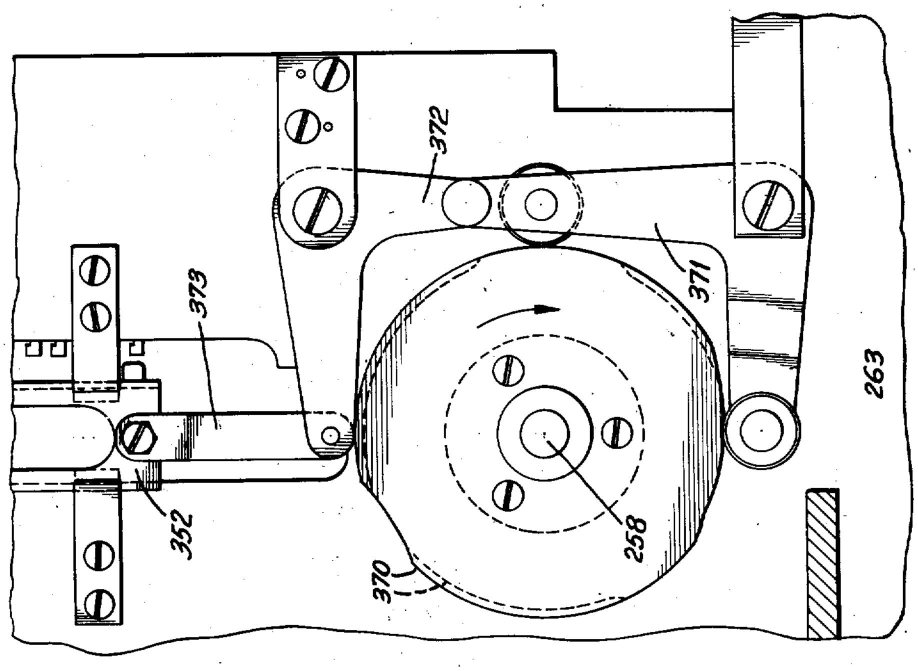

Figs. 12 and 12*a* taken together with Fig. 12 on the top represent an end view taken on the line 12—12 of Fig. 9.

Figure 13:
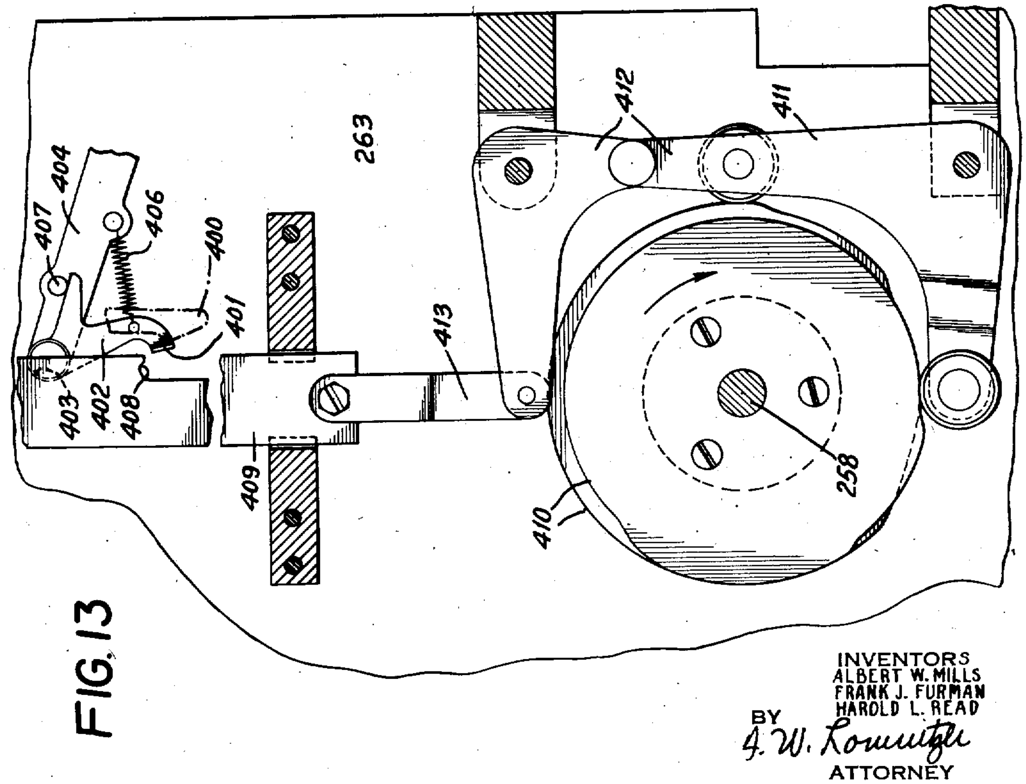

Fig. 13 is a detail sectional view taken on the line 13—13 of Fig. 9.

Figure 14:
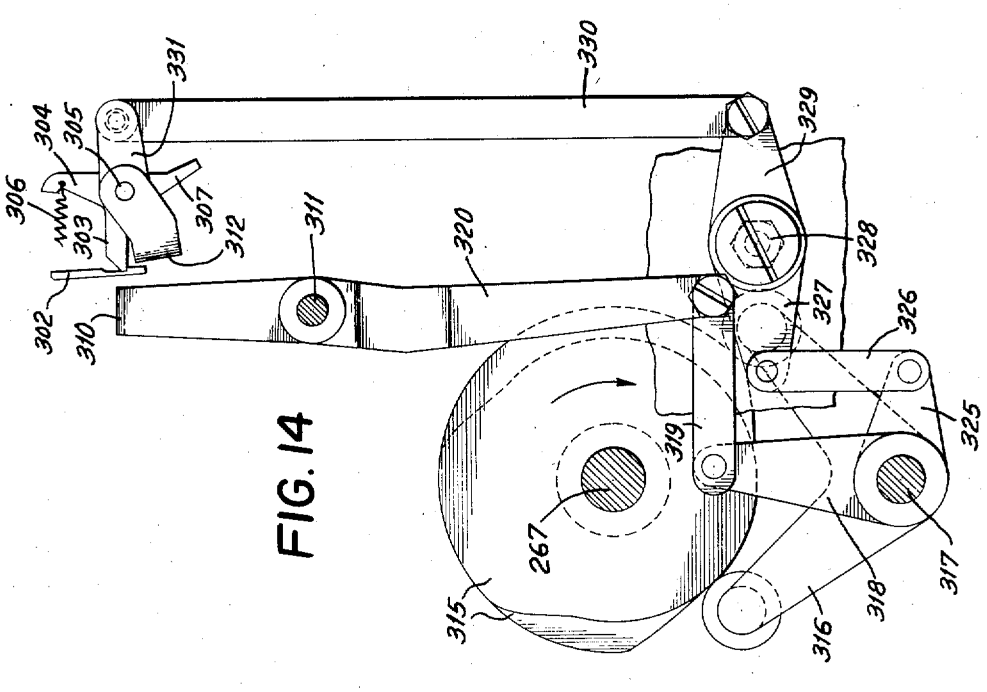

Fig. 14 is a detail sectional view taken on the line 14—14 of Fig. 9.

Figure 15:
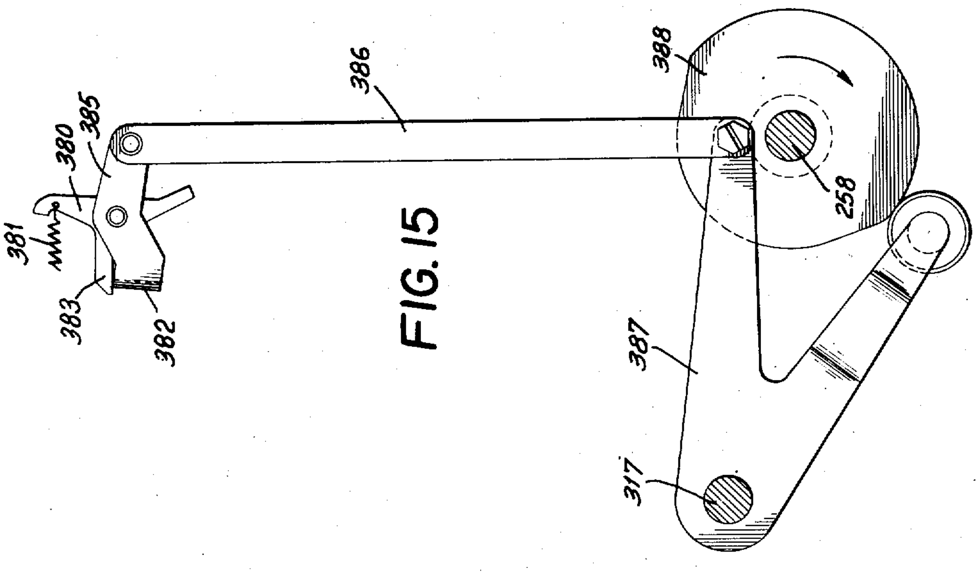

Fig. 15 is a detail sectional view taken on the line 15—15 of Fig. 9.

Figure 16:
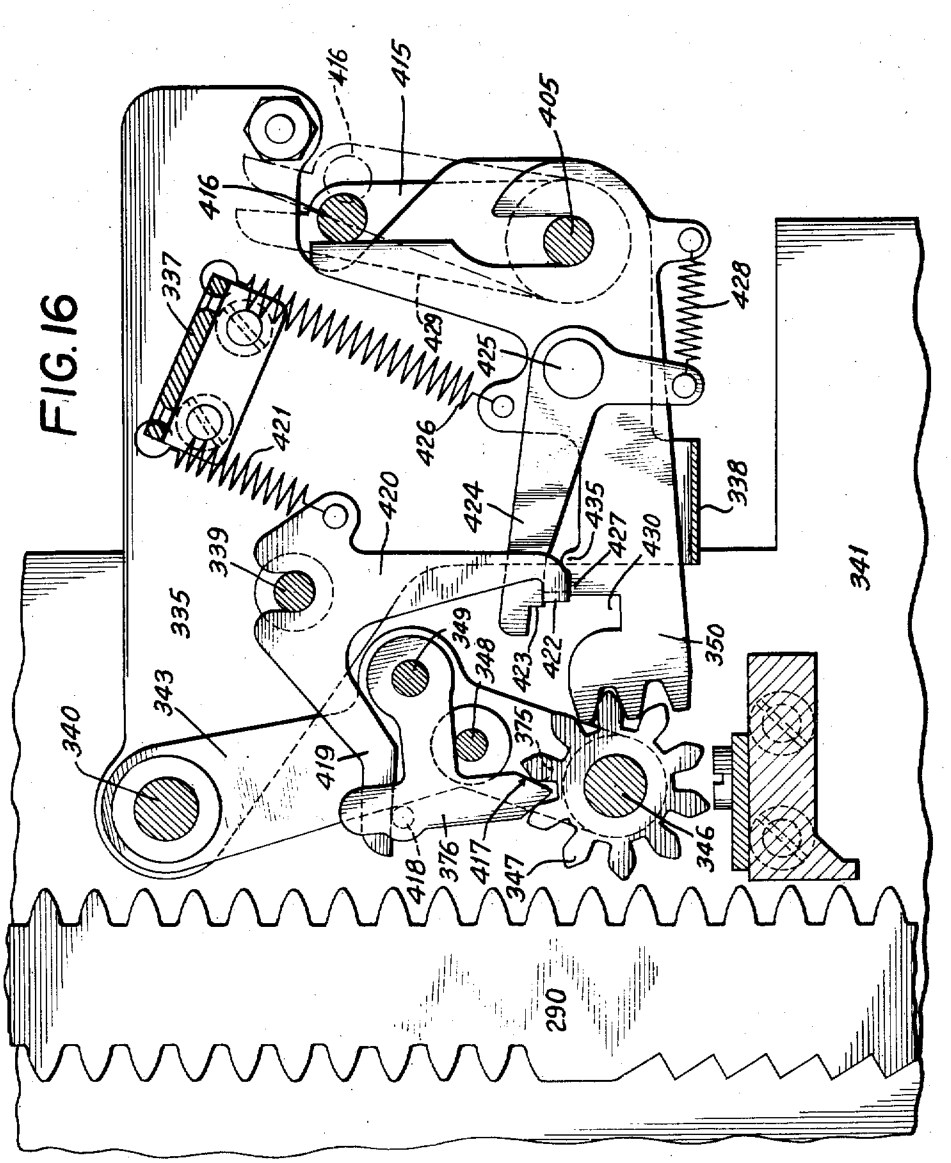

Fig. 16 is a sectional view taken through one of the accumulator units showing its rack actuating mechanism and associated units carry devices.

Figure 17:
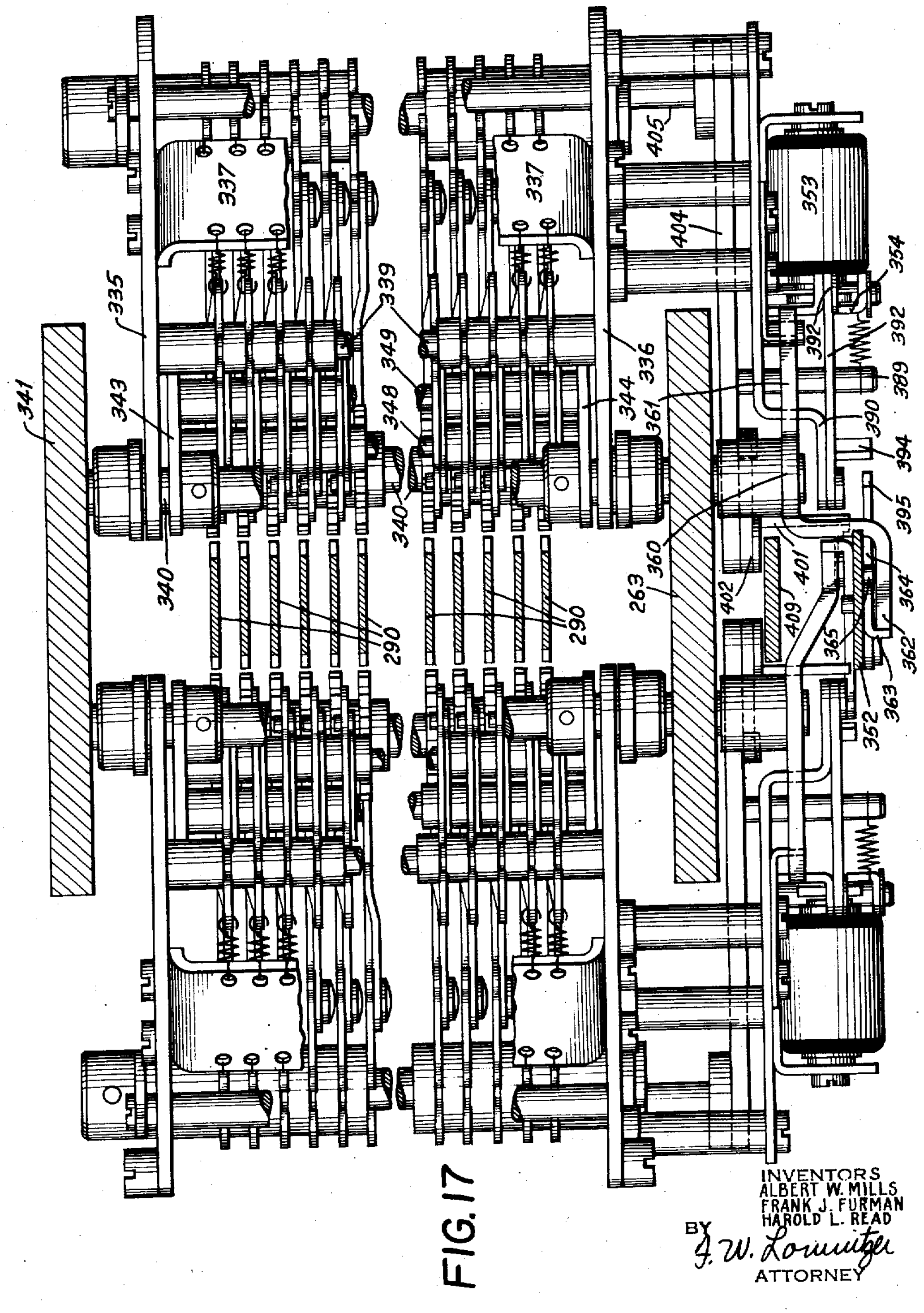

Fig. 17 is a plan view taken on the line 17—17 of Fig. 12.

Fig. 18 is a view in front elevation of the total digit representing storage unit.

Fig. 19 is a partial sectional view taken on the line 19—19 of Fig. 18.

Fig. 20 is a plan view partially in section taken on the line 20—20 of Fig. 18.

Figure 21:
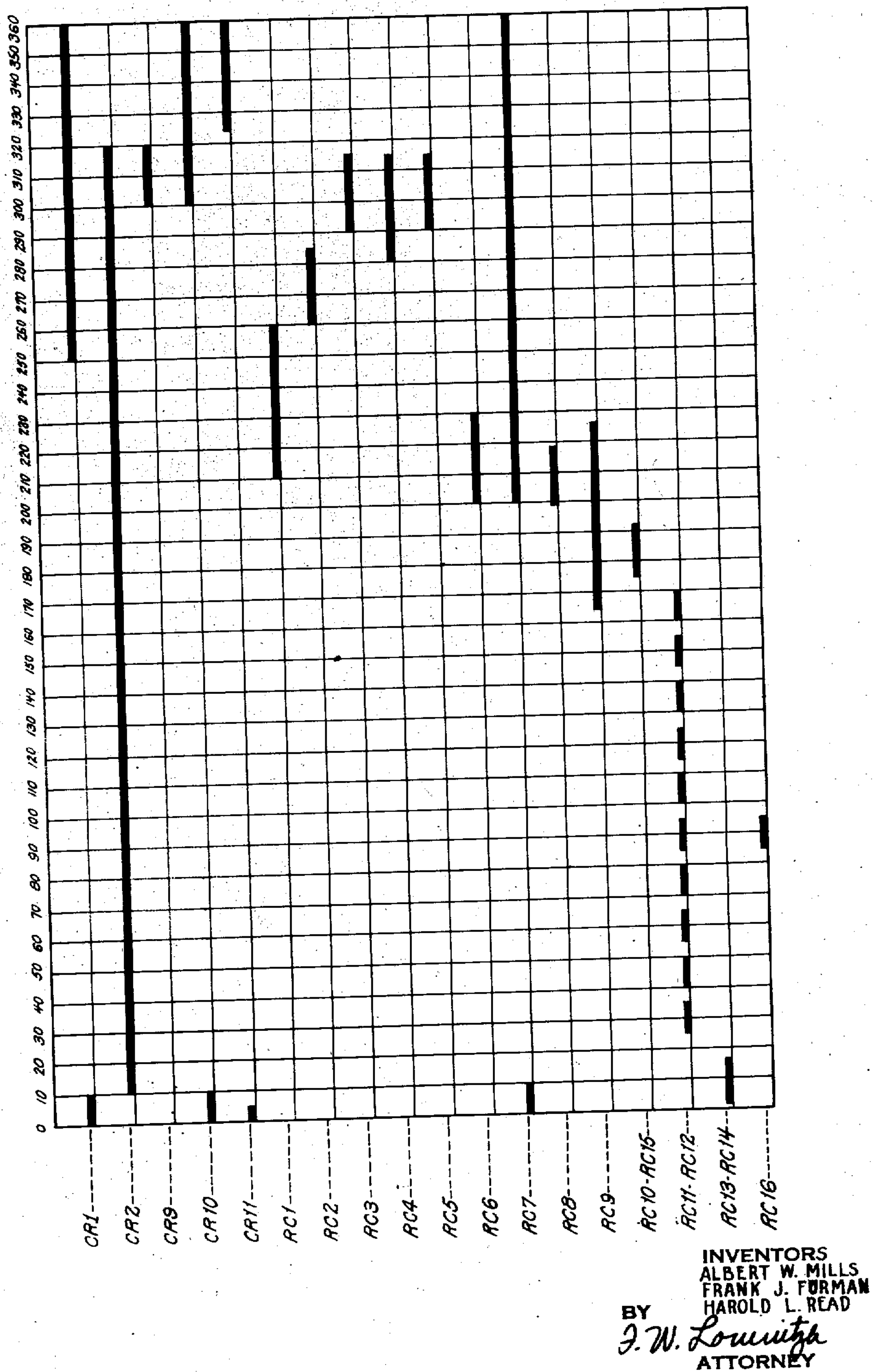

Fig. 21 is a timing diagram of the cam operated contacts.

Figure 22:
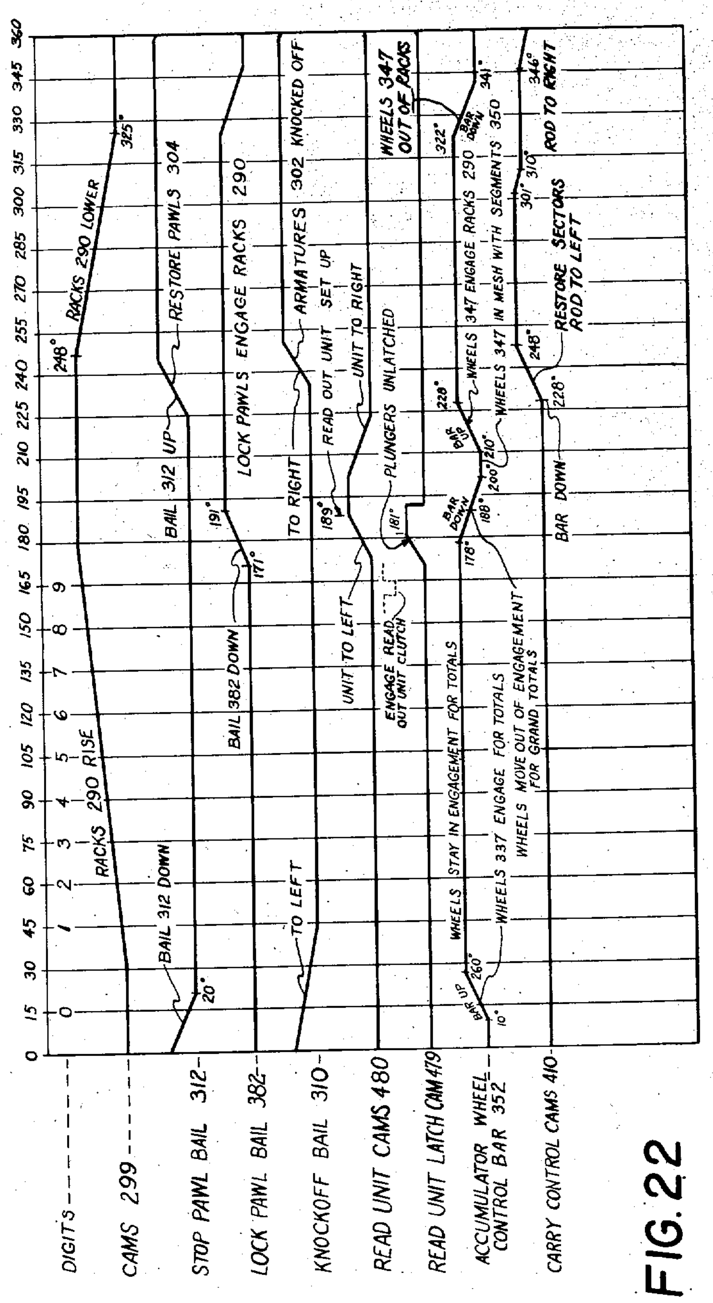

Fig. 22 is a timing diagram for the accumulator unit.

Figure 23A:
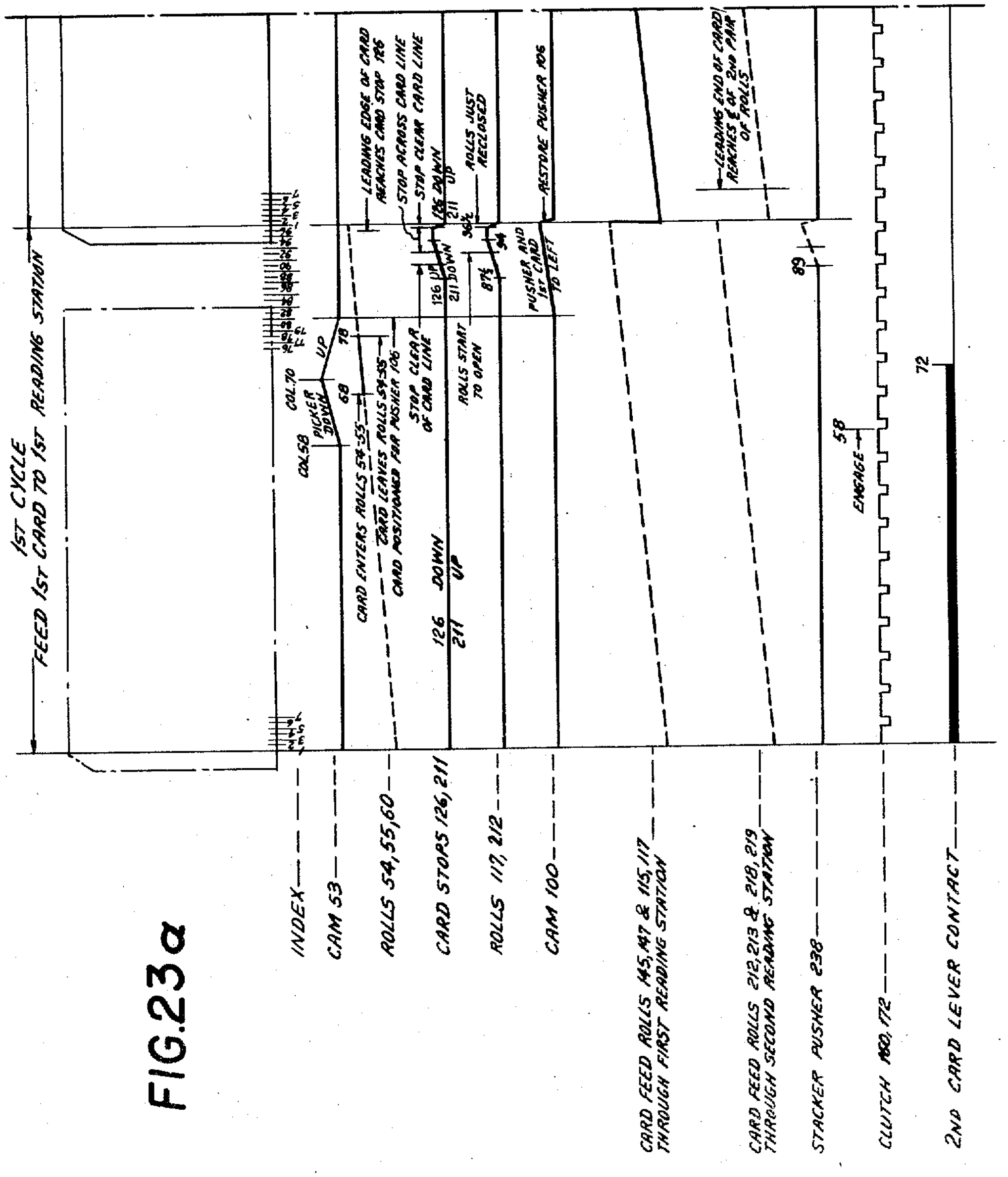
Figure 23B:
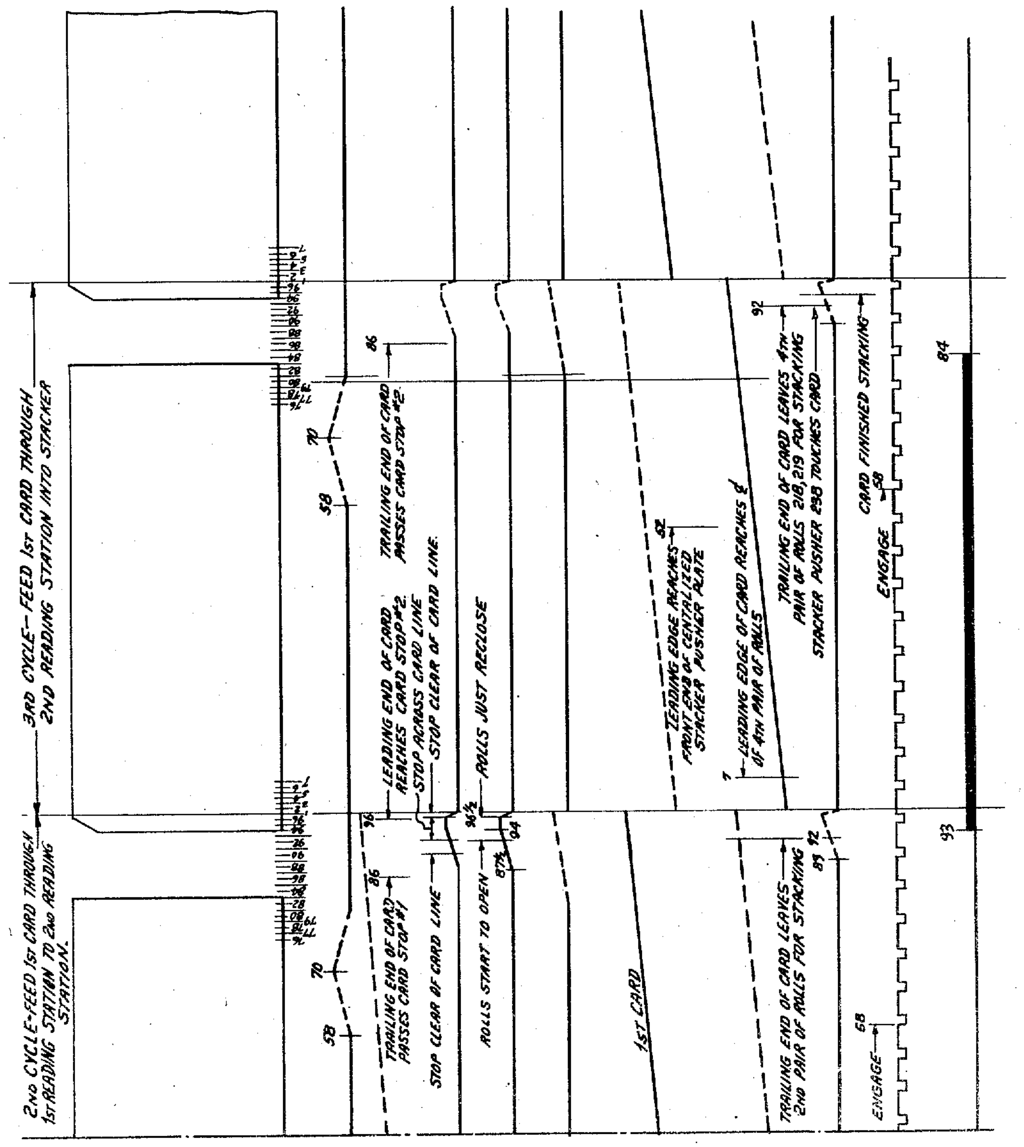

Figs. 23*a* and 23*b* when joined in this order show the timing of the card reader.

Figure 24:
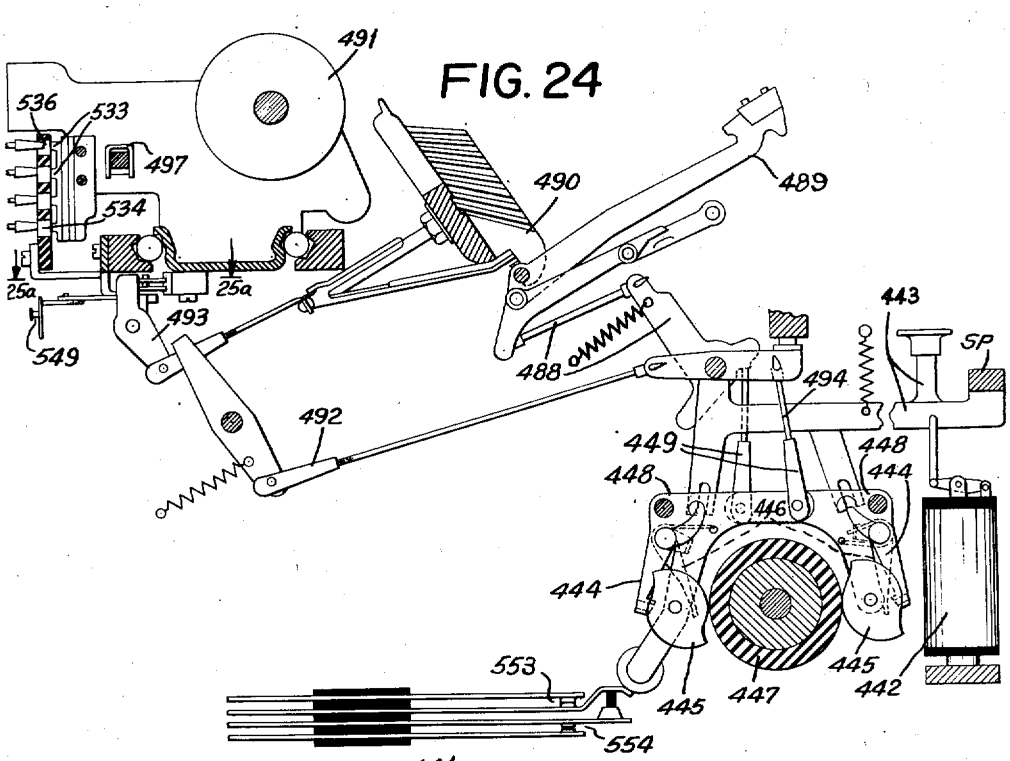

Fig. 24 is a sectional view of a typewriter of a well known manufacture utilized herein for recording purposes.

Figure 25:
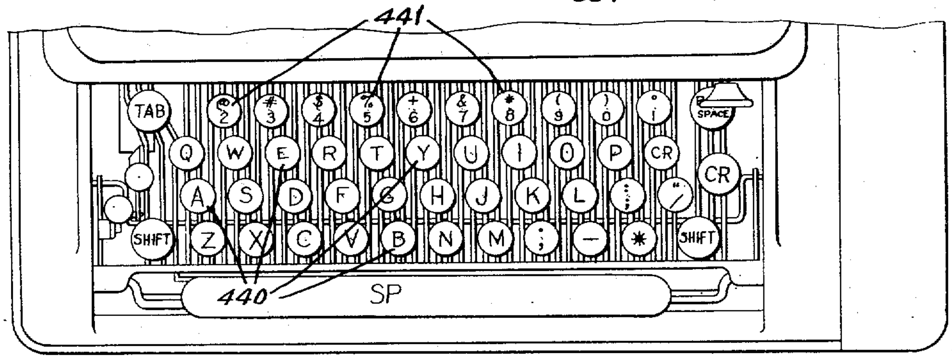

Fig. 25 is a plan view of the keyboard of said typewriter.

Figure 25A:
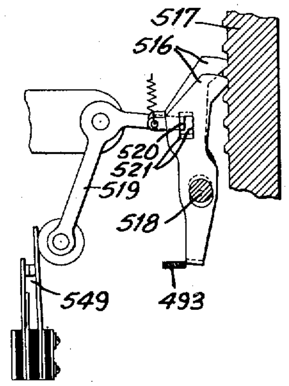

Fig. 25*a* is a detail view taken on the line **25*a*–25*a*** of Fig. 24 showing the manner of operating the escapement contacts in the typewriter.

Figure 26:
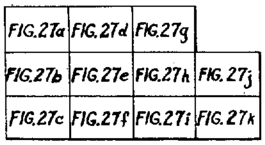

Fig. 26 is a diagram showing the manner of assembly of the sheets of the wiring diagram of Figs. 27*a*–27*k*.

Figs. 27*a*–27*k* show the electrical wiring connections of the machine.

CARD READER

The card reader is shown in Figs. 1–8, inclusive, and consists of a unitary, separately operated unit for feeding cards singly from a supply magazine, concurrently reading the perforations of successive cards column by column at two card reading stations, and disposing them after analysis into a storage magazine. The coordination of this unit with the rest of the apparatus will be later described, especially in connection with the wiring diagram.

1. CARD FEED TO PUSHER STATION

In general, the cards are fed singly from a supply magaizne downwardly to two sets of continuously rotating feed rolls which convey the card further downward to a so-called pusher station. The rotation of the second or lower continuously rotating feed roll frictionally holds the card in the pusher station until the card is pushed out of this station to the first card reading station.

Figure 1:
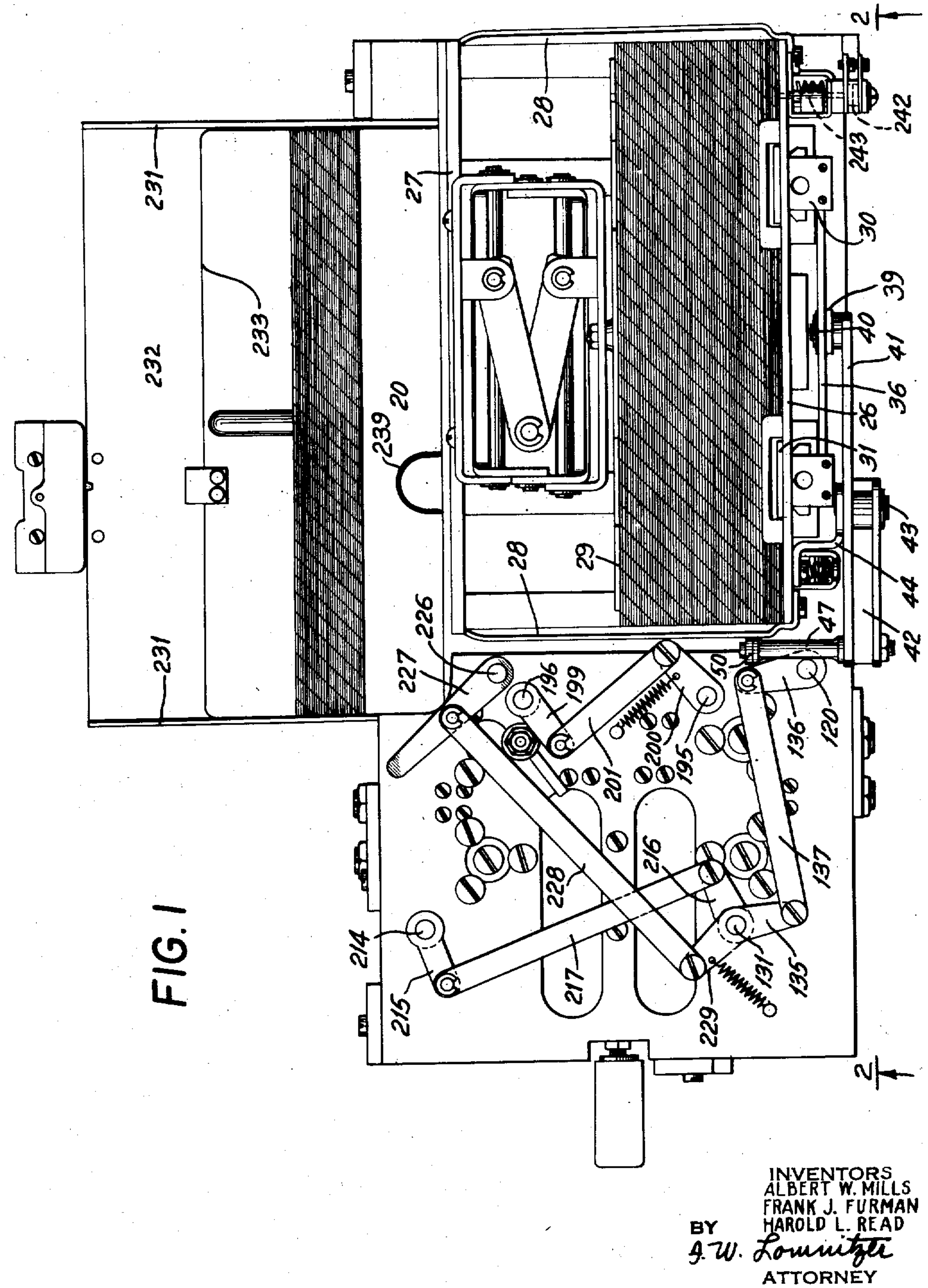
Fig. 1 is a plan view of the assembled card reader unit.
Figure 3:
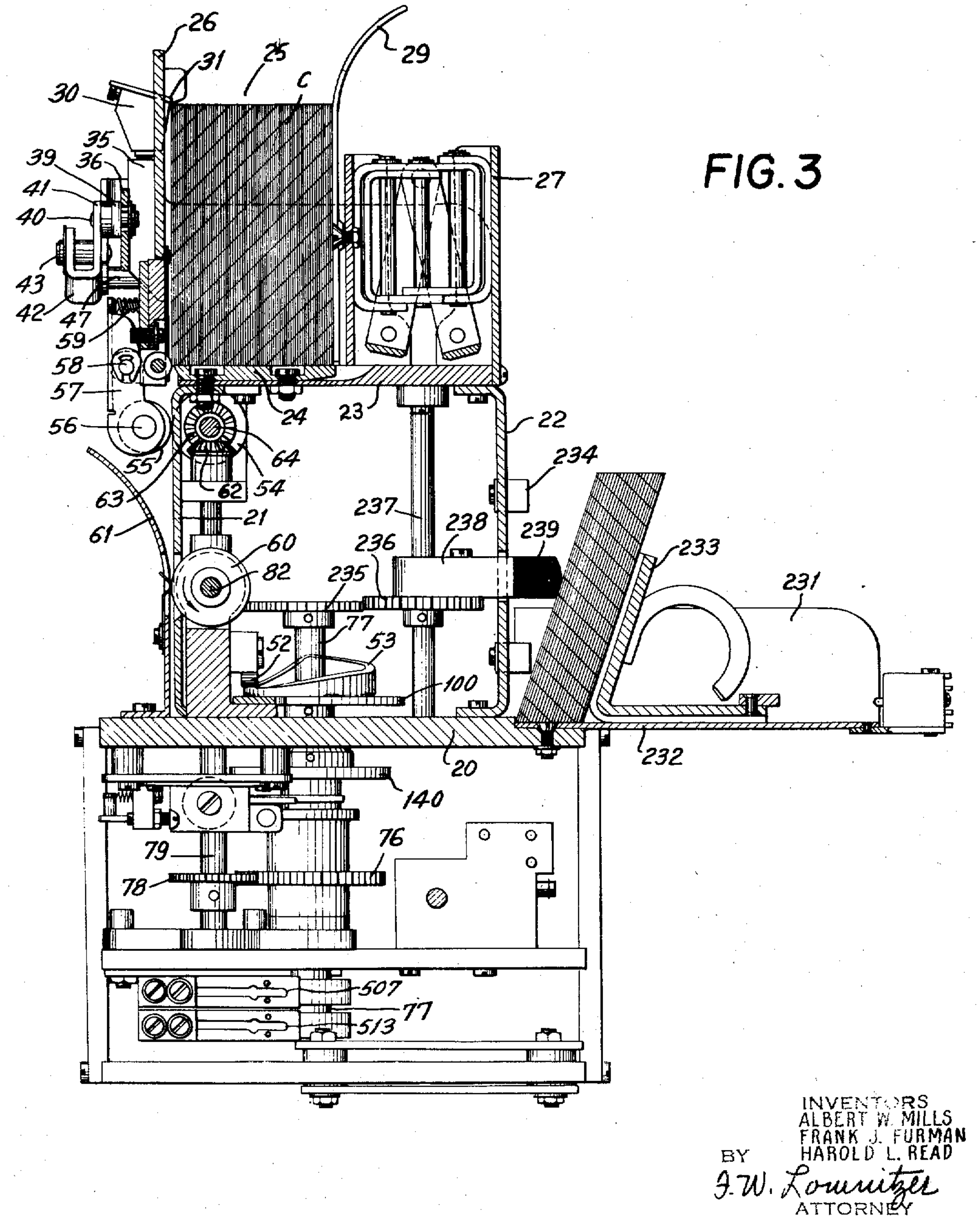
Fig. 3 is a transverse sectional view taken on the irregular section line 3—3 of Fig. 2.

Referring now to Fig. 3, upstanding from an intermediate base plate 20 is a front support plate 21 and a rear support plate 22, which support a base plate 23 which, together with an attached plate 24, form the base of the card supply magazine 25. The front wall of the supply magazine is designated by reference numeral 26, the rear wall by the reference numeral 27, and the two side walls by 28 (Fig. 1).

The cards C which control the machine are inserted as a stack between the front plate 26 and a card pack follower plate 29. The card pack follower plate 29 is operated by a spring that presses the pack of cards C against the front wall 26 and the picker knives with a pressure that is proportional to the number of cards remaining in the magazine 25. This avoids the increased pressure which usually results from the pack when it is of the maximum size. A parallel motion linkage shown in Figs. 1 and 3 permit a one-hand operation of the card pack follower plate 29 to the rear during the insertion of a stack of cards in the card supply magazine 25 and has the advantage that the follower plate 29 is confined to a small space. The construction of this follower plate and its spring-operated urging means is not described herein in detail since one form of it is fully shown and described in the application of C. D. Lake et al., Serial No. 789,790, filed December 5, 1947.

Figure 2:
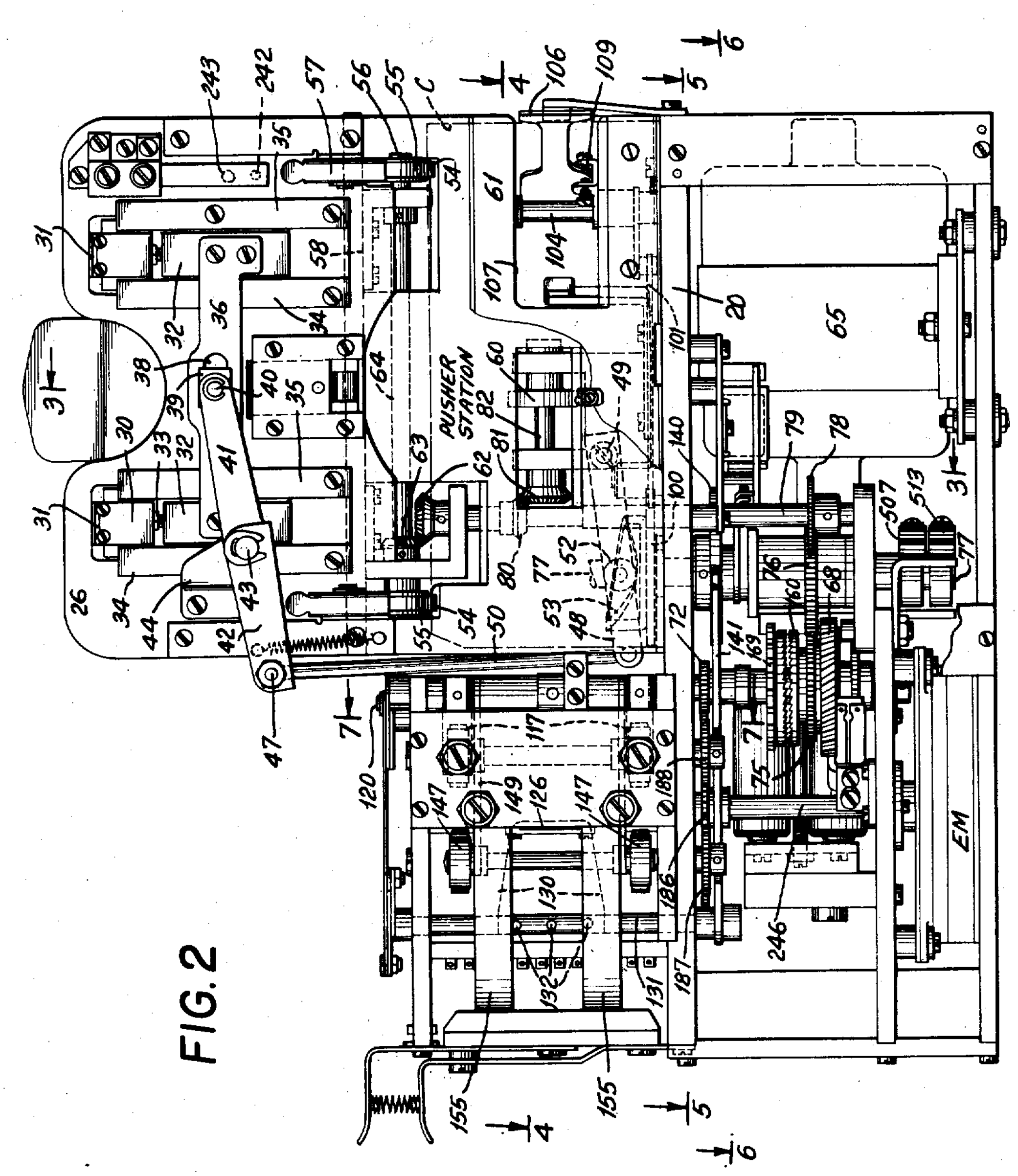
Fig. 2 is a view in front elevation taken on the line 2—2 of Fig. 1.

The cards are fed from the magazine singly by picker knives of the usual construction and in general each consists of a block 32 (Figs. 2 and 3) carrying a picker knife 31 projecting rearwardly from the block 30 sufficiently so that the knife will engage the top horizontal edge of the foremost card C. Each block 30 is attached to a guide block 32 by means of an adjusting screw 33. Each picker knife assembly 30—33 is guided for up and down reciprocation by a pair of guide blocks 34 and 35 which are carried by the front support plate 26, the picker knife 31 reciprocating in a slot in said frame plate 26. The pair of picker knife assemblies are tied together by a tie plate 36 which is attached to each of the guide blocks 32 and said tie plate 36 has an elongated notch 38 in which fits a block 39 carrying a pin 40 which projects through a hole of an operating arm 41 (Figs. 1, 2, and 3). Said arm 41 is an extension of a U-shaped bail 42 pivoted on a stationary stud 43 carried by a bracket 44 which, in turn, is carried by the plate 26. From the left-hand end of the bail 42 there projects laterally a pin 47 which is connected by a pitman 50 to a cam follower arm 48 which is pivoted at 49. Said arm 48 carries the customary cam follower roller 52 cooperating with a cam 53 attached to and driven by a shaft 77. The configuration of the cam 53 is best shown in Fig. 3.

Before the manner in which cam 53 is driven will be described, there will be explained the manner of driving the continuously rotating feed rolls which feed the card emerging from the supply magazine 25 to the pusher station. For pressing the card against the first set of feed rolls 54 (Fig. 3) there is provided a pair of pressure rolls 55, each rotating loosely upon a stud 56 carried by a related U-shaped support frame 57 pivoted at 58, said U-shaped frame and pressure roll 55 being urged by a spring 59 which rocks the frame and the pressure roll 55 counterclockwise, as shown in Fig. 3. The continuously rotating feed rolls 54 feed the card downwardly so that the card contacts with the periphery of a continuously rotating feed roll 60. The latter then frictionally feeds the card downwardly so that the leading edge strikes the top surface of the intermediate base plate 20, the card, of course, passing between the plate 21 and a supplemental guide plate 61.

The driving connections for continuously rotating feed rolls 54 and 60 will now be explained with particular reference to Figs. 2, 3, 6, and 8.

Figure 8:
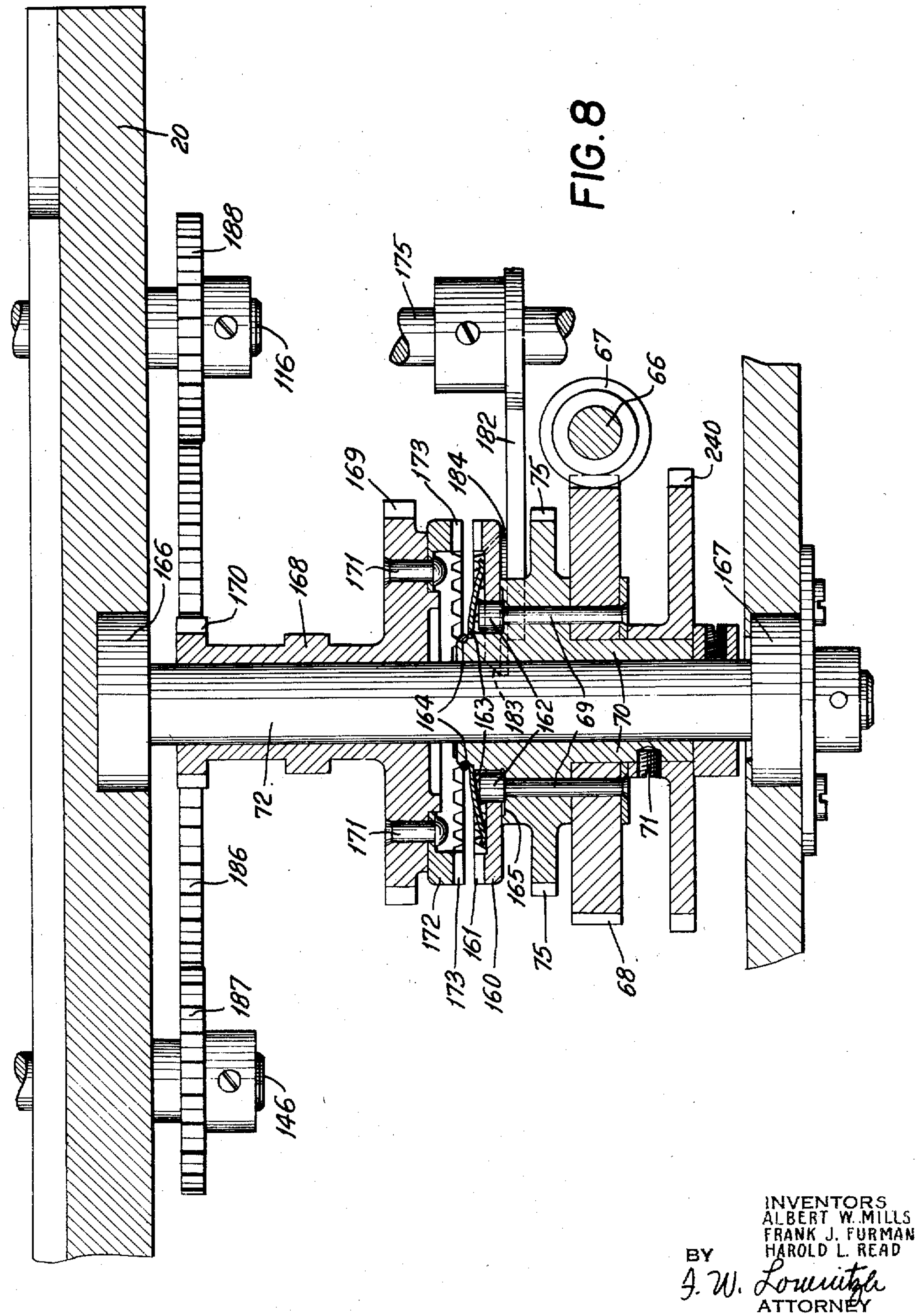
Fig. 8 is a sectional view taken on the line 8—8 of Fig. 5 and shows particularly some of the main gear drive and associated feed roll clutch.

Reference numeral 65 represents a motor, the armature shaft of which drives a shaft 66 (Fig. 6) continuously, said shaft carrying a worm 67 meshing with a worm gear 68 which is pinned, as shown in Fig. 8, by a plurality of pins 69 and also a set screw 71 to a sleeve 70 loose on a shaft 72. The sleeve 70 has a gear portion 75 (Fig. 6) meshing with an idler gear 76 loose upon a drive shaft 77 and which latter gear 76 meshes with a pinion 78 secured to a vertical drive shaft 79. The gear connections just described effect the continuous rotation of the shaft 79 which extends vertically and near its upper extremity it carries a beveled gear 80 (Figs. 2 and 4) meshing with a beveled gear 81 attached to a short shaft 82 carried by brackets 83 and 84. Said shaft 82, of course, rotates continually and it has fixed thereto the continually rotating feed roll 60. The shaft 79 also carries a bevel gear 62 (Figs. 2 and 3) meshing with a gear 63 attached to the shaft 64 which carries the feed rolls 54. These, of course, rotate continually.

Summarizing, the first downward movement of the card by the pickers 31 causes the card to cooperate with and be fed by the feed rolls 54, 55. A further downward movement of the card causes the card to be engaged by and be fed by the feed roll 60 which frictionally feeds the card to its lowermost position with the leading bottom edge pressing against the top surface of the base plate 20. This is the position that the card C occupies, as shown in dotted line in Fig. 2, until a pusher plate moves the card from the dotted line position to the left to further card feeding and reading instrumentalities.

Card Feed Clutch Drive

It will be recalled that the picker operating cam 53 is attached to the drive shaft 77 and the manner of driving the latter by a clutch drive will now be explained.

The continually rotating gear 76 (Fig. 6) has attached thereto a clutch ratchet wheel 85 and to the shaft 77 there is secured an arm 86 having a tail 96 and carrying a stud 87 upon which is pivoted a clutch pawl 88 having a clutch tooth 89 in the plane of the ratchet wheel 85. A spring 90 secured to the free end of the clutch pawl 88 normally tends to cause the clutch tooth 89 to engage the ratchet wheel 85 but this is normally prevented by a lug 91 projecting over a tail 92 of the clutch pawl 88 and a similar tail 92*a* carried by the arm 86. Said lug 91 is an integral part of an armature 93 pivoted on a stud 94, said armature being attracted by the energization of a card feed clutch magnet 508. This is the usual construction of a one-revolution clutch.

Differing from the usual construction of a one-revolution clutch of this type, the clutch is so devised that upon the first energization of the picker clutch magnet 508 to release the clutch pawl 88 for engagement with ratchet wheel 85 a 90° counterclockwise movement of shaft 77 will be obtained and the clutch then disengaged. Then upon the second energization of the magnet 508, the clutch will again engage so that a 270° rotation of shaft 77 will be effected. Loosely mounted on shaft 77 is a member 86*a* which has a tail like the tail 96 which is also in the path of lug 91 and is adapted to be engaged thereby when the armature 93 occupies its normal position after the first deenergization of the magnet 508. Member 86*a* also has a lateral projection 86*b* which operates against the tail 92 of pawl 88. The engagement of the tail of member 86*a* (which is like 96) with said lug 91 after the 90° movement of the shaft 77 will disengage the clutch pawl 88 from the ratchet wheel 85 and the clutch will be disengaged. At the end of 90° rotation tail 96 strikes lug 91. During this 90° rotation of the shaft 77 the cam 53 is given a similar angular rotation which will cause the pitman 50 (Fig. 2) to be raised upwardly and the card pickers 31 moved downwardly to their lowermost position, thus causing the feeding of the card to the pusher station. When magnet 508 is again energized, lug 91 is disengaged from tail 96 and the similar tail of member 86*a*, and clutch pawl 88 engages ratchet wheel 85, and 270° rotation continues. At the end of 270° rotation tail 96 of arm 86 strikes lug 91, and the similar tail of member 86*a* strikes lug 91 and through lateral projection 86*b* disengages pawl 88 from ratchet wheel 85. This timing is shown in Fig. 23 for the cam 53. From this timing diagram, it will be seen that the picker knives 31 reciprocate between cycle point 58–81, starting a downward movement when column 58 is analyzed. The second energization of the magnet 508 at cycle point 80 again causes the clutch to engage which causes the complementary rotation of 270° of shaft 77 but due to the formation of cam 53 between 270°–360° the pitman 50 is lowered and picker knives are raised to their normal "home" position. However, during this 270° movement a card pusher engages the right-hand marginal edge of the card and moves the card to the left, overcoming the frictional hold by the feed roll 60 and pushing the card until the left-hand marginal edge of the card abuts a card stop in reading station No. 1.

Card Pusher

Figure 4:
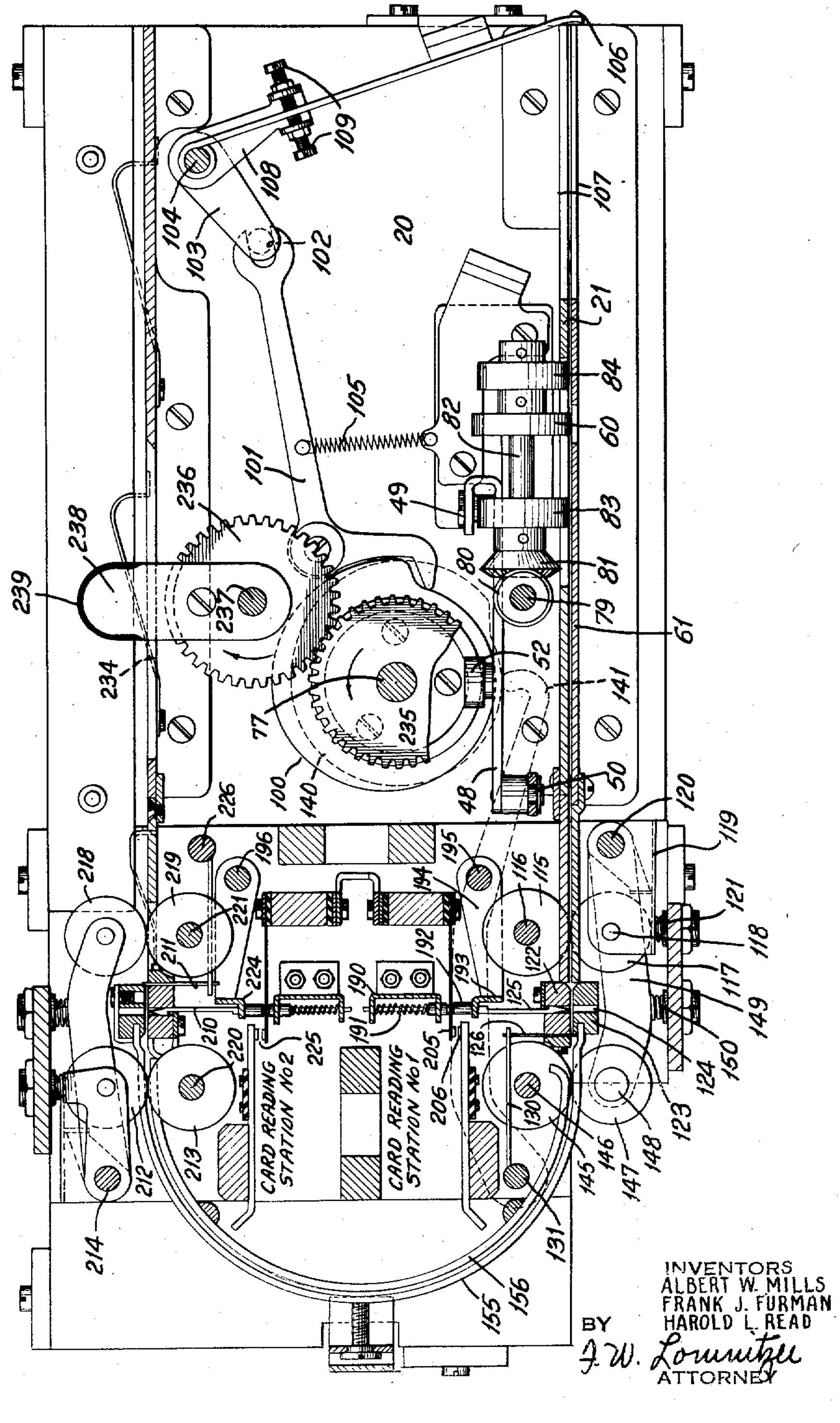
Fig. 4 is a transverse sectional view taken on the line 4—4 of Fig. 2 and shows particularly the card pusher and the path of travel of the card through the two reading stations.

To shaft 77, as best shown in Fig. 4, there is secured a profile cam 100 acting upon a follower bell crank 101 which has a pin and slot connection 102 to an arm 103 attached to a rock shaft 104. A spring 105 urges the follower bell crank 101 in a continuous cooperation of the profile of cam 100. Loosely encircling the rock shaft 104 is a plate 106 having a tail portion which abuts the right-hand marginal edge of a card which has been moved down to the pusher station. Secured to the rock shaft 104 is an arm 108 which carries a pair of adjusting screws 109 acting upon the pusher plate 106. This enables the proper adjustment of the pusher plate 106 to control its extent of travel and also gives it a connection to the arm 108 for simultaneous movement.

The profile of the cam 100 is such that during the first 90° rotation of the cam the pusher plate 106 will remain in the normal position shown in Fig. 4. However, during the rotation of cam 100 from 270° to 360° the cam will gradually rock the bell crank 101 counterclockwise, shaft 104 and arm 108 clockwise so that the pusher plate 106 engaging the right-hand marginal edge of the card will move the card to the left as in Figs. 2 and 4, and in such movement the card is guided by the plates 21 and 61. It will be seen that the terminal portion of pusher 106 operates in similarly formed slots 107 (Figs. 2 and 4) formed in each of said plates 21 and 61. This lateral shifting of the card is effected against the action of the feed roll 60 since the latter has merely a light frictional engagement with the card surface. After the desired lateral movement of the card, the cam 100 will be effective to quickly restore the pusher plate 106 and parts correlated therewith to the normal position in Fig. 4, placing the terminal edge again in such position that it will not obstruct the next card to be fed.

One advantage of the present means of operating the card feed pickers and then effecting the lateral shift of the card is that sufficient time is given to operate the card picker mechanism and drive the associated feed rolls to insure that the card is completely in the pusher station before it is moved laterally to the left. When the card is moved laterally, to the left to the first reading station by the first pair of feed rolls to be described, the card first abuts a card stop to thus accurately register and align the card at column 1 before a further step-by-step column feed of the card ensues.

Feeding of Card Laterally From Pusher Station to First Reading Station for Registration Therein The lateral movement of the card out of the pusher station positions the card for analysis of column No. 1 by sensing pins and to insure that the card is at the first column position the left-hand marginal edge of the card is projected against a card stop. Simultaneously with the positioning of the card stop the first pair of feeding rollers now to be described are spread apart to permit free entry of the card in between the rolls. The first pair of feed rolls at reading station No. 1 comprises feed rolls 115 driven by a shaft 116 and a pair of cooperating feed rolls 117, each of which rotates loosely upon a stud 118 carried by a related U-shaped frame 119 secured to a rock shaft 120. A spring 121 pressing against the yoke of the related U-shaped frame 119 urges roll 117 to coact with the associated roll 115.

As the card emerges from the left-hand portion of the guide plates 21 and 61, it passes between an upper guide block 122 (Fig. 4) and a lower guide block 123 which are spaced apart the thickness of a card. The guide blocks 122 and 123 are provided with a series of holes 124 in which are slidably mounted the twelve sensing pins 125 of the first reading station. The upper guide block 122 is also provided with a long slot in which fits a card stop plate 126. Normally, each feed roll 117 is in contact with the associated feed roll 115, as shown in Fig. 4, and the card stop plate 126 is upwardly out of the path of the oncoming card.

The card stop plate 126 is dependently hung from a plate 130 (Figs. 2 and 4) which is attached to a rock shaft 131 by means of several screws 132 (Fig. 2). There is a linkage connection, best shown in Fig. 1, between the rock shafts 120 and 131 so that simultaneously when the card stop 126 is moved downwardly to act as an abutment for the oncoming card the roller 117 is moved out of cooperation with the roller 115. This linkage comprises a pitman 137 connecting an arm 135 secured to the shaft 131 and an arm 136 secured to shaft 120.

Figure 5:
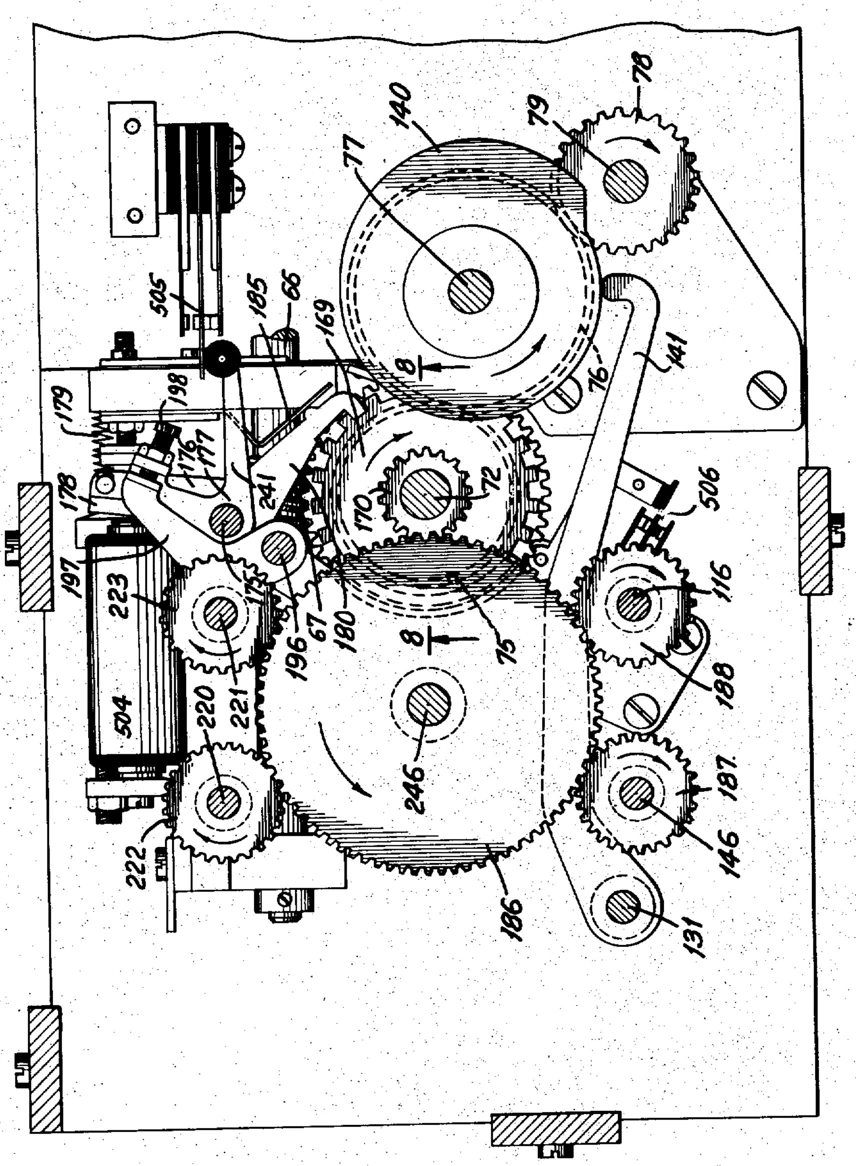
Fig. 5 is a transverse sectional view on the line 5—5 of Fig. 2 and shows particularly the feed roll driving means and the associated escapement clutch.

Referring now to Figs. 4 and 5 secured to the shaft 77 is a cam 140 coacting with a follower arm 141 which is secured to the shaft 131. During the first engagement of the card feed clutch the 90° rotation of cam 140 will not move the follower arm 141. During the second clutch engagement cam 140 is rotation from 270°–360° and it will first rock the arm 141 clockwise, rocking the shaft 131 in the same direction in Figs. 4 and 5, thereby moving card stop 126 downwardly as the card is being pushed to the left (see timing in Fig. 23*a*). The clockwise rocking of shaft 131 will shift pitman 137 to the left to rock arm 136 and rock shaft 120 counterclockwise, moving feed roll 117 out of coaction with the feed roll 115. These operations are effected during the time that the pusher plate 106 is moving the card to the left so that there is an unobstructed movement of the card on its bottom edge until the left-hand marginal edge strikes the card stop 126. The adjusting screws 109 adjust the travel of the pusher and card so that the left-hand marginal edge thereof will strike the card stop 126 without buckling. This adjustment is made so that the first column of the card will have its index point positions correlated with the twelve sensing pins 125 for analysis thereof. After the registration of the card, cam 140, at its final movement, effects the reverse rotation of shafts 131 and 120, moving the card stop 126 out of cooperation with the card and at the same time causing roller 117 to close upon the roller 115, and in so doing the card is now engaged by both feed rolls 115—117 for feeding operations thereby.

The second set of feed rolls associated with the first card reading station consists of a pair of feed rolls 145 secured to a drive shaft 146 and a pair of feed rolls 147, each loosely pivoted on a stud carried by an arm 149 loosely pivoted on the rod 120. A spring 150 acts against each arm 149 so that feed roll 147 is in frictional cooperation with the associated feed roll 145. By means to be presently described the two sets of feed rolls 115—117 and 145—147 are rotated step by step so as to correlate the successive columns of the card with the sensing pins 125. As the card is fed past the two sets of feed rolls it passes between semi-circular card feed guide plates 155, 156 which are spaced apart the thickness of a card so that as the card columns are successively analyzed at reading station No. 1, the card will be moved in a semi-circular path for correlation with the card reading station No. 2.

CARD COLUMN SPACING OR ESCAPEMENT MECHANISM

The escapement mechanism is of the electro-magnetic type and drives the feed rolls at card reading stations No. 1 and No. 2 step by step for analysis of the card column by column, or by a continuous movement if skipping is desired. The means to effect the operation of the escapement mechanism is mechanically tied up with the means to cause the positioning of the card sensing pins 125 so that the sensing pins are positively withdrawn from the card surface during the time that the feed rolls feed the card the space of one column. After the column spacing has been terminated the retracted sensing pins move downwardly to normal position to project through the perforations in the column to be analyzed. This mechanical coordination is effected in such manner that the sensing pins cannot pass through the perforations in a card or touch the surface of the card while the feed rolls move the card from column to column, or while a skipping of the card takes place.

The escapement clutch will be described with particular reference to Figs. 2, 5, 6 and 8. Referring to Fig. 8 it will be seen that fitting over the upper end of the sleeve 70 is a clutch disk 160 having a series of upstanding teeth 161. The three pins 69 before referred to have enlarged head portions 162 at their upper extremities which fit in slightly larger circular holes in the clutch disk 160. Pins 69 thus tie the sleeve 70 and the clutch disk 160 together for simultaneous rotation. The holes receiving head portions 162 are made a little larger than the diameter of the portions 162 so that an angular movement or tilting of the clutch disk 160 may be effected to make a clutch engagement but still cause clutch disk 160 to be rotated. Fitting over the uppermost portion of the sleeve 70 is a round spring pressure plate 163 which is held on the sleeve 70 to press against the clutch disk 160 by means of a confining wire ring 164. Plate 163, therefore, urges the clutch disk 160 down so as to make a surface contact with an annular ring surface 165 of the sleeve 70. It is at some surface portion 165 that the angular displacement of the clutch disk 160 may be effected. The shaft 72 rotates in ball bearings 166 and 167 and loose thereon is a sleeve 168 having a ratchet wheel 169 and a gear 170. A complementary clutch disk 172 having downwardly facing clutch teeth 173 is attached by pins 171 to the sleeve 168 for simultaneously rotation, said clutch disk 172 having a surface contact at its bottom with the extremity of sleeve 70 above the wire ring 164.

Figure 6:
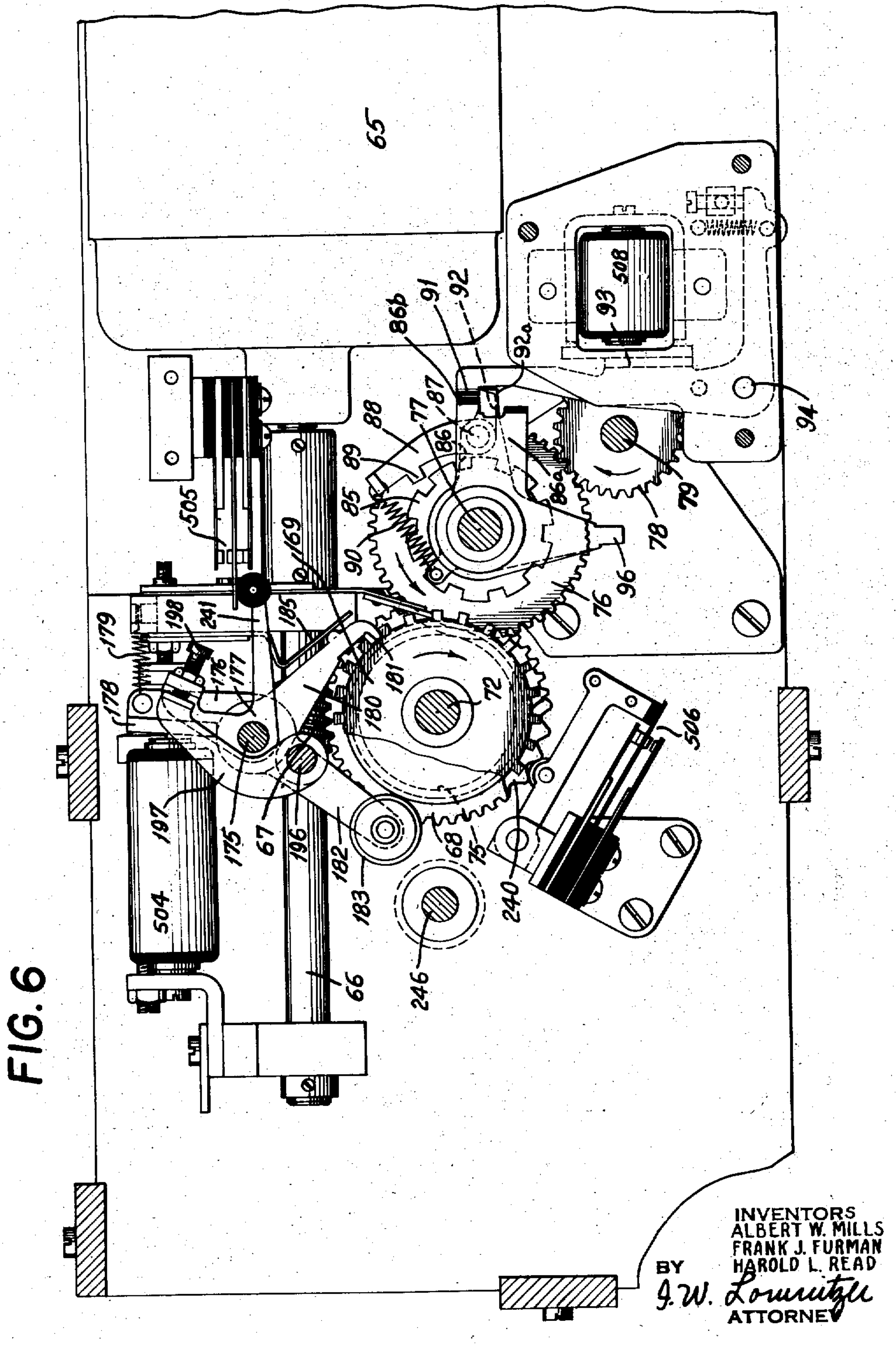
Fig. 6 is a sectional view taken on the line 6—6 of Fig. 2 and shows, in detail, the feed roll escapement clutch and also the card feed picker clutch mechanism.
Figure 7:
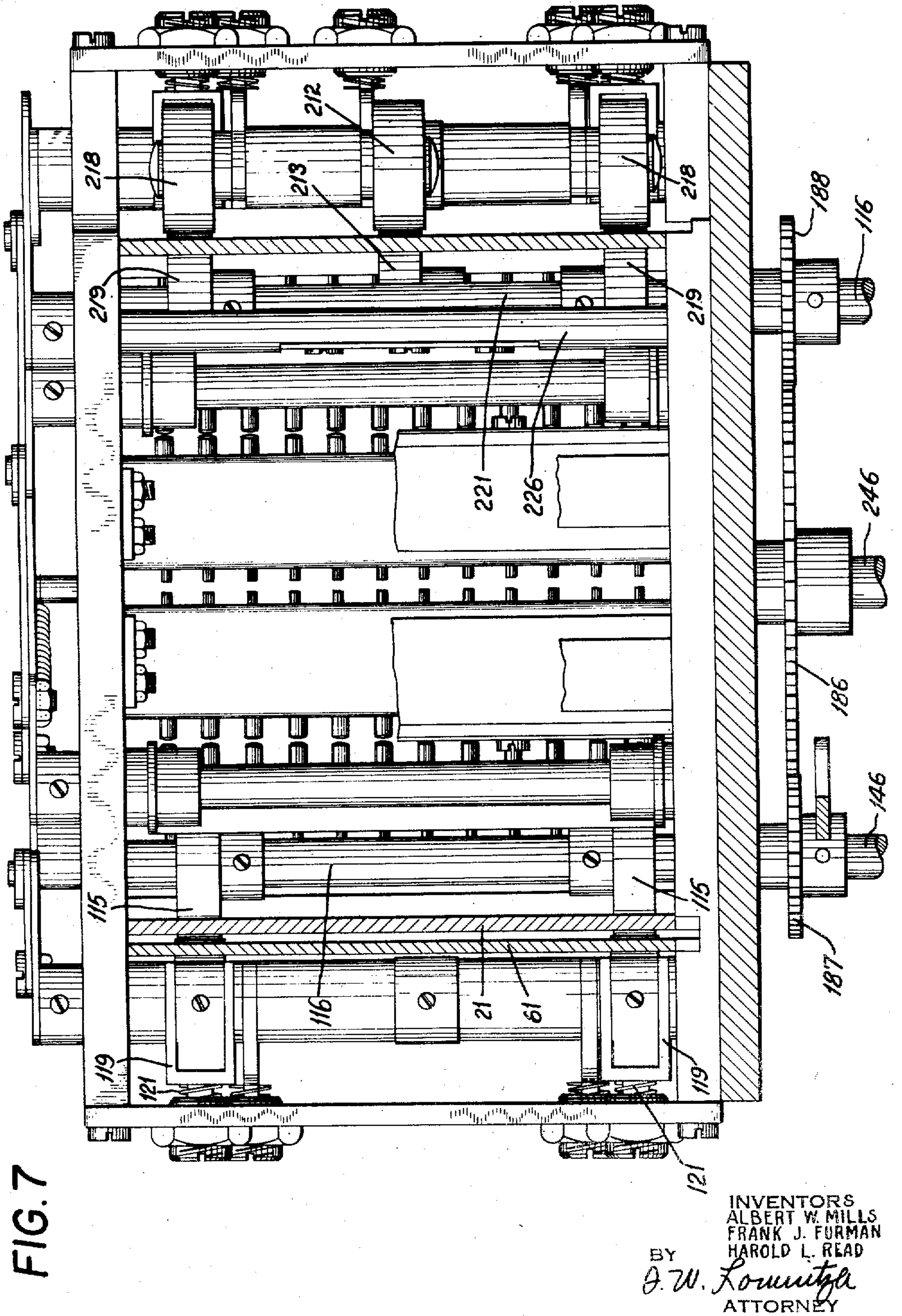
Fig. 7 is a transverse sectional view taken on the line 7—7 of Fig. 2.

Referring now to Fig. 6 pivotally mounted on a rock shaft 175 is a bail consisting of arms 176 and 177 which carry an armature block 178 adapted to be attracted by a core of an escapement clutch magnet 504. Spring 179 retains the armature 178 in the position shown in Fig. 6 so that a depending latch arm 180 which is secured to the rock shaft 175 has its clutch tooth 181 in engagement with an interdental space of the ratchet wheel 169. Also secured to the shaft 175 is a second depending arm 182 carrying a roller 183 which is so beveled that when said roller 183 is moved towards the center of the shaft 72 by said arm 182 it will engage the peripheral portion 184 (Fig. 8) of the clutch disk 160 to cam about one-half of the clutch disk 160 upwardly so that its ratchet teeth 161 cooperate with the ratchet teeth 173 of the driven ratchet clutch disk 172. This tilting or angular movement of the lowermost clutch disk 160 is effected at some part of the peripheral annular portion 165 of the sleeve 70. Thus, it is evident that when magnet 504 is energized clutch tooth 181 is freed from the ratchet wheel 169 and at the same time the beveled roller 183 makes the desired clutch connection between clutch disks 160 and 172, thus rotating the sleeve 168 and pinion 170. The deenergization of the magnet 504 is so timed that if a single column spacing of the card is desired the magnet is deenergized at the time the clutch tooth 181 is over the adjacent tooth of the ratchet wheel 169, to thus be rocked in the adjacent tooth space by spring 179 at the time clutch disk 160 is disengaged from clutch disk 172. To assist the spring 179 there is provided a flat spring 185 (see Fig. 6) which bears against the depending latch arm 180.

FEED ROLL DRIVE FOR 1ST READING STATION

The manner of driving the feed rolls from the pinion 170 will now be described. The pinion 170 meshes with a gear 186 (see Fig. 5) which meshes with gears 187 and 188 secured to the feed roll drive shafts 146 and 116 which, it will be recalled, drives the respective feed rolls 145 and 115. The gearing is so arranged that the two sets of feed rolls for the first and second reading stations will move the card one column for each operation of the escapement mechanism just described. When the machine is started up and for each lateral push of the card there is also an engagement of the escapement clutch so as to rotate the feed rollers 115 and 145 but since the feed roll 117 is out of peripheral contact with the feed roll 115 this step of rotation of the feed roll 115 is idle. However, when successive columns are to be analyzed after column 1 there is a step by step rotation of both sets of feed rolls at each reading station.

It will be recalled that the positioning of the sensing pins 125 is mechanically tied up with the operation of the escapement mechanism so that the sensing pins 125 are withdrawn out of contact with the card before the latter is spaced one column.

SENSING PINS

The sensing pins 125, as previously described, consist of twelve in number to analyze the corresponding number of index point positions in each card column and are guided by the guide blocks 122 and 123 (see Fig. 4). At their upper portions they are guided by a bail 193, and collars 192 attached to the sensing pins 125 rest on said bail. A stationary guide bail 190 carries spring pressed pins 191 which press the sensing pins 125, a contact blade 125 being interposed between each pin 191 and sensing pin 125. The bail 125 is carried by arms 194 secured to a rock shaft 195. Clockwise rocking of shaft 195 will elevate sensing pins 125 to move them out of contact with the card during the card column spacing operation, and then lower the pins to sense the holes.

Referring now to Figs. 5 and 6 secured to a rock shaft 196 is an arm 197 abutting an adjusting screw 198 carried by the side arm 177. When the armature 178 is attracted the adjusting screw 198 will rock arm 197 and shaft 196 counterclockwise. Attached to the shaft 196 is an arm 199 (see Fig. 1) which has a pitman connection 201 to an arm 200 secured to the rock shaft 195. Thus, it is evident that the aforementioned counterclockwise rocking of shaft 196 will, through the linkage 199, 201, 200, rock shaft 195 clockwise, and as viewed in Fig. 4, will elevate bail 193 upwardly, moving sensing pins 125 in the same direction and compressing the springs 191. When the escapement clutch disengages, the parts just described will operate in a reverse manner and bail 193 now permits sensing pins 125 to move downwardly to make contact with the surface of the card and analyze the perforations in the card.

Sensing Pin Contacts

The position of each of the twelve sensing pins through a hole of the card is indicated by closing electrical contacts. To this end the collar 192 of each sensing pin 125 normally holds up a resilient contact blade 205 (Fig. 4) of related sensing pin contacts 206. When the bottom of the sensing pin 125 strikes an unperforated index point position, contacts 206 remain open. When the bail 193 is down so that a sensing pin 125 passes through a hole, contact blade 205 moves down to close the related contacts 206. The purpose of the electrical contacts 206 will be later described in connection with the circuit diagram of Fig. 27b.

Second Card Reading Station

A duplicate arrangement is provided for card reading station No. 2 with respect to sensing pins, card stop, feed rolls, etc. and the sensing pins 210 (Fig. 4) are so disposed with respect to sensing pins 125 that corresponding columns of two successive cards are analyzed for group control or other purposes. It is thought unnecessary to describe the manner of feeding a card at the second card reading station, its analysis, etc. and a description will be given in only so much detail as is necessary to understand the operating means for this second card reading station.

When a new card has been fed to reading station No. 1 for alignment, a preceding card (if there is one) is also realigned at card reading station No. 2 by means of a card stop 211 similar in construction and operation to the card stop 126. The leading edge of a card is first received by feed rolls 212 and 213 (Fig. 4) and in order that their separation may be effected to allow the free movement of the card and the leading edge thereof abut the now upwardly raised card stop 211 the feed rolls 212 are mounted in the same manner as described for the feed rolls 117. The rock shaft 214 for rocking rolls 212 out of contact with rolls 213 has a linkage connection shown in Fig. 1 which comprises an arm 215 secured to the rock shaft 214 connected by a pitman 217 to an arm 216 secured to the rock shaft 131. Thus, simultaneously with the separation of feed rolls 115 and 117 rolls 212 and 213 are also separated. The trailing edge of the preceding card is fed by the feed rolls 145 and 147 which are in frictional contact with the trailing edge of the preceding card so as to project the leading edge nearly against the card stop 211. After the trailing edge of the card leaves rollers 145 and 147 rolls 213 on shaft 220 and rolls 218 complete delivery of the card to the card stop 211.

The other set of feed rolls for sensing station No. 2 comprises feed rolls 218 and 219. For driving the feed rolls 213 and 219 their driving shafts 220 and 221 have respective gears 222 and 223 (see Fig. 5) meshing with the common driving gear 186.

The downward and upward movement of the sensing pins 210 is controlled by a bail 224 operating in the same manner as the aforementioned bail 193 and which is secured to the rock shaft 196. It is evident that the counterclockwise rocking of this shaft, during the time that the escapement clutch is engaged, will move bail 224 downwardly to move sensing pins 210 out of contact with the card while it is being column-spaced. The twelve sensing pins 210 close their respective contacts 225 when holes are encountered in each card column.

For positioning the card stop 211 in the same manner described for card stop 126, it will be seen that its rock shaft 226 has a linkage connection to the shaft 131 which is shown in Fig. 1. Secured to the rock shaft 226 is an arm 227 which has a link connection 228 with an arm 229 secured to the rock shaft 131.

When a card emerges from the feeding rollers 218 and 219 it is disposed in a storage magazine 230 (see Fig. 1) in the following manner:

Card Stacker

The card magazine 230 is of the usual formation comprising side plates 231 (Fig. 1), and a base plate 232 (Fig. 3) and the cards already stacked in the magazine rest as shown in Fig. 3 in tilted angular position against a support plate 233 which is pushed backwardly as the cards are stacked in the magazine. As a card is analyzed and emerges from the rollers 218, 219 it moves into the magazine and at about the time column 52 of the card is analyzed its leading edge engages a flat spring plate 234 which is inclined so that it moves the leading portion of the card out of the plane position so as to be partly disposed against the cards in the stack, or against the plate 233. Shaft 77 has secured thereto a gear 235 (Figs. 3 and 4) meshing with a gear 236 secured to a stacker shaft 237 which carries a stacking member 238 having its nose covered by rubber material 239. During the first engagement of the card feed clutch the 90° rotation of shaft 77 will effect a 90° rotation of the shaft 237, thus disposing stacker member 238 at right angles to the position shown in Fig. 4 so that the card may be further fed into the storage magazine for about half its length as it emerges from rollers 218 and 219. After the card has been completely analyzed and is moved out of the second card reading station by rollers 218, 219 so that the trailing edge of the card is completely free of the rollers 218, 219, the second card picker clutch engagement ensues. The stacker member 238 will contact its surface pushing it rearwardly into the storage magazine and at the same time projecting its leading edge against side wall 231. It will be noted that the stacking operation is effected concurrently with the time that a following new card is fed by the card pusher to reading station No. 1, and a preceding card, if any, to station No. 2. The stacker cam 238 holds the stack away from the plane of card travel to allow the next incoming card to half enter the stacker magazine. The above type of stacker takes care of cards which have been warped and by friction means positively shifts the card to proper position in the stacker and against the stacked cards. The cards are stacked in the same order that they are inserted in the supply magazine.

ELECTRICAL CONTACTS ASSOCIATED WITH THE CARD FEEDING AND READING UNIT

There are electrical contacts associated with the card reading and feeding unit which have functions to be described in connection with the circuit diagram. It will be well to understand, at this time, their manner of operation. Circuit breaker contacts 506 (see Fig. 6) are the transfer type of contacts and are operated by a dentated gear 240 (see Fig. 8) which is an integral part of the bevel gear 68. For each column spacing of the card contacts 506 transfer.

Contacts 505 (Fig. 6) are also transfer contacts and are actuated by an arm 241 which is an integral part of the side plate 177. These contacts also transfer during the time that the card is being spaced and come to normal at the termination of the card spacing operation.

Reference numeral 242 in Fig. 2 represents contacts which are closed as long as there are cards in the magazine 25. By means of a pin 243 which abuts a resilient blade of the contacts 242 and passes through a hole in the front wall plate 26 to be actuated by the foremost card in the magazine, contacts 242 remain closed. Upon feeding of the last card out of the magazine contacts 242 open because at this time pin 243 registers with a hole in the follower plate 29.

At the second card reading station there is provided a conventional card lever 245 (Fig. 27*a*) which is engaged by the card at point 93 of a preceding card cycle to point 84 of the card cycle (see Fig. 23*b*) in which a card is read at such station to thereby close card lever contacts 515.

Figure 27A:
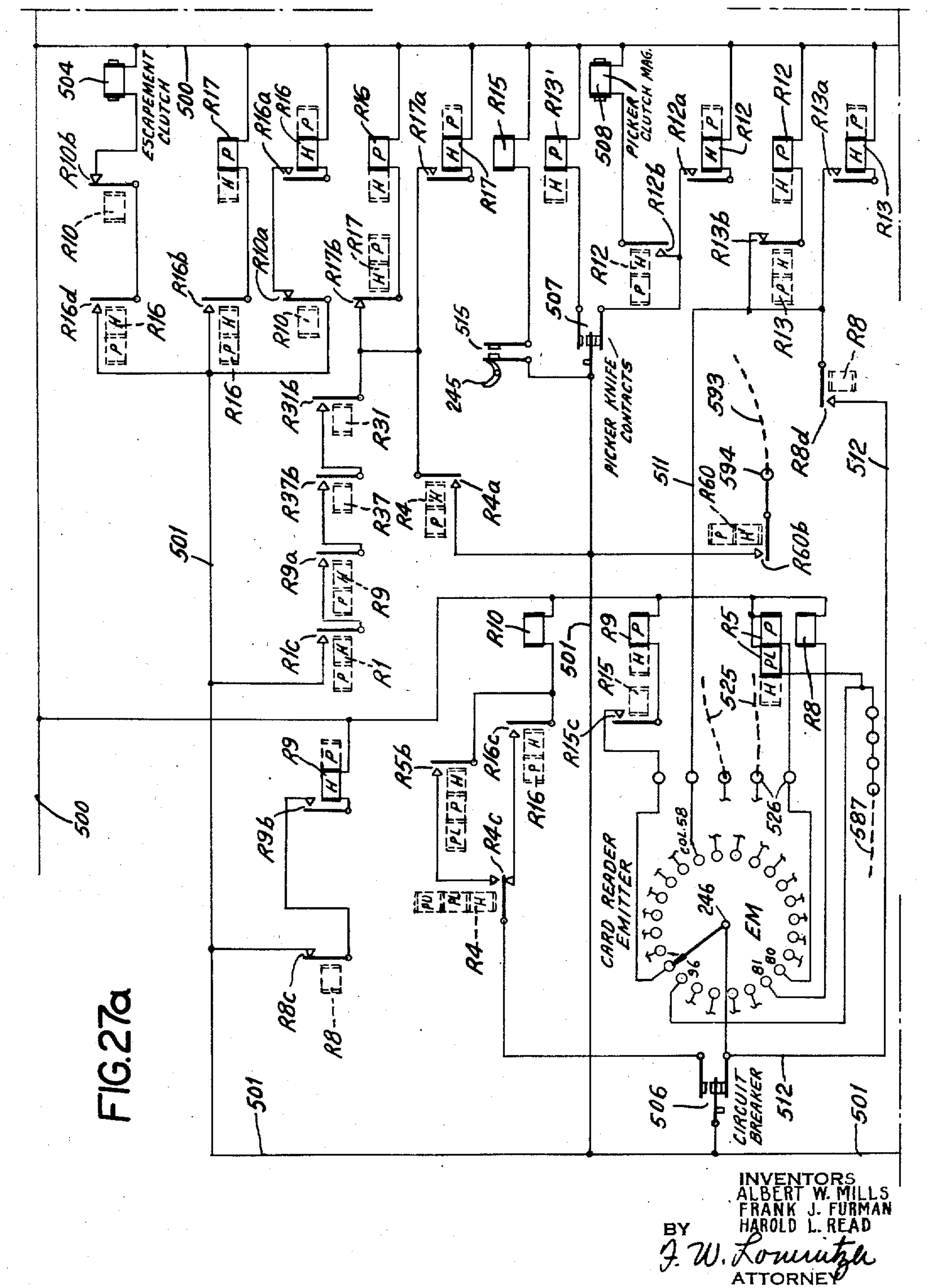
Figure 27B:
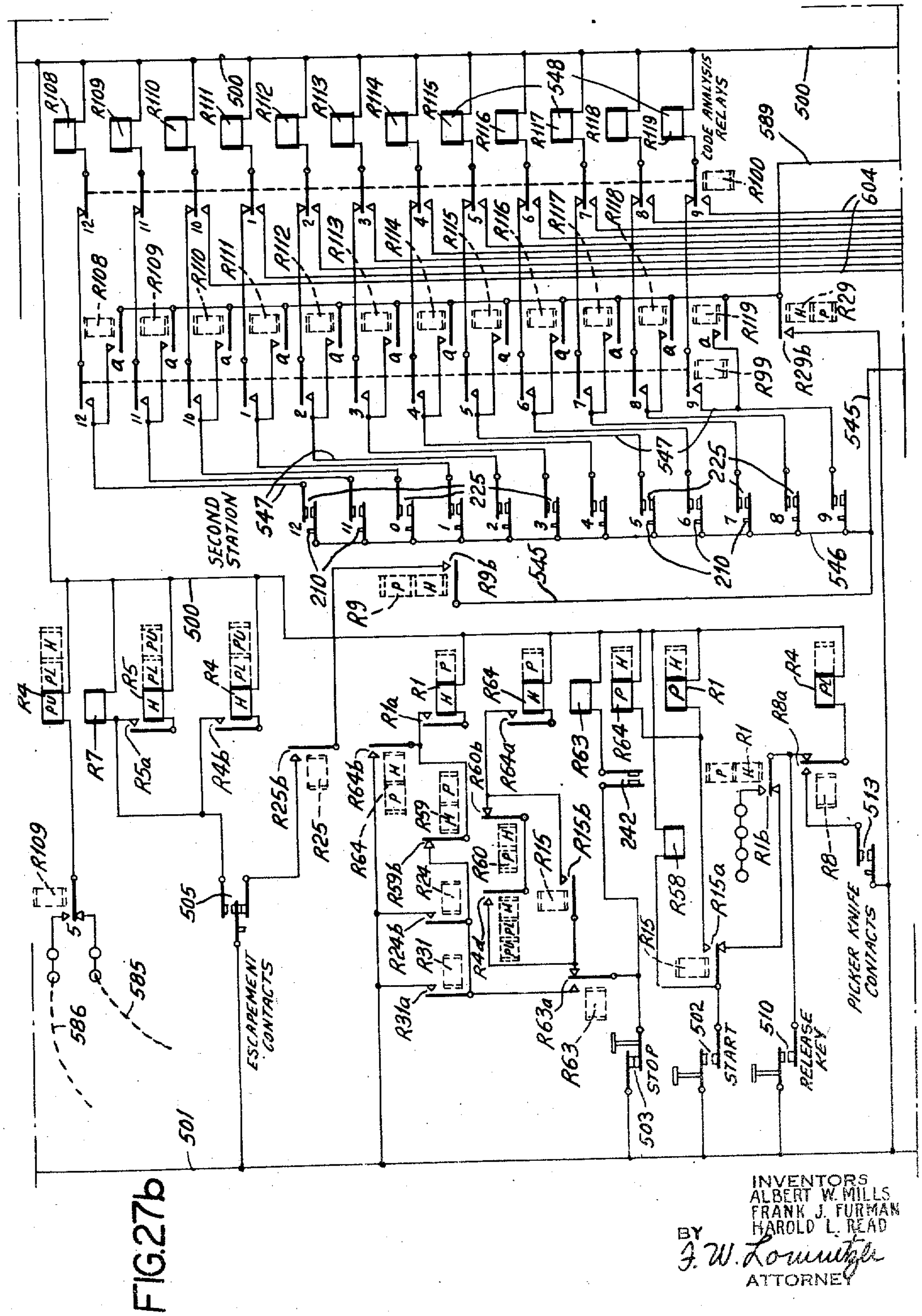
Figure 27C:
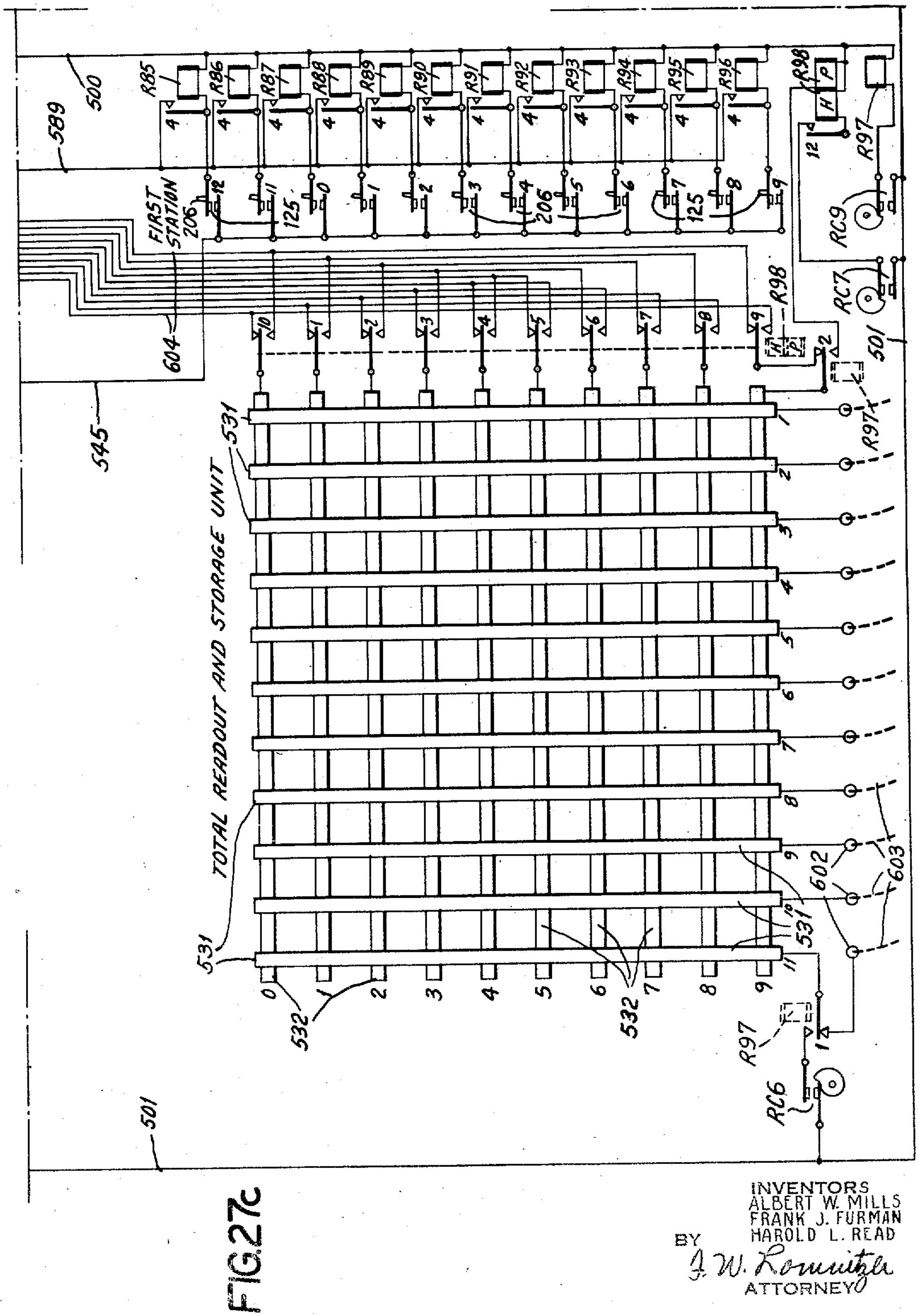

Operable during the time that the card feed clutch is engaged the first and second time, cam contacts 507 and 513 are operated by the drive shaft 77 (see Figs. 2 and 3). As shown in Fig. 27*a* contacts 507 are transfer contacts whereas, as shown in Fig. 27*b*, contacts 513 consist of a set of normally open contacts.

To time the operations of the reading unit so that different functions can be performed at times which are timed with the analysis of the card, there is provided an emitter EM (see Fig. 2) which is of a conventional structure consisting, as is well known in the art, of a common conducting ring and a wiper which contacts in succession ninety-six insulated contact points. The brush of this emitter is driven by a shaft 246 (Figs. 2, 5 and 6) which, as shown in Fig. 5, is the shaft to which the gear 186 is secured. For each card reading cycle a complete revolution of the gear 186 and shaft 246 is effected, each cycle consisting of ninety-six points, as shown in the timing diagram of Figs. 23*a* and 23*b*. From cycle point 1 to 80 there is analysis of the eighty card columns in succession, and for the remaining points certain functions are performed, some of which have already been described. The main elements of the emitter are shown in Fig. 27*a* in diagrammatic representation and the function of this emitter EM will be better understood as the operation of the machine is described in connection with the wiring diagram.

ACCUMULATOR ENTRY AND TOTAL REPRESENTING READOUT AND STORAGE UNIT

This unit is shown in Figs. 9–20 and comprises a separately operated unit which includes means for entering items additively or subtractively into a plurality of selected accumulators, with associated means for storing a total and reading out a total from the desired accumulators. The total derived from any accumulator may be in the form of a grand total, that is, a total with a reset, or a progressive or subtotal which is a total without an accompanying reset.

MAIN DRIVE FOR ACCUMULATOR UNIT

This unit is operated by an independent motor, the armature of which continually rotates a shaft 250 (Fig. 9).

Secured to shaft 250 is a clutch disk 251 (Figs. 9 and 10) having a clutch notch 252 which is engaged by a clutch tooth 254 of a clutch pawl 255 pivoted at 256 on an arm 257 secured to the driven shaft 258. The clutch pawl 255 is urged by a spring 259 to cause its tooth 254 to engage the clutch notch 252 but the arm 257 is restrained by the armature 260 which is attracted by the main clutch magnet 261 when it is energized. The above parts constitute the main elements of a conventional one-revolution clutch so that for each energization of the clutch magnets 261 clutch arm 257 and driven shaft 258 will be given a clockwise rotation of a full revolution. Shaft 258 is journaled in side frames 262, 263 and inside of frame 262 there is attached to shaft 258 a gear 264 which, through an idler gear 265, drives a gear 266 and a shaft 267 to which gear 266 is secured in the arrow direction of Fig. 10. Idler gear 265 through idler gear 268 drives a gear 269 secured to the drive shaft 270, which carries a series of cams to close and open cam contacts having the designation RC (see also Fig. 11*a*). As will be explained, in connection with the circuit diagram, the clutch just described is engaged each time an additive or subtractive entry is to be effected, and also for a total taking operation.

The unit also includes a series of cam contacts which are being continually opened and closed and are designated as the CR cam contacts. The gear drive for driving the cams thereof is shown in Figs. 9 and 10 and consists of a gear 271 secured to drive shaft 250 which, through an idler gear 272, meshes with a gear 273 secured to a shaft 274 which carries the cams for controlling the CR cam contacts.

TOTAL READOUT CLUTCH

There is also provided a separate electromechanical total readout clutch of a conventional type but the input thereof is controlled by the clutched output of the main clutch just described so that the total readout operation cannot be effected unless the main clutch is engaged to actuate certain parts necessary in the total readout operation. To this end there is attached to the driven shaft 258 a clutch disk 275 adjacent the gear 264 (see Fig. 10). The clutch pawl 276 is pivoted on an arm 277 secured to a sleeve 278 loosely encircling the shaft 258. The engagement of clutch pawl 276 with the notch of clutch disk 275 is controlled by an armature 279 of the total readout clutch magnet 280. Upon energization of the magnet 280 the clutch pawl 276 engages the clutch disk 275 and rotates arm 277 and sleeve 278 a complete revolution. The sleeve 278 carries cams which operate means to effect a total readout operation.

ACCUMULATOR OPERATING MECHANISM

When the main clutch magnet 261 is energized and the clutch engaged an accumulator operating mechanism operates in a timed relationship with the readout of the digital representation in an electrical translator circuit arrangement to be later described. For actuating the accumulator wheels there is provided a series of racks 290 (Figs. 11 and 11a) which are guided by guide bars 291 and 292 for reciprocating movement. Each of the rack bars 290 (Fig. 11) is provided with rack teeth at each side so as to actuate the selected accumulator, of which there are five in number in the present machine. Loosely pivoted on a rock shaft 293 (Fig. 11a) is a plurality of arms 294, one for each rack and having a respective link connection 295 to the bottom of each rack. Attached to the rock shaft 293 is a bail which consists of a pair of side arms 296 and a transverse rod 297 which overlies the series of rack supporting arms 294. To said rock shaft 293 there is secured follower arms 298 cooperating with complementary cams 299 (see also Fig. 9) secured to drive shaft 267. Each of the arms 294 and, therefore, the racks 290 are urged upwardly by means of tensioned springs 300. Referring to the timing diagram of Fig. 22 the cams 299 are so designed that between 30 and 180° of the cycle the bail 296—297 is moved upwardly so that racks 290 may take a number of different digit positions, the digit positions being determined by the time at which each rack 290 is stopped in a manner to be described. After the racks take their upward differential positions the cams 299 are effective to restore the bail 296—297 downwardly and by coaction with the arms 294 the racks 290 are positively restored to lower normal position to enter an amount in a selected accumulator.

For each denominational order there is provided magnets 301 which are energized at differential times so as to attract a duplex armature 302 and free it from a tail 303 of a stop pawl 304 which is loosely pivoted on a rod 305. When said stop pawl is freed by the attracted armature 302 it will be rocked counterclockwise by its spring 306 so that a tail 307 will engage one of a series of stop teeth 308 formed at the lower end of each rack 290. When each pawl 304 stops the rack 290 the rack will be held in such position by the spring 300, the bail rod 297 continuing upwardly, if other racks 290 are to be positioned higher.

In the event that the duplex armature 302 may stick to the armature cores due to residual magnetism therein there is provided a knockoff bail 310 which is loosely pivoted on a rock shaft 311. Also for restoring the released pawls 304 there is provided a bail 312 which is loosely mounted on the rod 305 (see also Fig. 14). Bails 310 and 312 are actuated in timed operation by the operating mechanism shown in Fig. 14 wherein, it will be seen that complementary cams 315 secured to the drive shaft 267 operate upon follower arms 316 secured to a rock shaft 317. To rock shaft 317 there is secured an arm 318 having a link connection 319 to an arm 320 which is an extension of one side arm of the knockoff bail 310.

The linkage connection for operating bail 312 is best shown in Fig. 14 wherein it will be seen that secured to the rock shaft 317 is an arm 325 which has a link connection 326 to an arm 327 which is pivoted on a stud 328. Arm 329 is part of the arm 327 and the latter has a link connection 330 to an arm 331 which is an extension of one side arm of bail 312.

Referring to the timing diagram of Fig. 22, after the racks have received their differential position, cams 315, through the linkage connection just described, will move bail 310 to the right between 235 and 250° of the machine cycle and by contact with armatures 302 which have not been moved to normal position by their springs such armatures will be positively restored to such normal position. Bail 310 is moved to the left in the early part of the cycle between 0 and 45° so as not to interfere with the attraction of the armatures 302. The stop pawls 304 are engaged by the common bail 312 after 225° of the machine cycle and are positively rocked clockwise so as to be relatched by the armatures 302 which have been moved to such position that they can relatch the stop pawls 304. Bail 312 is also lowered during the early part of the cycle between 0–20° so as to permit the release of the latch pawls 304 to control the differential position of the actuating racks 290.

The construction of each accumulator and its engaging mechanism with the racks to perform various accounting operations is identical and the description will, therefore, be confined to one only, and that identified by the applied reference numerals in Figs. 11, 12, 16 and 17. In general construction, the accumulator is similar to that employed in bookkeeping machines known commercially and shown in detail in the patent to H. Hopkins, No. 1,336,904.

Each accumulator consists of a single unitary structure comprising side frames 335 and 336 which are tied together by various cross members to provide a rigid framework. The cross members consist in part of a spring holding plate 337, a bottom transverse plate 338 and a rod 339, as well as other cross members to be referred to as the description progresses. Shaft 340 carried by side plates 335, 336 also supports the accumulator and has its bearings in the side frame plate 263 and an intermediate frame plate 341. On shaft 340 there is mounted arms 343 and 344 carrying a cross rod 346 on which is rotatably mounted the series of accumulator wheels 347 for the different denominational orders. The side frames 343 and 344 are also tied together by cross rods 348 and 349. The accumulator wheel carrying frame 343, 344, 346 is normally disposed so that the accumulator wheels 347 carried thereby are in engagement with the teeth of units carry segment racks 350. It is by rocking of the accumulator frame 343 about the shaft 340 in a clockwise direction that the accumulator wheels 347 are demeshed from the units carry segments 350 and placed into mesh with the teeth of the racks 290. By timing the engagement and disengagement of the racks 290 with the wheels 347 various accounting operations may be effected, such as; addition, subtraction by the complemental process (which is another form of addition); grand totaling, that is a total with a reset; or a progressive or subtotal which is a total taking operation without a reset. For total taking operations the accumulator wheels 347 are meshed with the racks 290 before they go to their extreme upward positions under control of the accumulator wheels, and in accordance with the digit position thereof the racks 290 will take commensurate total digit representing positions. For clearing out the totalizer the accumulator wheels are then demeshed from the racks 290 and the racks 290 move downwardly independently of the wheels to normal position, thus taking a grand total from the accumulator. For a subtotal or progressive total the accumulator wheels 347 are not disengaged as in taking a grand total but are retained in engagement with the racks 290 and the latter moved downwardly to re-enter the cleared-out amount in the accumulator wheels.

For addition, the racks 290 first take their upward differential positions and then the accumulator wheels 347 are enmeshed with the racks and the latter are moved downwardly to thereby enter the amount in the accumulator. The position of the totalizer wheels 247 to effect these accounting operations is jointly under control of a bar 352 and a magnet 353. Bar 352 is invariably reciprocated for each cycle of operation whether addition or total taking and by its joint cooperation with the magnet 353, which may receive impulses at three different times, the different accounting operations are carried out. There will be first explained the manner in which amounts are entered in the machine whether they are true numbers for addition or complements of true numbers for subtraction.

Accumulator Engagement for Additive Entry Operations or Complemental Addition Operations In either type of accounting operation the racks 290 rise to their differential digit positions which are completed at 180°. During this differential positioning of the racks there is an idle up-and-down movement of the control bar 352 but for addition it should be noted that between 200° and 210° the bar 352 is in the normal position shown in Fig. 12 and the wheels 347 are still in mesh with the units carry segments 350. Attached to the rock shaft 340 of the accumulator now being described there is a double arm 360 (Figs. 12 and 17) having a tail portion 361 overlying but slightly above the armature 354 of the control magnet 353. The left-hand tail 362 of the double arm 360 normally underlies a lug 363 of an operating member 364 which is pivoted at 365 on the control bar 352. A spring 366 attached to the tail portion 361 of the double arm 360 normally maintains the tail 362 underneath a lug 363 and the operating member 364 is maintained in its normal position with lug 363 over tail 362 by a spring 368 which rocks it against a stud 367 carried by the control bar 352. Just prior to the time that the control bar 352 is moved upwardly by means to be described between 210° and 228° the control magnet 353 is energized by circuit means to be described in connection with the wiring diagram, moving the extremity of the armature 354 away from the tail 361 of the double arm 360. Thereafter as the control bar 352 moves upwardly between 210° and 228° there will now be an unrestrained action of spring 366 to rock the double arm clockwise and rock shaft 340 in the same direction to mesh the accumulator wheels 347 with racks 290. This engagement is maintained during the time that the racks 290 are lowered between 248° to 325°, causing the racks 290 to turn the accumulator wheels 340 to enter the digit amounts represented on the racks. Thereafter between 322° and 341° the control bar 352 is moved downwardly and by a reverse operation of the parts, the accumulator wheels 347 are demeshed from racks 290. In this case lug 363 over tail 362 rocks double arm 360 counterclockwise to be relatched by armature 354. It is pointed out that during the time that the double arm 360 rocks clockwise to effect an accumulator engagement the magnet 353 is maintained energized but is deenergized when arm 360 is rocked counterclockwise.

The means for operating the bar 352 is shown in Figs. 9 and 12a and consists of complementary cams 370 secured to drive shaft 258 and which operate on a follower bell crank 371 having a bell crank 372 connected thereto, which in turn has a link connection 373 to the control bar 352. Control bar 352 is suitably guided for its reciprocating movement outside of frame plate 263 and, of course, is common to the five accumulators so that by duplicate arrangement of parts accumulator control may be effected in the same manner, depending upon which particular magnet 353 is energized.

Grand Total Taking Operations

Total taking operations, either grand or subtotal, are under control of the control magnet 353 of a selected accumulator and the control bar 352. For either type of total taking, by circuit means to be later described the control magnet 353 is energized and during this time, between 10° and 26° as shown in the timing diagram of Fig. 22, the bar 352 is positively moved upward enabling the arm 360 associated with the selected accumulator to rock clockwise to enmesh the totalizer pinions 347 with the racks 290 prior to their upward movement. Thereafter, between 30° and 180° of the cycle the racks 290 move upwardly, rotating the totalizer pinions in a counterclockwise direction until a transfer tooth 375 (Fig. 14) strikes an associated carry control member 376, thus terminating the upward movement of the rack 290 and transferring the digit representation on each wheel to the associated rack 290. If 3 was represented on an accumulator wheel the rack 290 would move upwardly three steps, and in a corresponding manner proportionally for each of the other digit representations on the wheel. The bail frame 296, 297 (Fig. 11*a*) continues to move upwardly to its extreme position. Between 178° to 210° the control bar 352 is moved downwardly, thus rocking the member 360 in a counterclockwise direction to demesh the accumulator wheels 347 from racks 290 so that the latter may be restored downwardly to normal position, leaving the accumulator wheels cleared out or reset to 0, which constitutes the taking of a grand total.

During the time that the accumulator wheels 347 are demeshed from the racks 290 to engage the units carry segments 350 the racks 290 are locked in their differential positions, otherwise they would spring up by the action of their springs 300. The means for locking each of the racks 290 comprises a series of pawls 380 (Fig. 11) which are urged by springs 381 to engage the ratchet teeth 306 but are normally prevented by a bail 382 underlying the tails 383 of said lock pawls 380. Referring to Fig. 15 it will be seen that one side arm of bail 382 has an extension 385 which has a link connection 386 to a follower arm 387 pivoted on shaft 317 and carrying the usual follower roller cooperating with a cam 388 secured to drive shaft 258. Referring to the timing diagram it will be seen that the bail 382 is moved downwardly between 171° to 191°, allowing the pawls 380 to engage the racks to prevent their upward movement during the time that the accumulator wheels are demeshed from the racks. Thereafter between 248° to 325° the racks 290 are lowered to normal position. Thus, the total represented on a selected accumulator is transferred to the racks and the accumulator is zeroized.

Progressive or Subtotal Taking Operations

This type of total taking operation is similar to a grand total taking operation except that instead of demeshing the accumulator wheels 347 from racks 290 between 178° and 200° the wheels remain in mesh to re-enter the amount cleared out of the accumulator and transferred to racks 290. In the manner described for grand total taking operations, the wheels are first enmeshed with the racks, the latter moved upwardly to transfer the digit representation on the racks to the wheels but at 174° of the machine cycle by circuit means to be described an impulse is transmitted to the magnet 353. At this time bar 352 is in its extreme upward position, the double arm 360 has been rocked counterclockwise to mesh accumulator wheels 347 with the racks 290, and bar 352 is ready to move downwardly to demesh the accumulator. However, the energization of control magnet 353 performs the following function:

Pivoted on a stud 389 (Fig. 12) carried by a bracket 390 is an arm 391 which has a link connection 392 to the armature 354 of magnet 353. The lower part of the arm 391 has a lug 394. Understanding now that at this time lug 363 is still over the tail 362 of double arm 360 and the control bar 352 is in its extreme upward position, and also a tail 395 of the control member 364 is positioned above the lug 394, it will be seen that energization of magnet 353 will move the link 392 to the right, rocking arm 391 so that its lug 394 is directly under the tail 395. This condition of the parts is effected just before the time that the bar 352 starts to move down. When its downward movement commences tail 395, being over the lug 394, will cause control member 364 to rock counterclockwise, disengaging the lug 363 from the tail 362 so that the control member 364 cannot rock the double arm 360 counterclockwise to demesh the accumulator. Thus, the accumulator remains in mesh with the differentially positioned racks and thereafter the racks are moved downwardly to re-enter the amount into the accumulator.

In the next upward movement of bar 352 between 210° and 228° magnet 353 will have been deenergized allowing armature 354 to come to normal to rock arm 391 to disengage its lug 394 from the tail 395. As the bar 352 moves up, the lug 363 on control member 364 will engage the inclined edge 396 of tail 362, thus camming control member 364 counterclockwise until lug 363 clears the tail 362. Control member 364 is now rocked by spring 368 so that lug 363 is now positioned over tail 362 of the now clockwise rocked double arm 360. Between 332° and 341° the bar 352 moves down, and thus control member 364 rocks the double arm 360 counterclockwise and moves the accumulator wheels 347 out of mesh with the rocks.

The means whereby the total representation in an accumulator is utilized and recorded on the sheet in the typewriter will be described in connection with the wiring diagram.

Units Carry Devices

The units carry devices for each accumulator are of the spring-operated type operable to effect transfers after the racks 290 have been restored and the wheels 347 are returned in mesh with the units carry segments 350. The units carry mechanism will best be understood with particular reference to Figs. 12, 13, 16, 17 and the timing diagram of Fig. 22. The units carry segments 350 which have been unlatched are restored between 228° and 248° of the cycle before the next entry is effected by the following described means:

Each double arm 360 is provided with a tail portion 400 (Fig. 12) which rests against a lug 401 of a latch arm 402 (see Fig. 13) which is pivoted on a stud 403 carried by the free end of an arm 404 which is secured to a rock shaft 405 (see Figs. 12 and 17). A spring 406 urges the latch arm 402 so that a tail portion strikes a stud 407 on arm 404 to normally hold the lug 401 out of engagement with a notch 408 of the carry control bar 409. Thus, whenever the accumulator wheels of a selected accumulator are enmeshed with the racks 290 the tail portion 404 will engage the lug 401 and position it in the notch 408, thereby connecting the carry control bar 409 and the arm 404 of the accumulator to be operated.

Secured to the drive shaft 258 are complementary cams 410 (Fig. 13) cooperating with a roller carried by a follower bell crank 411 which is articulated to a bell crank 412, which has a link connection 413 to the carry control bar 409. The timing of the carry control cams 410 is shown in Fig. 22. It is evident then that with the connection between the control bar 409 and an arm 404 having been made, cams 410 will rock shaft 405 in a counterclockwise direction (see Fig. 16) between 228°–248°. Secured to the rock shaft 405 of each accumulator is a pair of arms 415 carrying a transverse restoring rod 416, it being observed that by this counterclockwise movement of shaft 405 rod 416 moves from the dotted line position to the full line or left-hand position shown in Fig. 16, to restore, as will be evident later, the units carry segments 350 which have been unlatched for a units carry.

Whenever an accumulator wheel 347 of lower denominational order passes from 9 to 0 in a counterclockwise direction in Fig. 16 the aforementioned lateral tooth 375 will engage the beveled edge 417 of the carry control member 376 and thus rock it clockwise about the pivot rod 349. Said control member carries a pin 418 underlying an arm 419 of a latch member 420 pivoted on the rod 339. The cooperation between the extension 419 of the latch 420 with pin 418 is maintained by a spring 421. The vertical portion of the latch 420 has a lug 422 which is adapted to be engaged by a shoulder 432 of an auxiliary latch 424 which is pivoted at 425 on the units carry segment 350 of the next higher denominational order. Each segment 350 is normally urged upwardly by the action of a spring 426 but is restrained by the edge 427 abutting the lug 422 of latch 420. The auxiliary latch 424 is urged to rest on the lug 422 by means of a spring 428.

Recalling now that the restoring rod 416 is in the full line position shown in Fig. 16 during the time the accumulator wheels are rotating counterclockwise, it will be seen that rod 416 abuts extensions 429 of the units carry segments 350 so as to prevent, if unlatched, their movement by springs 426 to effect units carry operations until required. It will also be evident that the rocking of carry control member 376, when a wheel passes from 9 to 0, will rock latch 420 clockwise, disengaging its lug 422 from surface 427 and allowing spring 428 to rock the auxiliary latch 424 so that said lug 422 is engaged by the shoulder 423. The lug 422 is now latched in such position that it is over a recess 430 in the units carry segment 350 of the next higher denominational order but movement of the segment 350 by spring 426 is still restrained by the rod 416.

Thus, it is evident that during entering operations a lower order wheel will unlatch the carry segment 350 of the next higher denominational order which occurs between 248° and 325° when racks 290 are being lowered. Beginning at 301° and while the accumulator wheels are still in mesh with racks 290 there will be a slight movement of rod 416 to the right, terminating at 310° which is merely for the purpose of giving relatching clearance in associated parts of the units carry mechanism. However, after the accumulator wheels 347 have ben enmeshed with the units carry segments 350, there is a further movement of the rod 416 to the right to the dotted line position shown in Fig. 16 which allows the extensions 429 to follow movement of the rod 416 so that the unlatched units carry segments 350 are rocked by their springs 426 clockwise, and being in mesh with the associated accumulator wheel 347 will rotate the wheel one step in a counterclockwise direction, the same as in adding, to effect the units carry.

During the upward movement of each segment 350, a projection 435 thereof will strike the lower edge of the auxiliary latch 424, rocking it clockwise to disengage the shoulder 423 from the lug 422, spring 421 now being effective to rock the latch 420 so that its lug 422 will be caught under the auxiliary latch 424, as shown in Fig. 16.

Obviously, if some lower order wheel passes from 9–0 as a result of its carry it will, during this time, unlatch the carry segment 350 of the next higher denominational order and the latter will be immediately rocked by its spring 426 to effect the units carry, thus accomplishing carries by carries. With sixteen accumulator wheels for each accumulator the carry operations begin at the latter part of the machine cycle and carry over to the next cycle but will be completed at 15° of this next cycle.

It is obvious then as a result of units carry operations some of the segments 350 will be unlatched and they are restored to latching position by movement of the rod 416 to the left or full line position shown in Fig. 16. This occurs, as previously described, after the wheels 347 have been demeshed from the units carry segments 350 between 228° to 248°. Rod 416 engaging the extensions 429 will rock segments 350 downwardly to normal position shown in Fig. 16.

Observations in Connection With Units Carries

With the exception to be presently noted unit carries are effected in the same way when amounts are subtractively entered. It should also be noted that due to the fact that the accumulator wheels 347 are retained in engagement with the racks 290 during subtotal taking operations this will cause the latch 402 to connect the control bar 409 with the rock shaft 405 so that said shaft will be reciprocated in the same manner as occurs in entering operations. However, in subtotal taking operations the accumulator wheels do not go from 9 to 0 in an adding direction so that no carry segments 350 are unlatched. Therefore, the rocking of bail 416 will be merely an idle one in such operations.

It will also be noted that the control bar 409 is common to the plurality of totalizer units.

As previously intimated, subtraction is effected by adding the 9 complements of each of the digits representing the subtracted amounts including the columns to the left. It is, of course, well known in accounting operations that when the extreme left-hand highest order accumulator wheel passes from 9–0 there should be a units carry into the units order wheel. This arrangement is not shown herein since it is well known and comprises connections from the highest order wheel so that when said wheel goes from 9 to 0 it will unlatch the units carry segment 350 associated with the units denominational order. Thus, this order will be complemented to 10 instead of a complement to 9 of the digit entered in such order.

Total Readout and Storage Unit

This device comprises an arrangement for sensing the digit representing displacement of racks 290 derived under control of the wheels when taking a total and storing such digit representation into an electrical readout device of the storage type. Storing total digit representations in this electrical readout and storage unit enables the digit representations to be read out denomination column by denominational column for successive digit recording effected herein by the typewriter, or which may comprise a card punching machine. This arrangement will be described, particularly in connection with Figs. 11*a*, 18, 19, and 20 and the timing diagram in Fig. 22.

It will be recalled that a separate magnetically controlled clutch driven through the main clutch of the accumulator unit controls the setup of the total readout unit and a feature of the present machine is that by selective engagement of this clutch at desired times a total stored in the readout unit may be obtained and held until used at some later time and in the meantime additive and subtractive entries may be made in the same or another accumulator. The magnetically controlled clutch when engaged drives sleeve 278 (Figs. 10 and 11*a*) partly through one machine cycle and finished in the next cycle. As shown in Fig. 22, the total readout unit clutch is engaged at about 162° so that sleeve 278 is given a full revolultion during successive machine cycles to effect functions now to be described.

The total readout unit comprises side frames 451 and 452 (see Figs. 18 and 20) which are cross connected by members, such as a guide plate 453, a guide plate 454, and a block 455 of insulating material. This complete assembly carrying parts to be described is slidably mounted in the side frames 341 and 263 by any suitable means and which may comprise blocks 458 sliding in slots 459 of the associated side frames 341 and 263. Normally this unit is in the position shown in Fig. 11*a* and is moved as a unit by a straight line motion in and out with respect to the racks 290. For each denominational column there is provided a series of ten plungers 460 which have the digit representations 0, 1–9, as indicated in Figs. 11*a* and 18. Each of these plungers is slidably mounted in the guide plates 453 and 454 and carry at their rear portion spring-urged contact pins 461 suitably guided in the related plunger 460 and having an encircled spring 462 by means of which each contact pin 461 may be moved rearwardly to contact making position but whose spring 462 may be compressed, due to any over-travel of the reading unit. For each denominational column there is a vertically arranged metallic ribbon 531 which is adjacent the twelve contact pins 461 of the related denominational column. This ribbon is held by a screw 465 at its upper end and a spring 466 connected at its lower end keeps the metal ribbon 531 in taut condition. Each ribbon 531 is, of course, insulated from each adjacent one. For holding each plunger 460 which is pushed inwardly in the unit by means to be described there is provided a detent plate 470 which plate is common to all the sets of plungers 460 as shown in Fig. 18. The detent plate 470 is urged downwardly by a pair of springs 471 (see Fig. 18). When a plunger is moved inwardly of the unit, a cam rise 472 (Fig. 19) thereof will elevate the detent plate 470 upwardly against the tension of springs 471 until the cam portion is past the detent plate so that the latter registers with a notch 473 in each plunger. Detent plate 470 is now urged downward by its springs 471 and will hold the plunger which has been pressed inwardly in latched position.

Referring to Fig. 11a, it will be seen that each of the racks 290 is provided with a projection 475 and according to the differential position taken by the rack in a total taking operation, the projection 475 will be disposed over the plunger 460 of the corresponding digit position. For example, if the total digit representation is 0 there will be no upward movement of rack 290 and projection 475 will be over the 0 plunger 460 of the related column. If the rack 290 moves upwardly two steps, it will be disposed over plunger 460—2. Thus, as the readout unit is moved towards the projections 475 one plunger in each denominational column will be moved inwardly of the unit and latched in position.

Embedded in the insulating block 455 is a series of inserted transverse digit representing bars 532. Thus, it is evident when a plunger is moved inwardly, effected by the movement of the readout unit towards the projections 475, contact pin 461 will move the ribbon 531 of the related denominational column against the digit contact strip 532 corresponding to the digit representation of the actuated plunger 460. This is effected because the compression spring 462 is strong enough to overcome the tension in the ribbon 531. Since the plungers 460 are retained in latched position by the detent plate 470, there is a continuity of contact between the actuated pin 461 in each demoninational column and the corresponding digit insert 532. This digit representation is retained until there is a subsequent cycle of operation of the readout unit because unlatching does not occur until the next cycle. The sequential operation of the readout unit will be best understood with reference to the timing diagram of Fig. 22. It will be recalled that the upward rise of the racks 290 to represent a total is completed at 165° and at about this time the total readout unit is moved to the left against the differentially disposed projections 475. This operating mechanism is best shown in Fig. 11a wherein it will be seen that complementary cams 480 secured to sleeve 278 actuate follower arms 481 secured to a rock shaft 482 whch has upstanding arms 483 having a suitable connection to the slidable readout unit. Just prior to the time that the readout unit is moved to the left to be set up, the detent plate 470 is raised upwardly so as to clear out the previous digit setting of plungers 460. This is accomplished by a cam 479 secured to the sleeve 278 which operates upon an arm 485 attached to a rock shaft 486, said rock shaft having a pair of arms 487 underlying the detent plate 470. This cam is effective so that about 181° the arms 487 will have lifted the detent plate 470 upwardly to unlatch the previously latched plungers 460. Therefore, as the readout unit is moved to the left by means of the cams 480, the plungers 460 will cooperate with the differentially disposed projections 470 so as to move them inwardly to be latched by the detent plate 470. At about 189°, the plungers representing the new total will have been set up and thereafter the cams 480 will move the readout unit to the right but the plungers will remain latched, and the total stored up.

It will be evident, therefore, that prior to setting latch plungers 460 to represent the new total the previous digit representation of said plungers is cleared out. The manner of reading out the digit representation on this unit will be later explained in connection with the circuit diagram.

TYPEWRITER

For listing the numerical or alphabetical data derived from the cards and typing totals derived from a selected accumulator a typewriter constructed as shown in Patents Nos. 1,777,055 and 1,873,512, which is now on the market and known commercially is preferably employed.

Figs. 24 and 25 illustrate and the following description describes only so much of this typewriter as is necessary to understand its operation and coordination with the rest of the apparatus.

Fig. 25 shows the keyboard of which the keys 440 are the alphabetic keys and 441 are the numeral keys and other functional keys are also shown, such as CR for carriage return, TAB for tabulating key, SP for space bar, special type for printing a period, asterisk, hyphen, a comma, credit symbol CR, which are principally used in connection with the present invention.

However, it should be noted that the key caps are not depressed but the key levers 443 of each of said alphabet and numeric keys, as well as the functional keys and the space bar SP are operated by solenoids 442 which rock key levers 443 just as if the keys were manually depressed. When a solenoid 442 is energized, the associated lever 443 rocks a latch lever 444 to unlatch a cam 446 which is moved by a spring-pressed lever against the periphery of a continuously rotating motor driven roller 447. The cam 445 is rotated by contact with the roller 447, causing the carrier 448 of the cam to rock in a direction which pulls down a link 449 which, through linkage 488, propels the type bar 489 carried by the basket 490 towards platen 491 to effect typing from the type denoted by the operated key. During the final increment of movement of the type bar 489 it strikes a universal bar which through linkage 492 actuates the escapement lever 493 for releasing the escapement mechanism to effect a carriage spacing movement. This is the operation which is effected for the typing keys.

Depression of the spacing bar SP similarly results in the downward movement of link 494 to operate linkage 492 for actuating the escapement lever 493 to effect a carriage or letter spacing movement.

The carriage return mechanism operated by key CR is of the type disclosed in Patent No. 1,955,614. As is usual the carriage return movement is accompanied by a line spacing operation. The tabulating mechanism operated by the key designated TAB is such as shown in Patent No. 1,935,436 and includes the usual settable tabular stops 497.

Each of the functional keys TAB, CR, and space bar SP are also automatically operated by energization of the associated solenoid 442. Thus, energization of the solenoid 442 results in an automatic operation of a key and the mechanism operated by the key whether it is a functional operation in the typewriter or a typing operation from the selective type. In the wiring diagram there is shown a series of solenoids 442 and a designation affixed to each solenoid designates the particular key which is operated upon its energization. In general, for the present invention the functional keys Space, TAB, CR, and the type keys 0–9, period, solenoid, asterisk, hyphen, and CR are operated this way.

The typewriter also includes a column readout which initiates, at selected column positions of the typewriter carriage, certain functions, or when plugged up initiates typing operations which may be either alphabetical or numerical data, or typing of totals from a selected accumulator at selected positions on the sheet in the typewriter carriage. By the latter readout control typing at selected places on the typewriter sheet is determined.

Figure 27D:
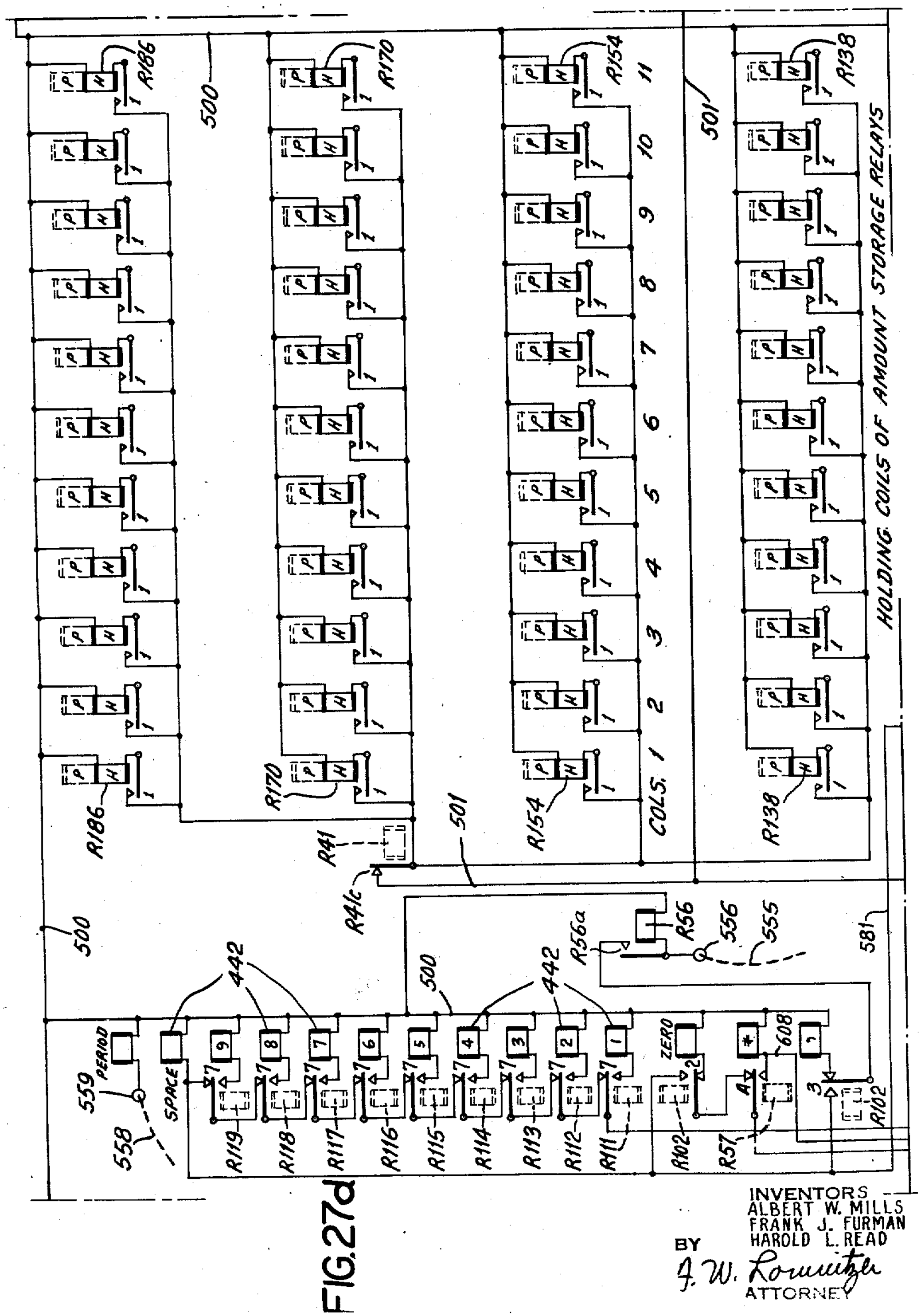
Figure 27E:
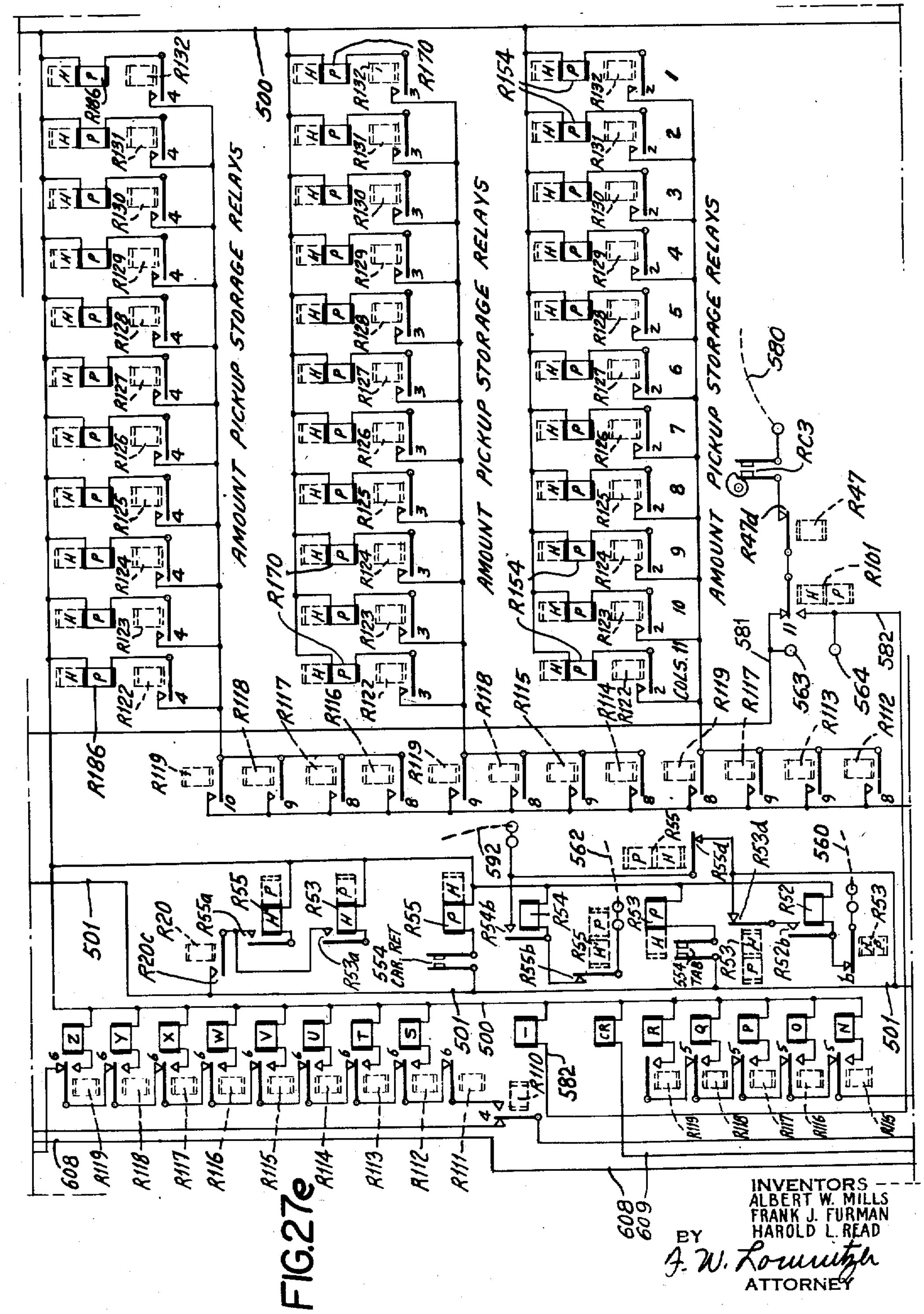
Figure 27F:
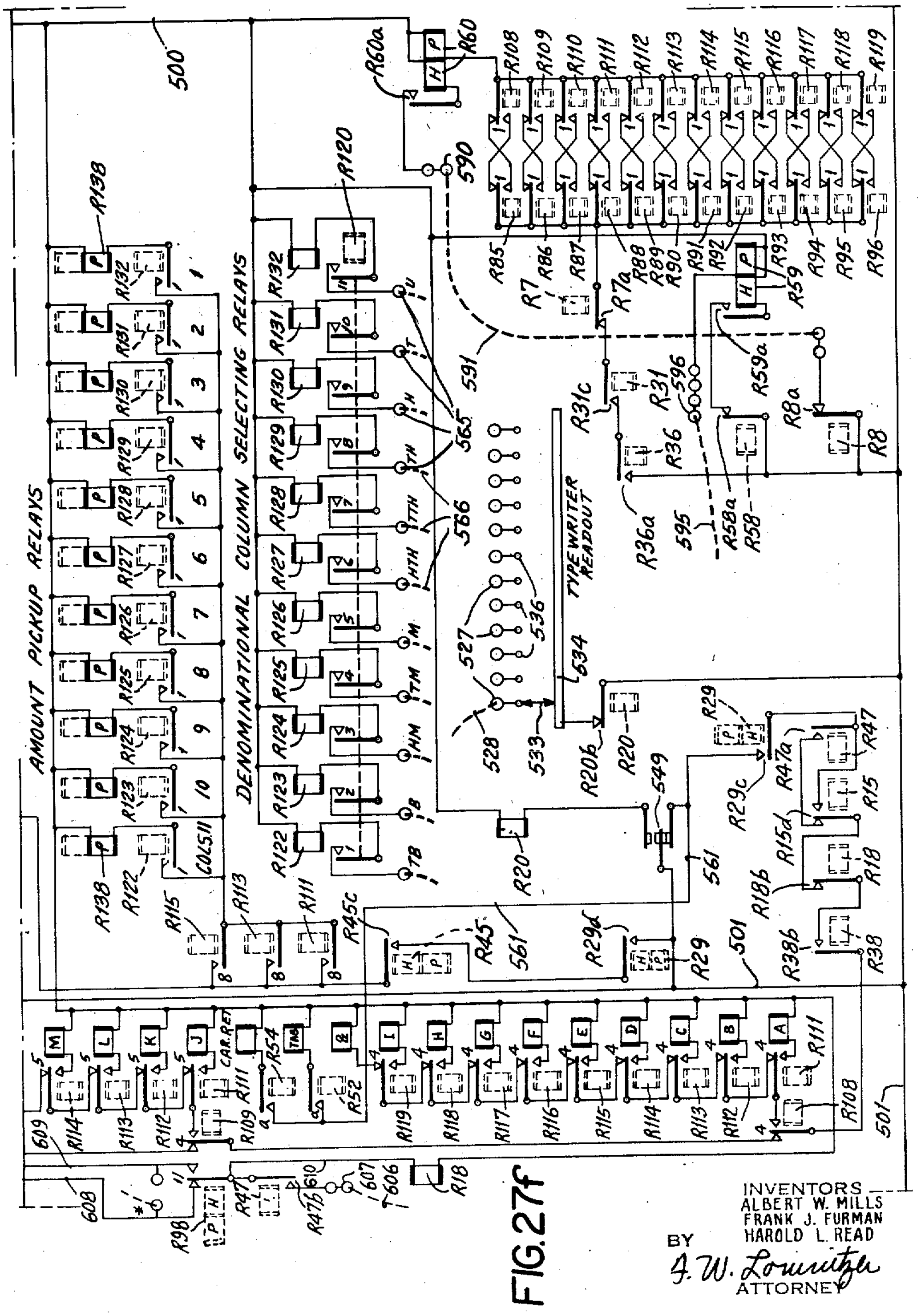

As best shown in Fig. 24 and also diagrammatically in the wiring diagram of Fig. 27*f*, said readout device comprises a movable contact element 533 engaging a stationary conductor strip 534 and in succession column contacts 536 carried by an insulating plate which is fixed relatively to the platen carriage. From the contacts 536 plug connections are made to initiate and control certain operations, as will be described in detail in connection with the wiring diagram.

When certain functions take place, such as printing the first significant digit in zero eliminating operations it is desirable to open contacts such as 552, and for functions, such as carriage return and tabulate, close contacts such as 554. These contacts are utilized in the circuit connections, as will be explained in connection with the circuit diagram. In Fig. 24 there is shown two of such contacts 552, 554 and their manner of operation when the related cam unit is engaged is obvious.

The escapement contacts 549 (Figs. 25*a* and 27*f*) are provided for the purpose of picking up a relay for breaking the circuit to the typewriter readout strip, and for other purposes which will be evident in the wiring diagram. These contacts are under control of the well known typewriter escapement mechanism, which is fully shown and described in the patent to C. W. Crumrine, No. 1,945,847, and comprises, as shown in Fig. 25*a*, a pair of pawls 516 cooperating with the escapement rack 517 on the platen carriage. The pawls have elongated slots in which fit a pivot rod 518 and a spring (not shown) tends to move the teeth over the rack or swing them into engagement. The operating arm 493 moves the pawl which engages the rack to release the carriage for movement by the spring drum until the rack engages the pawl to stop movement of the rack to end the latter space movement. A lug 520 carried by a bell crank 519 is in engagement with a notch 521 of both pawls. When a pawl 516 is rocked counterclockwise to release the rack 517 and move it to the left by said spring, the resiliency of the right-hand spring blade will rock bell crank 519 counterclockwise and contacts 549 thus open during the letter space movement of the carriage. When the pawl engages the rack, the pawl will again be shifted to the right by the movement of the rack, and by reversely rocking the bell crank 519 contacts 549 will be closed at the end of the letter space movement.

Circuit Diagram

The operation of the machine will now be described in connection with the circuit diagram of Figs. 27*a* to 27*k*. Before starting the machine it is assumed that the main line switch (not shown) is closed so that current will be supplied to the main lines 500 and 501, and also cards to control the machine are in the supply magazine 25. Furthermore, the main drive motor of the card reader and typewriter is operating and suitable plug connections, to be described as their need in the description is encountered, have been made and also the necessary tabulating and margin stops in the typewriter have been set. Thus, with all of these conditions, and others to be described, observed by the operator, the machine is initiated in operation for the first card reading cycle by depression of the start key to close contacts 502 (Fig. 27*b*).

1. *Read escapement clutch magnet circuit*

With the cards in the magazine a circuit is completed from line 501 through stop key contacts 503, hopper contacts 242, through R63 relay to line 500. The R63 relay transfers its R63*a* contacts to provide a hold circuit for R1H relay coil to be described later.

Depression of the start key completes a circuit from line 501, start key contacts 502, R15*a* transfer contacts now in normal position, R1*b* transfer contacts now normal, R8*a* transfer contacts now normal, to the R4PL coil to line 500. An alternative circuit to energize the R4PL coil is from line 501, contacts 510 closed by the depression of the read release key, R8*a* transfer contacts now in normal position, R4PL relay coil, to line 500. In either case, closure of the R4*a* relay contacts (Fig. 27*a*) completes a circuit from line 501, through R4*a* relay contacts, R17*b* relay contacts now closed, R16P relay coil to line 500. The R16P relay coil closes its hold contacts R16*a*, thus completing a hold circuit for R16H from line 500, through R16H relay coil, R16*a* relay contacts now closed, R10*a* relay contacts now closed, to line 500. R16 relay closes its R16*d* relay contacts, which complete a circuit from line 501 through R16*d* relay contacts, R10*b* relay contacts now closed, the escapement clutch magnet 504 (Fig. 27*a*), to line 500. It is thus evident that R16H relay coil and clutch magnet 504 are both dependent upon the R10 relay for their continued energization. As will be later explained, R10 relay coil is energized to open R10*a* and R10*b* relay contacts and near the end of an escapement or skip stop.

The energization of the clutch magnets 504 causes the clutch to engage and start the card feed by the feed rolls, although there is no card in either reading station.

When said clutch engages its armature, contacts 505 (Fig. 27*b*) transfer, thus completing a circuit from the line 501, through transferred contacts 505, R4*b* relay contacts now closed, since either the start key contacts 502 or read release contacts 510 are closed, thence through the R4H relay coil to line side 500. This holding circuit will be maintained until the end of an escapement or a skip.

When R16P relay coil energized it will close the R16*b* relay contacts (Fig. 27*a*) to energize the R17P relay coil through an obvious circuit. The latter relay coil closes R17*a* relay contacts, establishing a hold circuit for the R17H relay coil, through R17*a* relay contacts and R4*a* relay contacts back to line 501. R17 relay coil thus opens the R17*b* relay contacts to deenergize the R16P relay coil and thus open its energizing circuit through R4*a* relay contacts. This interlock circuit thus places R16H relay coil under control of R10a relay contacts for its continued energization. The R17H relay coil is, of course, maintained energized through R17a and the R4a relay contacts as just described.

2. *Energizing circuit for the picker clutch magnets 508*

The escapement clutch magnet 504 (Fig. 27a) remains continuously energized and the escapement clutch remains continuously engaged until cycle point 80 of the card reader emitter EM is reached. However, at column 58 position of this emitter a circuit is set up to indirectly cause the engagement of the picker clutch. The first circuit is from line 501, through escapement circuit breaker contacts 506 now in normal position, the switch arm and contact point of column 58 of the reader emitter, a wire 511 attached to such column contact point, R13b relay contacts now closed, R12P relay coil, to line 500. The latter relay coil closes its R12a relay contacts, providing a hold circuit through it and contacts 507. R12 relay coil closes the R12b relay contacts, and thus completes a circuit from line 501, through contacts 507 now normal, through R12b relay contacts, picker clutch magnet 508 to line side 500. This causes the picker clutch to engage and feed the first card downward to the pusher station.

Upon the engagement of the picker clutch, the contacts 507 are transferred so that a circuit is completed from line 501, through 507 contacts, through R13P relay coil, to line 500. If, for any reason, card feed should stop at column 58, a holding circuit would be completed through the reader emitter EM at such column position, the R13a relay contacts to the R13H relay coil, the latter thereupon opening the R13b relay contacts to prevent more than one impulse from being transmitted to the R12P relay coil. Thus, it is evident that the R13 relay coil is an interlock means to prevent possible misoperations in the machine.

When the switch arm of the column emitter EM reaches contact point 80 (Fig. 27a) a circuit is completed from line side 501, through escapement circuit breaker contacts 506, through the emitter at such contact position to the pickup coil of the R5P relay, to line side 500. The R5P relay coil closes the R5a relay contacts (Fig. 27b) and completes a holding circuit from the line side 501 through contacts 505 now transferred, R5a relay contacts, R5H relay coil, to line side 500. This holding circuit will be maintained until the escapement clutch latches up at the next contact point position 81 of the emitter.

There is an advancement of the card from column 80 position and during this time when the circuit breaker contacts 506 transfer (Fig. 27a), a circuit will be completed from line side 501, through contacts 506, the R4c relay contacts now transferred, R5b relay contacts now closed, the R10 relay coil to line side 500. Energization of the R10 relay coil opens the R10b relay contacts to deenergize the escapement clutch magnet 504, and opening of contacts R10a deenergizes the R16H relay coil. The card feed clutch is now disengaged and lateral card feed is terminated. When the emitter reaches contact point position 81, a circuit is completed from the line side 501, through contacts 506, the switch arm and contact for contact point position 81, R8 relay, to line side 500. Closure of the R8d contacts completes a circuit from line side 501 through contacts 506 now in normal position, wire 512, R8d relay contacts, R13b relay contacts now closed, R12P relay coil to line side 500. In the manner, by circuits previously described, the R12 relay coil causes the clutch magnet 508 to be energized and this second energization of the magnet causes the picker clutch to re-engage so that the card pusher will deliver the first card from the pusher station to the first reading station. During the early part of this operation, a circuit is completed from the line side 501, through picker knife contacts 513 now closed (Fig. 27b), R8a relay contacts now closed, the R4PL relay coil to line side 500. By the circuits previously described, as a result of the energization of the R4PL relay coil, R16 and R17 relay coils are energized and the energization of the R16 relay causes the escapement clutch magnet 504 to again be energized. This engagement will now feed the first card to correlate column 1 position of the card with the sensing pins 125.

At contact point position 95 of the emitter, a circuit is completed from line side 501, through circuit breaker contacts 506, the switch arm of the emitter in contact with contact point 96 of the emitter, the R5PL relay coil to line side 500. The holding circuit for the R5H relay coil is as previously described by the R5a relay contacts. This relay coil closes the R5B relay contacts to again energize the R10 relay coil which is again the instrumentality for deenergizing the R16P relay coil and clutch magnet 504, the latter causing the disengagement of the escapement clutch.

3. *Second read cycle*

The operator is then required for further automatic card feeding operations to redepress the start or read release keys and the above described circuit will again be operative so that the first card is fed step by step past the first set of reading pins 125 towards the pins 210 of the second reading station, while the second card is fed out from the magazine and conveyed to the first reading station. Near the end of this second card feeding cycle (or about contact point 93 of the emitter when card lever 245 closes contacts 515 (Fig. 27a) a circuit is completed from line side 501, through the second reading station card lever contacts 515, the R15 relay coil to line side 500. The R15 relay coil closes the R15c relay contacts, thus completing a circuit at about contact point position 1 of the emitter EM by a circuit from the line side 501, contacts 506, through said emitter, R15c relay contacts, R9P relay coil, to line side 500. R9 relay coil closes the R9b relay contacts to thus complete a circuit from the line side 501 through R8c relay contacts now closed, R9b relay contacts, the R9H relay coil to line side 500. Thus, it is evident that this holding circuit is maintained until contact point position 81 of the emitter is reached, at which time R8 relay coil is energized as previously described. The R9 relay coil closes the R9a (Fig. 27a) relay contacts to pick up the R16P relay coil and permit the column by column escapement of the card to take place under certain conditions as will be subsequently described. R9b relay contacts (Fig. 27b) close to render the pick up circuits under control of the sensing pins 210 effective, as will be more completely described later on. At this stage in the operation of the machine the first card will be fed column by column past the sensing pins 210 so that the control perforations therein may control typing of the data represented thereby, or cause the setup of storage relays which control a subsequent amount of entry operation.

4. *Program controls*

At selected column positions of the card, or cycle points, desired operations will be effective under control of different programming means which consist of the emitter EM in the card reading unit, a readout strip emitter on the typewriter carriage (see Fig. 27*f*), and other controls to be described as the specification progresses.

Usually, at card column 1 a control is initiated by means of a plug connection to pick up a relay which calls into operation one or more function control means according to how the contacts of such relay are plugged up to the control relays. If the function is to cause the reading of the card, code analysis relays to be described will be energized according to the holes sensed. Different functions may be performed under such code analysis relays according to the functions called into operation.

When the emitter of the card reader EM is utilized to program selected operations the circuit extends from the line side 501, through circuit breaker contacts (Fig. 27*a*), the switch arm of the emitter, the contact point to which a plug connection 525 is made. Each of the contact points from 1 to 80 have a plug socket 526 so that the desired plug connection 525 may be made therefrom.

For the control of functions by the typewriter the circuit extends from line side 501, through R20*b* relay contacts (Fig. 27*f*) the common conducting strip 534 of the emitter on the typewriter carriage, the brush 533, a contact point 536 engaged by said brush, and thence to a plug socket 527 to which the desired plug connection 528 is made.

The circuits for the other program controls will be described later.

5. *Multi-operation selector relays*

Figure 27G:
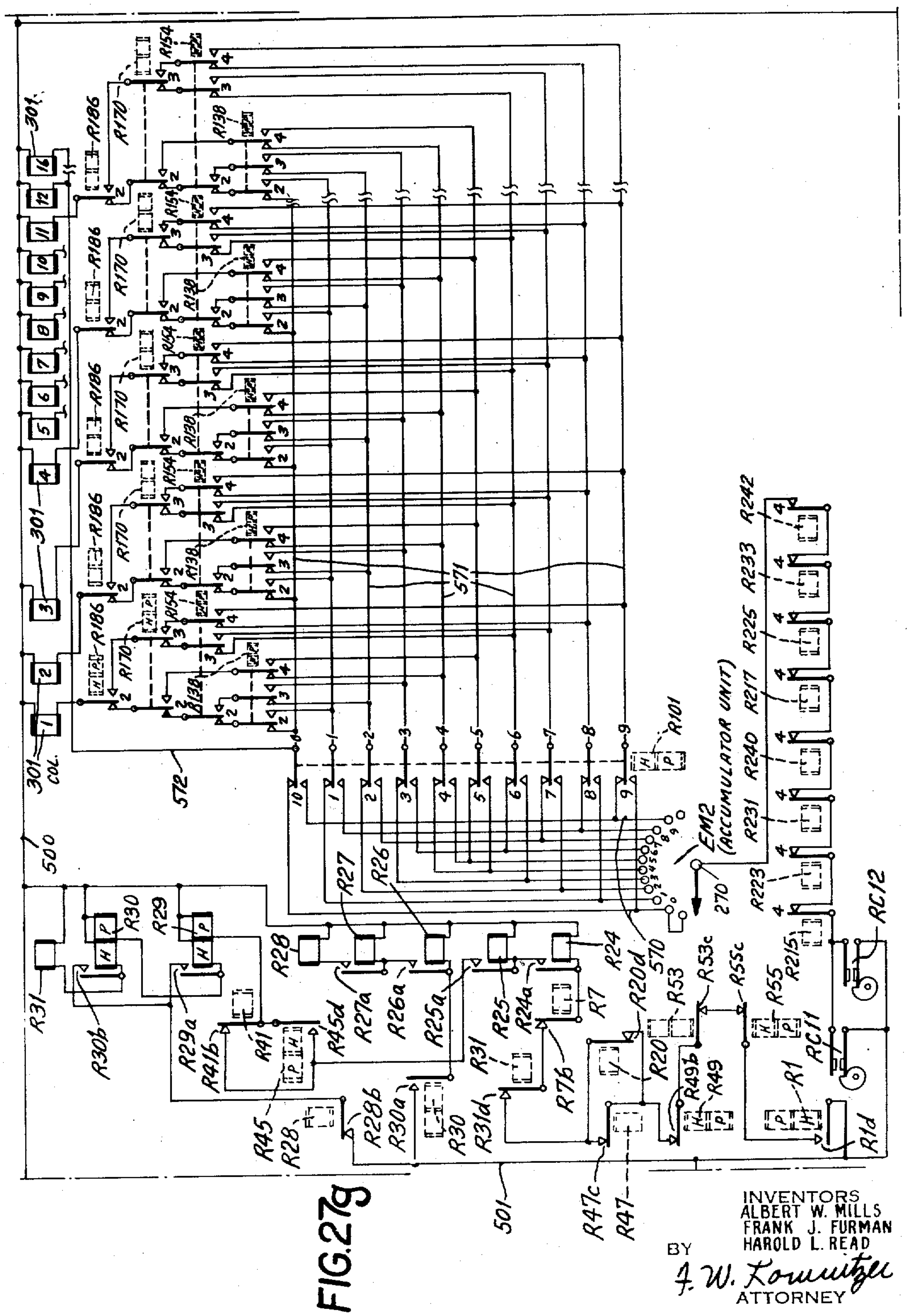
Figure 27H:
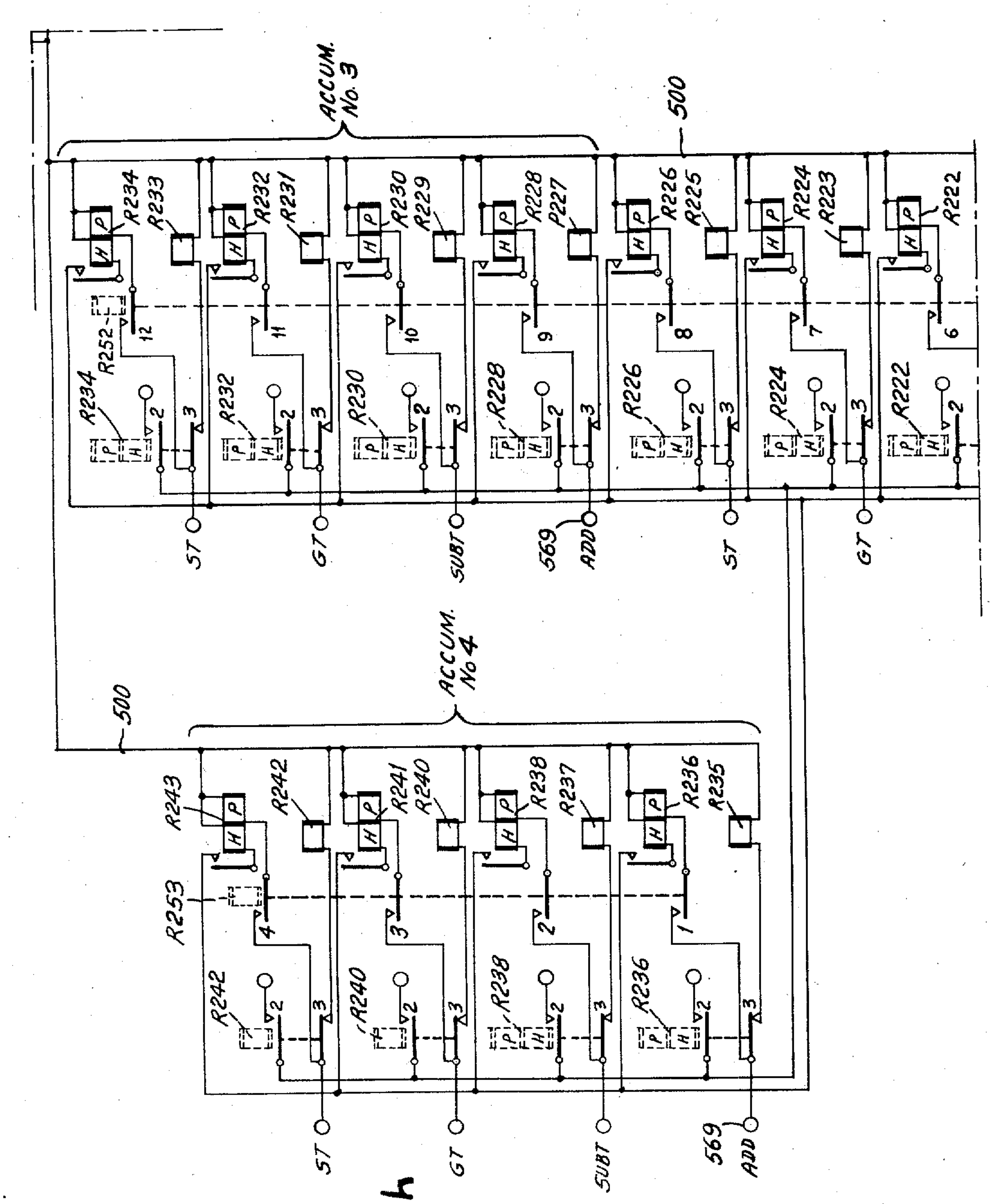
Figure 27I:
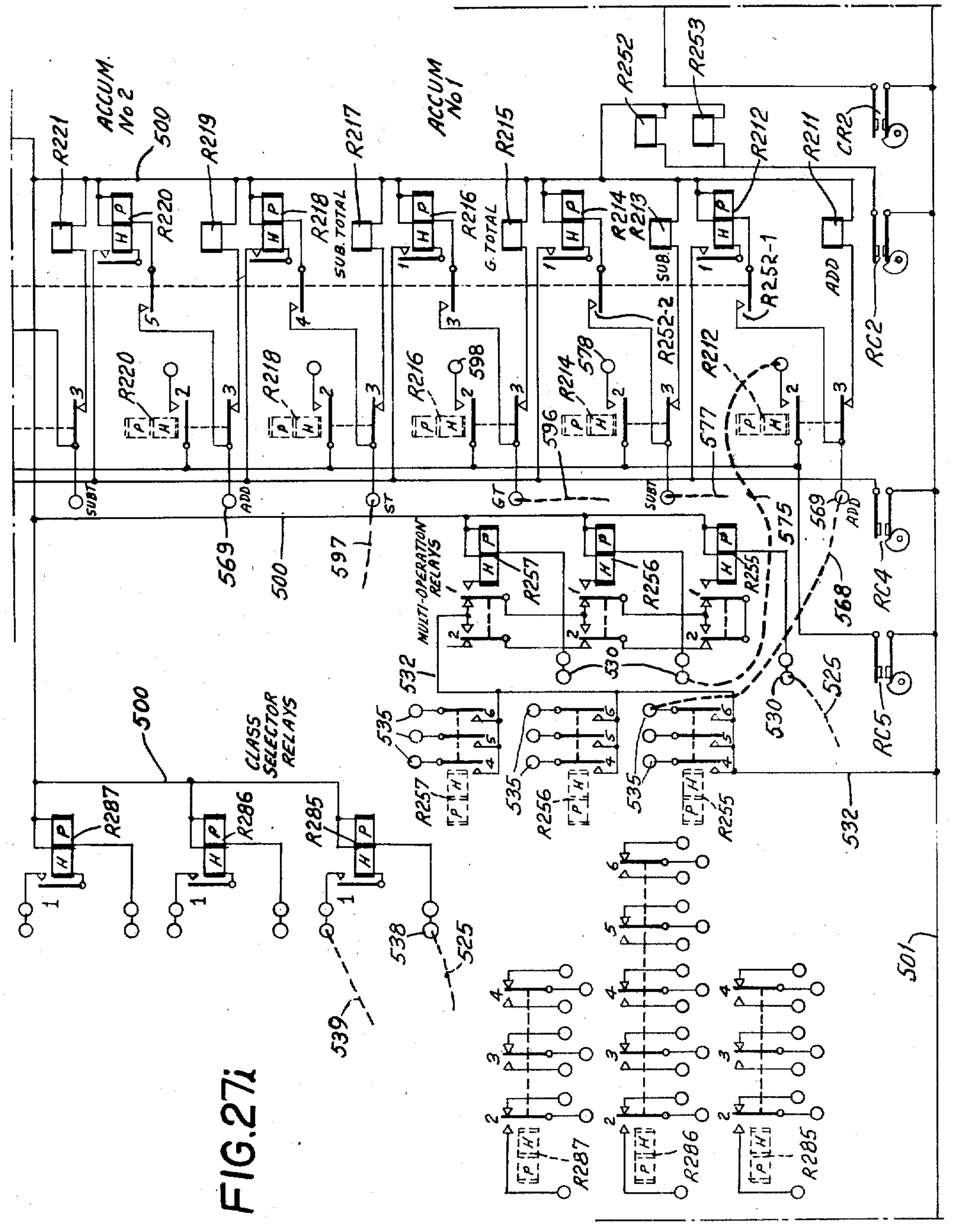
Figure 27J:
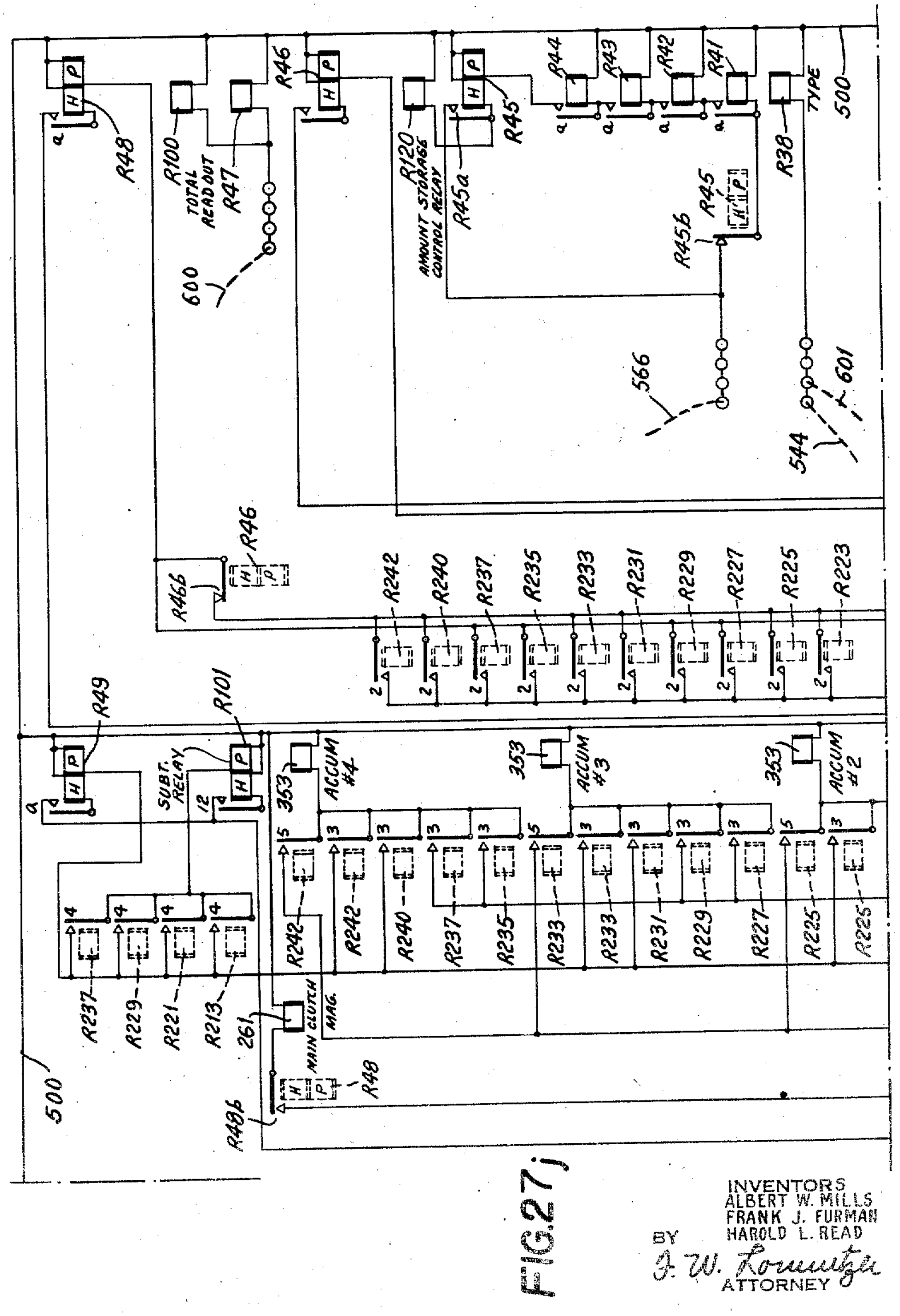

The present machine is provided with about thirty multi-operation selecting relays, although for simplicity only three of these are shown in the wiring diagram in Fig. 27*i*. A like number of class selectors are provided but only three of these are shown in the wiring diagram in Fig. 27*i*.

To pick up a multi-operation relay, for example, one of the plug connections 525 from emitter EM or the readout strip of the typewriter extends to the plug socket 530 af the R255 relay coil, which latter is connected to the other line side 500. The pickup coil of R255 closes the R255 1 and 2 relay contacts to energize the R255H relay coil by a circuit from the line side 500, through R255H R255—1 relay contacts now transferred, R255—2 relay contacts now transferred, then serially through the R256—1 and R257—1 and wire 532 to line side 501. Thus, it is evident that the pickup of any other multi-operation selector relay, such as R256 and R257 will open the holding circuit to R255. Likewise the holding circuit of any relay R255, R256, R257 will be opened by the pickup of any one of such relays. The deenergization of a relay, of course, requires that the related pickup coil also be deenergized and this is effected when the switch arm of emitter EM moves off the contact point of the emitter and the timing is such that the pickup coil is deenergized before the related holding coil is deenergized.

Each multi-operation relay, such as R255 closes its 4, 5, and 6 relay contacts and to each of these there is connected a plug socket 535 from which plug connections may be made to initiate or terminate operations.

CLASS SELECTOR RELAYS

Class selecting relays, such as R285 (Fig. 27*i*) are energized when the desired plug connection 525 or 528 (Fig. 27*f*) is made to the plug socket 538. Relay R285 will, for example, close the "1" relay contacts to hold the R285H relay coil when a plug connection 539 is made to complete the holding circuit. The R285 relay transfers its 2, 3 and 4 relay contacts and by suitable plug connections to plug sockets of each set of transfer contacts a circuit may be normally opened or closed so that when the class selecting relay is energized one set of contacts may be opened to accordingly suppress a function, and then initiate another by closure of the same set of transfer contacts.

6. *Control relays for initiating the reading of successive card columns, and typing data*

To effect this function, from the plug sockets 526 of the EM emitter, two plug connections 540 and 541 (Fig. 27*k*) are made to plug sockets 542 and 543, respectively, so that R37 and R99 read relays may be picked up since they are connected to the line side 500. The plug connection 544 (Fig. 27*j*) is also made to pick up the R38 relay when it is desired to also cause the operation of the typewriter to type the data as the columns are read. Other control relays may be called into operation as will be later described.

7. *Incidental circuits operative in the first reading card cycle*

At this time circuits which are effective when the start key is depressed the second time will be described. One circuit is from the line side 501, through the start key contacts 502 (Fig. 27*b*), R15*a* card lever relay contacts now transferred, the R1 relay coil to the line side 500. In shunt with the R1 relay coil is the R64P relay coil but for the present it plays no part. Energization of the R1 relay closes the R1*a* relay contacts (Fig. 27*b*), thereby energizing the holding relay R1H by a circuit from the line side 500, through contacts 503, R63*a* relay contacts now transferred, R59*b* relay contacts now in normal position, R1*a* relay contacts, R1H relay coil to line side 500.

8. *Time delay relays*

In order to give an ample period of time for certain functions to take place and to time the initiation of these operations a system of so-called delay relays is incorporated in the electrical part of the machine. By such relays reading of a card, typing of the information, setting up of amount representing storage relays, etc. may fully be completed before another operation is initiated.

Closure of the R1*d* relay contacts (Fig. 27*g*) closes a circuit from the line side 501 through the following interlock relay contacts which are now closed, R1*d*, R55*c*, R53*c*, R49*b*, R47*c*, R31*d*, thence through the R7*b* relay contacts, R24 relay coil to line side 500. R24 relay closes the R24*b* relay contacts (Fig. 27*b*) to provide a supplementary hold circuit for R1H during the cycling operation. R24 relay coil closes the R24*a* relay contacts (Fig. 27*g*) to thereby pick up the R25 relay coil which closes R25*a* relay contacts, thereby picking up the R29P relay coil by an extension of the circuit from the R24a relay contacts, through R25a R41b relay contacts (or the R45d relay contacts which are in parallel therewith). R29P relay coil closes the R29a contacts to thereby complete a circuit from the line 501 through R28b relay contacts now closed, the R29a relay contacts, R29H relay coil to line side 500. When R29H energizes it closes R29a contacts to pick up the R30P relay coil which in turn closes R30b relay contacts to pick up the R31 relay coil. R31 relay also closes its R31a contacts to provide a hold circuit for the R1H relay coil (see Fig. 27b). At this time opening of the R31d relay contacts (Fig. 27g) causes the R24 and R25 relay coils to deenergize and be released. Opening of contacts R31d also causes the R29P relay coil to deenergize but at this time it is not released because it is still held by the R28b relay contacts which are still closed. Energization of the R30P relay coil closes the R30a relay contacts to pick up the R26 relay coil which closes its contacts to pick up R27 which in turn closes R27a relay contacts to pick up the R28 relay coil. The latter opens the R28b relay contacts to deenergize the R29, R30 and R31 relay coils. When R30a relay contacts open they cause the R26, R27 and R28 relay coils to deenergize. Thus, a complete cycle of operation for these delay relays takes place as has just been described.

9. *Energizing circuits for the code analysis relays*

In the above system of delay relays the R25 relay coil is energized for a certain period of time, determined by the time at which it is deenergized under control of other relays. During the time the R25 relay coil is energized it closes the R25b relay contacts (Fig. 27b) to close, at this point, the energizing circuits for the code analysis relays. The energizing circuit extends from line 501, through contacts 505, R25b relay contacts, R9b relay contacts now closed, wire 545, and wire 546 which is connected to one side of each of the card reading sensing pin-operated contacts 225 at station No. 2. From the other side of each of these contacts 225 there are respective wire connections 547, the circuits then extending through the R99, 1–12 relay contacts which are all now closed at this time, thence through the respective R100, 1–12 contacts which are now in normal position, to the respective code analysis relays R108—R119, to line side 500. For example, if a reading pin 210 should operate the respective 1 contact 225 the energizing circuit would be completed by such contacts to pick up code analysis relay R111. Of course, analysis of other card holes will cause the related sensing pin 210 to close the same numbered contact 225 to pick up the correspondingly designated code analysis relay. Each code analysis relay R108—R119 when energized is held energized through the respective relay contacts R100, 1–12, respectively, respective relay contacts R99, 1–12, thence through the respective "a" holding contact closed by the energized code analysis relay, the circuit then extending through the R29b relay contacts, to the line side 501. Thus, when the R29H relay coil opens it will deenergize the previously energized code analysis relay and therefore with the system of delay relays described the code analysis relays are energized for a certain period of time to insure that the function effected by them will be completed.

10. *Circuits to effect re-operation of card feed to space card one column by energization of read escapement magnet 504*

When the R31 relay energizes as a result of cycling the system of delay relays, the R31b relay contacts (Fig. 27a) close to thereby complete a circuit from the line 501, through R1c, R9a, R37b, R31b contacts, all of which are now closed, through R17b contacts now closed in normal position, the R16P relay coil to line side 500. By circuits previously described, it will be recalled that R16 relay is the pickup relay for the read escapement clutch magnet 504 which again is energized. When such magnet is energized it will cause both sets of reading pins 125 and 210 to be retracted from the card and then the engagement of the escapement clutch causes rotation of the feed rolls to effect a column step of movement of each card. Thus, each card is spaced one column so that the sensing pins at both reading stations can again read or analyze the perforations therein. It will be recalled that the engagement of the escapement clutch transfers contacts 505 to pick up the R7 relay (Fig. 27b) which, in turn, opens the R7b relay interlock contacts (Fig. 27g) and thus prevents the energization of the R25 relay and the cycling of the start delay relays until the required point in the operation of the machine. The R7b contacts are in the nature of an interlock to prevent pre-operations of the system of delay relays.

Unless a skipping of one or more card fields is required the escapement of the card to the next column results in closing of the circuit from the line side 501, through the contacts 506 (Fig. 27a), R4c relay contacts now in normal position, through R16c relay contacts to the R10 relay coil. Opening of the R10a and R10b contacts (Fig. 27a) interrupts the energizing circuit for the escapement clutch magnet 504 so that the clutch will again latch up and initiate the reading of the next column. In this manner card reading continues column by column until the previously called-in function relays are deenergized by the energization of a different multi-operation selector relay R255, R256, R257 (Fig. 28i). It will be recalled that energization of any other relay will deenergize the one previously called in for operation and accordingly the R99 read relay (Fig. 27k), in the present example, will be deenergized to open its 1–12 relay contacts to open the circuit from such contacts to the code analysis relays R108–R119. R37 relay coil also deenergizes when reading is to be terminated and it opens the R37b relay contacts (Fig. 27a) to prevent further completion of the circuits to the escapement clutch magnet 504.

11. *Numeral typing or listing circuits*

The machine is conditioned for listing operations by the typewriter whenever the R38 relay (Fig. 27j) is energized which is the function control relay for calling the typewriter into operation. The latter relay closes the R38b relay contacts (Fig. 27f) so that when the R29 relay in the system of delay relays energizes a circuit will be completed from line side 501, through the typewriter escapement contacts 549 now at normal positions (Fig. 27f), thence through the R29c relay contacts, R15d card lever relay contacts now transferred, R18b relay contacts now closed in normal position, to R38b relay contacts now closed. Since it is assumed that numeric listing operations are now effected the zoning code analysis relays R108, R109, R110 have their contacts at normal position so that for numeral listing operations the circuit then extends through R108—4 contacts (Fig. 27*f*), R109—4 contacts (Fig. 27*f*), R110—4 contacts (Fig. 27*e*) and thence in accordance with which code analysis relay R111—R119 is energized the respective "7" transfer contact will be transferred so as to complete the circuit to the associated numeral typewriter key operating solenoid 442. Energization of such solenoid will actuate the associated type bar.

12. *Circuits for effecting alphabetic listing*

According to the alphabetical code utilized herein alphabet typing or listing is effected upon the selective energization of the code analysis relays R108, R109, R110, depending whether there is a hole at the 12, 11 or 10 index position, or as is usually known at R, X or 0 index positions. It will be observed that when the R108 relay (Fig. 27*f*) is energized upon presence of an R hole it will transfer its contacts "4" so that in accordance with the intra-zone analysis relays R111—R119 energized circuits are completed through their "4" contacts to energize the type bar control solenoids 442 A, B, C, D, E, F, G, H or I.

Similarly the alphabet type solenoids J–R inclusive are selectively energized by the intra-zone relays R111—R119 through their "5" contacts when the code analysis relay R109 (Fig. 27*f*) is energized upon the presence of an X hole.

The alphabet type solenoids 442 S–Z inclusive are selected as a group by the zone code analysis relay R110 (Fig. 27*e*) when there is a 0 hole and selectively according to the intra-zone code analysis relays R111—R119 energized.

13. *Circuit for energizing typewriter space solenoid*

The typewriter is also provided with a Space solenoid 442 (see Fig. 27*d*) which operates the space bar so as to space the typewriter carriage column by column in synchronism with the sensing of the card columns. In the absence of any hole in a column the circuit previously described for numerical listing will extend serially through the "7" relay contacts of the R111—R119 code analysis relays (shown in Fig. 27*d*), thence through the Space control solenoid 442 (Fig. 27*d*) to line 500. This will automatically operate the space bar when the typewriter carriage is to be given a letter space in the absence of any perforations in a column when either numeral or alphabetic data listing is to be performed.

14. *Zero elimination circuit*

It is desirable to eliminate the typing of left-hand zeros in typing numbers, that is, all zeros in columns which are perforated to represent zero and comprise columns to the left of the column representing the highest ordered significant digit. An example of such number would be 00203.04. To condition the machine for zero elimination controls from the typewriter readout strip, selector relays, or emitter EM can be utilized. By way of example a plug connection 550 (Fig. 27*k*) is made from the EM emitter from the column position in which zero elimination should start to the plug socket 551 to energize R103P relay which is one of four zero elimination control relays R103, R104, R105, R106. R103 will be explained since the operation is the same for all. If so desired this plug connection 551 may be made to pick up R103H of the duo-wound control relay.

Energization of relay R103 is retained until the type bar which automatically prints the decimal point is operated. For example, in the number 00000.04, it is desirable to print the number as .04 rather than . 4. For this reason a holding circuit for R103H is maintained through contacts Period 552 which opens by the action of such period printing type bar, as was previously described. When R103P, R103H are energized they will close the R103—1 contacts to pick up the zero elimination relay R102 by a circuit which extends from the line 500, through R102 relay coil, R103—1 contacts, and thence serially through "11" relay contacts of relays R111—R119, then through the period type bar controlled contacts 552, to line 501. When R102 relay coil energizes it closes its contacts R102—1 to maintain this holding circuit even though R103—1 contacts subsequently open.

Referring now to Figs. 27, *d*, *e* and *f*, circuits will now be described which are operative to energize the Space solenoid 442 instead of the Zero solenoid (Fig. 27*d*) to suppress 0 typing in left-hand columns.

15. *Typewriter space solenoid circuit for zero elimination*

This circuit is from the line side 501, through typewriter escapement contacts 549 which are normally closed (Fig. 27*f*), through R29*c* relay contacts, R15*d* relay contacts now transferred, R18*b* relay contacts now closed, R38*b* relay contacts now closed, R108—4 contacts now in normal position, R109—4 contacts now in normal position, R110—4 contacts (Fig. 27*e*) now in transferred position since the 0 index point is perforated, thence serially through the now normal "6" contacts of R111—R119 relay coils, then through R57A relay contacts now in normal position, R102—2 relay contacts now transferred, the Space type bar solenoid to the line 500. Thus, for each column where zeros are represented the space bar of the typewriter will be operated and no typing of 0 will be effected until either a significant digit 1-9 is typed, or a period is automatically typed. When a significant digit 1-9 is printed one of the "11" contacts of R111—R119 relay coils (see Fig. 27*k*) will be opened to break the holding circuit for R102 relay. Also the period type bar contacts 552 will open this same holding circuit. Under either of the above conditions R102—2 contacts now return to normal position and for columns to the right in which zero is represented the Zero type bar solenoid 442 will be energized.

16. *Typewriter comma typing circuit*

When a number, such as 000,062.32, is represented it is desirable to automatically suppress the typing of a comma which would be normally typed. The space on the sheet in which a comma is to be normally typed is selected by a plug connection 555 (Fig. 27*d*) from the desired column position of the emitter EM to a plug socket 556 which will pick up the R56 coil. The latter closes the R56*a* relay contacts and a branch circuit will extend through such contacts R56*a*, R102—3 contacts now transferred, the Space solenoid to line 500. Thus, instead of typing a comma, the platen will merely space. This circuit also prevents typing a comma in a zero elimination printing field until a significant digit is typed. When a significant digit is typed, R102 deenergizes and the circuit now extends through R56a relay contacts, R102—3 relay contacts now normal, to the comma typing solenoid, to line 500.

17. *Typewriter period typing solenoid*

To effect the printing of the period or decimal point under control of the desired column of the emitter EM, a plug connection 558 is made from EM emitter to a plug socket 559 which energizes the period typing solenoid (see Fig. 27*d*). The latter, as previously stated, causes the operation of the type bar which types the period and in turn opens contacts 552 (Fig. 27*k*) to deenergize the zero elimination relay coil R102. This will cause a 0 at the right of the decimal point to be typed such as in the number .04.

18. *Circuits for tabulating typewriter carriage*

It is desirable that when listing operations are performed that the platen carriage be tabulated so that the listing will be made at a desired part of the sheet which is typewritten. Any operation control, such as the EM emitter, the typewriter readout strip, the class relay selector, a multi-operation relay selector, may be used to initiate this operation, as well as other operations. Therefore, by a suitable plug connection 560 (Fig. 27*e*) a circuit will be extended by such plug connection through R53B relay contacts, R52 relay coil to line side 500. A holding circuit is completed through R52*b* relay contacts, R53*d* relay contacts, to line 501. R52 relay coil closes the R52*a* contacts (Fig. 27*f*), thereby completing a circuit from line side 501, through typewriter escapement contacts 549, wire 561, R52*a* relay contacts, TAB solenoid to line side 500. Operation of the TAB solenoid results in closure of contacts 554 TAB (Fig. 27*e*), thereby completing an obvious circuit to the R53P relay coil. A holding circuit for the latter is effected by a circuit from line side 500, through R53H, R53*a* contacts, R20*c* contacts now closed to line side 501. This holding circuit will be maintained until the tabulation is ended, at which time R20*c* relay contacts open.

19. *Carriage return circuits*

To effect a carriage return a suitable plug connection 562 (Fig. 27*e*) is made from an operation control such as EM emitter, to complete a circuit through R55*b* relay contacts, R54 relay coil to line side 500. A holding circuit is maintained through R54*b* relay contacts, R55*d* relay contacts to line side 501. The circuit for energizing the carriage return solenoid designated CAR RET is effected by closure of the R54*a* relay contacts (Fig. 27*f*) by an obvious circuit. Operation of the carriage return solenoid or the carriage return mechanism causes the closure of contacts 554 CAR RET (Fig. 27*e*) which pick up the R55 relay coil, and a holding circuit for the latter is completed from line side 500, through R55H relay coil, R55*a* relay contacts, R20*c* relay contacts to line side 500. When the carriage return is ended R20*c* relay contacts open.

20. *Space solenoid circuit*

At certain positions it may be desirable to simply space the typewriter carriage. To effect this a suitable plug connection is made to a plug socket 563 (Fig. 27*e*) which will complete, at the desired column position, a circuit to the space solenoid (Fig. 27*d*) to line side 500.

21. *— or dash solenoid circuit*

To type a minus sign at desired column positions of the typewriter, suitable plug connections are made to plug socket 564 (Fig. 27*d*) which picks up the — type solenoid.

22. *Energizing circuit for typewriter escapement relay R20*

Typing of a character or spacing the typewriter causes the transfer of the typewriter escapement contacts 549 which completes a circuit from the line side 501, the typewriter escapement contacts 549 (Fig. 27*f*) now transferred, to R20 relay coil. The R20*d* relay contacts (Fig. 27*g*) which are in the impulse circuit for the system of delay relays opens to delay the start of a new cycle of operation of such relays until the typing operation has been completed. This keeps the typewriter and card reader in step. The R20*b* relay contacts (Fig. 27*f*) open the circuit to the readout strip of the typewriter so as to eliminate arcing at the brushes of the emitter.

23. *Amount storage means*

As each card column is read at station No. 2 and the digit is typed, if typing is called for, the corresponding value is set up in amount or value storage relays and in this manner the digits of the amount which are printed are set up in the plurality of orders of the storage relays. The amount value is held in the storage relays so that when called for the amount may be read out and entered in the accumulating mechanism.

24. *Circuits for setting up denominational column selecting relays*

Referring to Fig. 27*f* eleven column selecting relays R122—R132 are provided and these control the successive entry in eleven columns of the storage relays, the entry being effected from the highest to the lowest or units denominational order, that is to say, R122—R132 in this order.

From plug sockets 565 a plurality of plug connections 566 are made to plug sockets of either the emitter EM, or to the plug sockets 527 of the column readout of the typewriter. As either is stepped column by column the relays R122—R132 are picked up in succession. The circuit for energizing any of such relays is through the related contacts R120, 1–11 of the storage amount control relay R120 which is called into operation whenever amount storage entries are called for. There will now be explained the manner in which the R120 (Fig. 27*j*) relay is energized and held energized for enabling amount storage operations. Primarily, amount storage operations are selected by making a plug connection from one of the plug sockets 535 (Fig. 27*i*) of an energized multi-operation relay so as to complete a circuit from line side 501 by a plug connection 566 therefrom, through R45*b* relay contacts, R41 relay coil to line side 500. Upon energization of R41 relay a system of relay relays is operative to ultimately energize the R120 relay. When R41 relay closes the R14*a* contacts to pick up the R42 relay the latter closes R42*a* relay contacts to pick up R43 relay coil. The latter closes R43*a* to pick up R44 and the latter through R44*a* relay contacts picks up the pickup coil of R45 relay. Upon closure of the R45*a* relay contacts a holding circuit is made for the R45H relay coil and also the R120 relay coil in shunt therewith back through the 4, 5 or 6 contacts of the selected multi-operation relay. When R45 relay coil energizes it opens its R45*b* relay contacts to deenergize R41, R42, R43, R44 and R45P relay coils. When R41 relay coil is energized it opens the R41*c* relay contacts (Fig. 27*d*)

to break the holding circuit for the holding coils of the storage relays previously set up, as will be evident later, and therewith after a certain period has elapsed the R41 relay coil is deenergized to close the R41c relay contacts to thereby again establish the holding circuit for the energized storage relays.

Also when R41 relay is energized the R41b relay contacts (Fig. 27g) open to prevent R29P coil from being energized until R45d relay contacts close at the end of a storage delay cycle. Thus, the cycle of operation of the start delay relays is delayed to provide time for clearing out the storage relays.

Setting up a multi-operation relay causes the R45 and R120 relays to be held energized to close R120, 1–11 contacts (Fig. 27f), enabling, as the card columns are read in succession, the setting up of relays R122—R132 in this order.

25. *Pickup and hold storage relay circuits*

It will be recalled that the numerical data is represented by perforations at index point positions 0–9 representing the corresponding digits. When such perforations are sensed the corresponding code analysis relays R110—R119 are picked up and such relays are the instrumentalities for setting up the pickup relays of the storage relays. It is obvious that ten storage relays may be used for each column but to provide means for storing digits 1–9 in the storage relays with a small number of relays it is preferable to set up the relays according to a combinational code, and herein the 4-point code is used. That is to say, for each denominational column four duo-wound relays are used. In each column (designated as (11) etc.) there are four duo-wound relays R138, R154, R170 and R186 (Figs. 27d, e and f), P representing the pickup coils and H the hold coils. Considering now the setting up of the storage relays in column (11) when R122 relay is energized, the latter will close relay contacts R122—1, 2, 3 and 4 relay contacts, thereby making it potentially possible to pick up the related relays R138, R154, R170 and R186. Just which relays are picked up according to the combinational code will best be understood from the following table:

| Card Code | Code Analysis Relays | Storage Code | Storage Relays for Each Column |
|---|---|---|---|
| 1 | R111 | 1 | 138 |
| 2 | R112 | 2 | 154 |
| 3 | R113 | 1–2 | 138, 154 |
| 4 | R114 | 4 | 170 |
| 5 | R115 | 1–4 | 138, 170 |
| 6 | R116 | 6 | 186 |
| 7 | R117 | 2–6 | 154–186 |
| 8 | R118 | 4–6 | 170–186 |
| 9 | R119 | 2–4–6 | 154, 170, 186 |
| 0 | R110 | None | None |

Referring to the above and the wiring diagram, it will be seen that when code analysis relay R111 is picked up it will close its R111—8 relay contacts (Fig. 27f), thereby making it possible to pick up each R138 relay. If 2 is represented the R112—8 relay contacts (Fig. 27a) will attempt to pick up the R154 relay coils. Whenever 3 is represented the R113 relay coil is picked up and it will close the R113—8 (Fig. 27f) and R113—9 relay contacts (Fig. 27e), attempting to pick up all of the R138 and R154 relay coils. By thus following the table and noting the particular contacts closed by the code analysis relays which are in the energizing circuits for the pickup coils of the storage relays, it will be seen that the numerical data is set up therein according to the storage code.

The complete energizing circuit for setting up a column of the storage relays, taking the setting up of the numerical digit 1, in column (11) is from the line side 501 (Fig. 27f), R29d relay contacts now closed, R45c relay contacts now closed, thence through R111—8 relay contacts, through R122—1 contacts now closed, R138 relay coil to line side 500. Upon analysis of the next card column, circuits are effective whereby the R123 relay coil is next picked up and the pickup coils of storage relays R138, R154, R170 and R186 in column (10) are selectively energized according to the sensed numeral data. The pickup coils are, of course, released after having been energized but such relay coils close the "1" contacts shown in Fig. 27d to pick up the respective H holding coils of the groups of relays R138, R154, R170, R186. The holding circuit, taking for example the energization of the R138H relay coil, is from the line side 500, R138H relay coil, R138—1 relay contacts, R41c relay contacts, to the line side 501. Thus, as the holding coils are energized they are maintained energized until the R41 relay is picked up for the next digit storage operation.

It is pointed out that if a card column should represent 0 the code analysis relay R110 is picked up but no setting is made up in the storage relays, and in this particular column where a 0 is represented no relays are picked up or energized. However, as will be subsequently described, for this order or column a 0 will be read out under control of the translator circuits to control printing of 0 when taking a total.

26. *Circuit for energizing main clutch control magnet 261 to initiate operation of accumulator unit*

Following the setting up of the storage relays to store therein a value which is derived from the card, an adding or subtracting cycle of the accumulator unit generally follows and the circuits to initiate the operation of the accumulator unit will now be described. It is pointed out that the entering cycle may take place at a selected cycle point during the analysis of the card when no storage operations take place or, if so desired, an entering cycle may take place directly after column 80 of the card has been analyzed. Therefore, from a selected plug socket of the EM emitter of the card reader, or readout device of the typewriter a multi-operation relay, such as R255 is picked up by a plug connection 525 (Fig. 27i). From one of its plug sockets 535 a plug connection 568 (Fig. 27i) is made to a plug socket 569 so as to complete a circuit through R212—3 contacts, R211 relay coil to line 500. The circuits which are now being described and traced relate to an additive entry for accumulator No. 1 and to simplify the disclosure similar circuits pertaining to three other accumulators of the accumulator unit are only shown. By the plug connections 568 made to other plug sockets 569 to pickup R211, R219, R227, R235 any of the four accumulators may be called into operation and in a similar manner for the fifth accumulator.

When cam contacts CR9 (Fig. 27k) close at 300° (see Fig. 21) a circuit is completed from the line 501, through CR9 cam contacts, R211—2 relay contacts (Fig. 27i), R48P relay coil (Fig. 27i) to line side 501. A holding circuit for R48H is closed by relay contacts R48a and the CR10 cam contacts to line 501. CR10 cam contacts (Fig. 27k) hold R48H relay coil energized to about 10° of the next cycle (see Fig. 21).

At 325° a circuit is completed from line side 501, through CR11 cam contacts (Fig. 27k), R48b relay contacts now closed (Fig. 27j), the clutch control magnet 261 (see also Fig. 10) to the line side 500. At 0° of the cycle the main clutch of the accumulator unit will engage and all of the operating parts thereof previously described under the description of the accumulator unit will go through a cycle of operation. During this cycle of operation the amount stored up in the storage relays is read out and entered into the selected accumulator No. 1 in the present example.

27. *Differential rack positioning control circuits*

Each column of the storage relays which would be R138H, R154H, R170H, R186H actuates a series of contacts (see Fig. 27g) in a translator circuit which are either at normal position or are transferred according to whether the corresponding storage relay is energized. For example, in each translator column the storage relay R138H will transfer its 2, 3 and 4 relay contacts; R154 transfers its 2, 3 and 4 contacts, R170 its 2 and 3 contacts and R186 relay coil transfers its "2" contacts. These contacts are wired up to make eleven columns of translator circuits (although not all eleven columns are shown in Fig. 27g) to translate the combinational hole representation to a differentially timed electrical impulse. This impulse for each order is directed to the associated rack stop magnet 301 (see Figs. 11 and 11a), all sixteen of which are commonly wired to the line side 500. The impulse circuit for one column is from the line 501, through RC11 and RC12 circuit breaker contacts, thence through the "4" relay contacts of relays R215, 223, 231, 240, 217, 225, 233 and 242 which are now closed, thence to the switch arm of the EM2 emitter in the accumulator unit. The switch arm of this emitter EM2 is driven by the shaft 270 of the accumulator unit to make contact in succession with the contact points of EM2 to transmit differentially timed impulses to a series of 0–9 digit lines 570 as racks 290 move upwardly (see Figs. 11 and 11a). It will be noted that the first impulse is transmitted to the 0 digit line, thence to the 1 digit line and in succession to the others in ascending digital sequence. It will be seen that the impulses from the digit lines 570 to digit lines 571 are through the 1–9 and 10 relay contacts of the R101 relay coil which, for addition, are at normal position. Considering now the translator relay contacts of one column, it will be seen that when digit 1 is set up in a column of the storage relays the R138 relay coil is energized which transfers its R138—2 relay contacts, thereby connecting the 1 digit line 571 to the rack stop magnet 301 through transferred R138—2 contacts, R154—2 now normal, R170—2 now normal, R186—2 now normal. Thus, when the 1 digit impulse is transmitted by the EM2 emitter the rack stop magnet 301 will be energized and stop the related rack 290 after a unit movement.

The selection of other digit impulses by the translator columns for transmission to each rack stop magnet 301 can be worked out from the preceding table. Thus, according to the digit representation of the storage relay columns the corresponding racks 290 will be given upward differential movements. It is pointed out that the 0 impulse is transmitted through the normal contacts of each column of the translator circuit, and this impulse directed to the rack stop magnet 301 stops the rack 290 at a 0 position to prevent any movement which would tend to improperly add 9 in each order. It should be noted that by a wire 572 this 0 impulse is transmitted to the stop rack magnets 301 in orders 12, 13, 14, 15 and 16 which do not have associated storage relays and such orders of the accumulator cannot receive any entry in the case of addition.

28. *Energizing circuits for magnets which cause engagement of accumulator wheels with the racks*

After the racks 290 have received their differential movement magnet 353 (Fig. 12) of the selected accumulator is energized to cause, as previously described, the movement of the accumulator wheels 347 out of engagement with the carry sectors 350 and into engagement with the differentially positioned racks 290. The circuit for accumulator No. 1 is from line side 501, cam contacts RC8 (Fig. 27k), R211—3 relay contacts, accumulator control magnet 353 to line side 500. A similar circuit is provided for each of the other magnets 353 for the other accumulators.

29. *Circuits to prevent non-repeat operations of a cycle of operation of the accumulator unit*

While the selected accumulators will be automatically disengaged from the racks 290, nevertheless the class selector relay contacts through plug connection 568 still maintains the R211 relay coil energized and to prevent such relay from effecting a re-operation of the accumulator unit the following circuit is provided: The circuit extends from line 501, through the cam contacts RC 2 (Fig. 27i), relays R252 and R253 to line side 500. Assuming that R211 relay coil is energized, it will be seen that closure of R252—1 relay coil completes a circuit from the plug connection 568 through R212—3 contacts, R252—1 contacts, R212P relay coil, to line side 500 and the hold circuit is effected from line side 500, through R212H, R212—1 relay contacts, cam contacts RC4 to line side 501. R212—3 relay contacts open the energizing circuit for R211 and the latter deenergizes.

30. *Circuit for effecting new operations, such as a subtraction cycle, resumption of card reading, etc.*

At the end of the cycle a circuit is completed from line side 501, through RC5 cam contacts, R212—2 relay contacts and thence by a plug connection 575 (Fig. 27i) another multi-operation selector relay, such as R256 may be picked up. The energization of the latter causes the previously-energized multi-operation selector relay R255 to deenergize. One of the plug sockets 535 of the multi-operation relay R256 may have a plug connection 576 to the plug socket 543 (Fig. 27k) to pick up the R37 and R99 relays. It will be recalled that energization of such function control relays will cause the automatic resumption of card reading operations without any attention of the operator, if a cycle of the accumulator unit is carried out before card column 80 is sensed.

31. *Circuits for conditioning the accumulator entry means for subtracting operations*

When subtraction is to be effected in accumulator No. 1, instead of the plug connection 568 a plug connection 577 (Fig. 27i) is made which picks up the R213 relay coil through R214—3 relay contacts. R213 closes R213—1 contacts (Fig. 27k) to pick up R48 (Fig. 27i) which in turn closes R48B contacts (Fig. 27j) to energize the main clutch magnet 261, as before. R213—4 relay contacts (Fig. 27j) close so as to pick up the R101P relay coil, the holding circuit for R101H being maintained through relay contacts R101—12 and CR2 cam contacts (Fig 27i). The latter maintains R101 operative until 320° in the same cycle.

32. *Subtraction entry circuits*

When R101 relay is energized to effect subtraction the R101, 1–9 and 10 relay contacts transfer (Fig. 27g) thereby making a 9 complementary relationship between the EM2 emitter and the digit lines 571 so that a 9's complement digit of the amount represented in the storage column will be transmitted instead of the true digit. For example, if the storage column represents 1 the transfer of R101—1 relay contacts causes a 9 differentially timed impulse to be transmitted to the rack stop magnet 310. Whenever a 0 is represented in any column the transfer of R101—10 will transmit a 9 differentially timed impulse to the rack stop magnet 310 of the corresponding order of the accumulator. Transfer of R101—10 relay contacts also causes a 9 differentially timed digit impulse to be transmitted through the wire 572 to the rack stop magnets 310 of accumulator orders 12—16, thereby entering a 9 in each of such orders. The necessity for 9's entry in such orders is well known in the theory of subtraction by complemental subtraction.

33. *Circuit for energizing control magnet 353 to effect disengagement when subtraction is carried out*

In the case of subtraction the accumulator wheels are disengaged from the carry sectors and engaged with the racks 290 after the latter have been moved to complementary extents. This circuit for accumulator No. 1 extends from line side 501, RC8 cam contacts (Fig. 27k), R213—3 relay contacts, control magnet 353, to line side 500.

34. *Non-repeat operation of accumulator unit when subtraction is to be effected*

The circuits are generally the same as that described in detail for addition and in the case of subtraction energization of the R252 relay coil closes R252—3 relay contacts to pick up the R214P relay coil. The latter opens R214—3 relay contacts to deenergize R213 relay coil to prevent a repeat subtracting cycle. The hold circuit for R214H is, as previously described for addition, through R214—1 relay contacts and RC4 cam contacts. Closure of R214—2 relay contacts extends a circuit from line side 501, through RC5 cam contacts, R214—2 relay contacts, plug socket 578, and then by a plug connection therefrom an impulse can be transmitted to pick up another multi-operation selector relay.

35. *Circuits for effecting characterization of adding or subtraction entry*

It is preferable to characterize an additive entry by merely making a space after the last digit of the amount to be added and in the case of subtraction to type the minus sign instead of having this column space. Accordingly, a plug connection 580 (Fig. 27e) is made to a socket 535 (Fig. 27i) of a multi-operation relay and which plug wire receives an impulse at the time of the accumulator entry. In case of addition the circuit extends from line side 501, wire 532 (Fig. 27i), R255, 4, 5 or 6 contacts, plug socket 535, plug connection 580 (Fig. 27e), RC3 cam contacts, R47d relay contacts now closed, R101—11 relay contacts now normal in the case of addition to plug socket 563. In the case of subtraction R101—11 contacts are transferred to extend the impulse circuit to plug socket 564. Plug socket 563 has a connecting wire 581 to the space solenoid. Socket 564 has a wire connection 582 to the minus type solenoid.

36. *Circuits for effecting omission of the reading of selected columns or skipping of card fields*

In the present machine all or any part of a card may be read. Those columns which are not to be read may be skipped. A skip operation starts the same as a step by step feed of the card but instead of disengaging the escapement clutch at the end of the one column spacing, the clutch remains engaged until the end of the skip. Of course, during this time, by the mechanical connecting means previously described, the sensing pins are also held retracted away from the face of the card.

The starting of the skipping operation may be effected by a plug connection 585 (Fig. 27b) coming from the emitter EM of the card reader so that a circuit is extended through normal R109—5 relay contacts, R4PU relay coil to line side 500. If so desired, an X perforation in a card may also start a skip operation. Upon analysis of the X perforation the R109 code analysis relay is energized which transfers its R109—5 contacts. Thus, a plug connection 586 from the EM emitter will, upon analysis of the X perforation, complete the circuit through transferred R109—5 contacts to R4PU relay coil. R4PU relay coil thereupon closes R4a relay contacts (Fig. 27a) to complete the circuit to the R16P relay coil and from the circuits previously described it will be recalled that this causes an energization of the escapement clutch magnet 504. Thereupon the card is fed one or more columns without reading or analysis of the perforations until at a predetermined column of the card the skip operation is terminated. To terminate the skipping operation a plug connection 587 (Fig. 27a) is made from a selected column position of the emitter EM so as to complete a circuit to the R5PL relay coil. When the card advances to the column succeeding that in which the plug connection 587 is made, a circuit is completed from line side 501, through contacts 506 now transferred, through R4c relay contacts now transferred, R5b relay contacts now transferred to the R10 relay coil. The latter opens the R10a and R10b relay contacts (Fig. 27a) and the escapement clutch magnet 504 is deenergized and the clutch latches up one column later than the column of the emitter EM utilized to transmit the impulse to R5PL relay coil.

37. *Group control circuits*

The machine also includes relay controlled circuits whereby, by means of a single set of sensing pins at each of the two reading stations of the card reader, a comparison between corresponding columns of two successive cards may be made and when a disagreement has been found such circuits will cause a selected function to take place.

The respective sensing pins at the two reading stations analyze or read the card perforations column by column to determine whether corresponding columns have like perforations and represent like numerical data or alphabetical data, or if there is a disagreement in the numerical or alphabetic data representation.

Figure 27K:
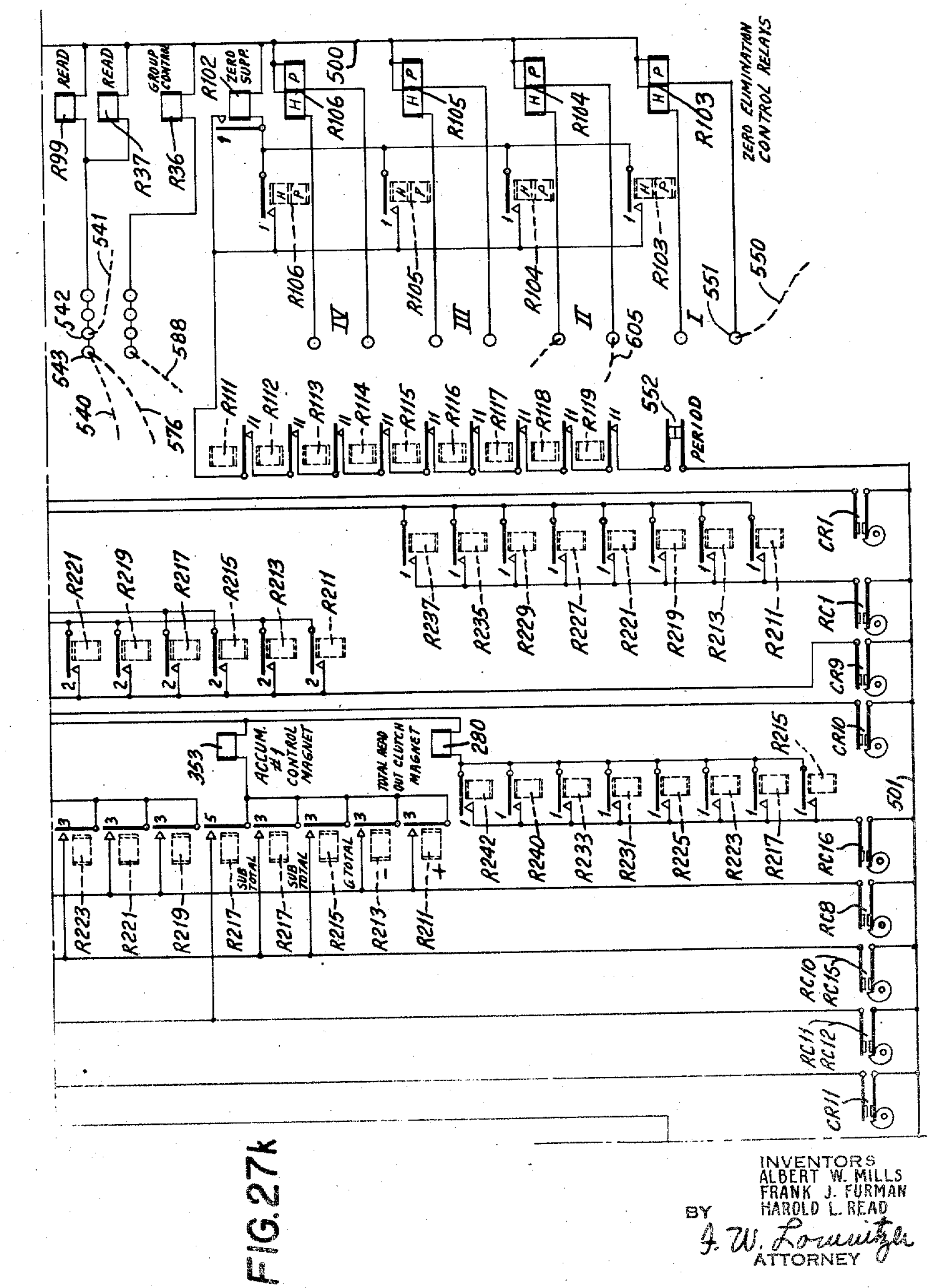

When this group control comparing circuit is to be rendered effective a plug connection is made from either the emitter EM, the readout strip of the typewriter, from an exit plug hub 535 (Fig. 27*i*) of a multi-operation relay, such plug connection 588 being shown in Fig. 27*k* to pick up the R36 relay. The latter closes the R36*a* relay contacts (Fig. 27*f*) so as to render the group control comparing circuits operative.

The set of sensing pins 125 (Fig. 27*c*) for analyzing the twelve index point positions of each column of the card at the first reading station picks up the corresponding control analysis relays R85—R96, the energizing circuit being from the line side 501, escapement contacts 505 (Fig. 27*b*), R25*b* relay contacts now closed, R9*b* relay contacts now closed, wire 545 to the common side of each of the sensing contacts 206, through each of said sensing contacts to the corresponding relay R85—R96 to line side 500. A hold circuit for the energized relay is provided by its "4" relay contacts, wire 589, 29*b* relay contacts (Fig. 27*b*), to line side 501. It will be recalled that the R29*b* relay contacts are also the contacts which maintain the holding circuit for the code analysis relay R108—R119.

Referring now to Fig. 27*f* it will be seen that when each of the code analysis relays R108—R119 is energized it transfers its "1" contacts. Whenever each of the group control relays R85—R96 is energized it will transfer its "1" relay contacts. The associated "1" contacts are arranged in a criss-cross wire connection so that when two relays which correspond to the same index points of corresponding columns of successive cards are concurrently energized associated "1" contacts are concurrently transferred. However, if one of such "1" relay contacts is transferred and the other associated "1" contacts are not transferred the criss-cross comparing circuit will be closed, indicating that corresponding columns do not agree, and complete the following circuit: From the line side 501, through R36*a* relay contacts now closed, R31*c* delay relay contacts, R7*a* relay contacts now closed, thence (for example) through R85—1 relay contacts now normal, R108—1 contacts now transferred, R60 relay coil, to line side 500. If R85—1 contacts were transferred and R108—1 contacts were not the circuit would still be closed to energize R60P relay coil. If both were concurrently transferred the R60 relay would not be energized. R60P relay coil closes the R60*a* relay contacts so as to complete a circuit from the line side 500, R60H relay coil, R60*a* relay contacts, plug socket 590, plug connection 591, R8*a* relay contacts, to line side 501. Contacts R8*a* remain closed until the card is ejected and therefore the group control relay R60 remains energized until this time. If it is desired to retain R60H energized until there is a typewriter carriage return, a plug connection 592 (Fig. 27*e*) is made to the plug socket 590 to thereby extend the holding circuit through the R55*d* relay contacts, to line side 501. By this plug connection 592 the group control relay R60 is held energized until a typewriter carriage return occurs.

The various functions which may follow as a result of a group control change depends upon the operation control relay which is selected by the plug connection 593 (Fig. 27*a*) made from a plug socket 594. The control circuit extends from the line side 501, through R60*b* relay contacts, plug socket 594, plug connection 593. From this plug socket a plug connection may be made to one of the plug sockets 530 (Fig. 27*i*) to pick up a multi-operation relay, or to a plug socket 538 to pick up a class selector relay. By suitable plug connections from such selected relays desired operations may be controlled and selected.

38. *Automatic stopping of the card reader upon a group control change*

To effect this operation a plug connection 595 (Fig. 27*f*) is made from the plug socket 594 to a plug socket 596 which picks up the R59P relay coil. The holding circuit is maintained from the line side 500, through R59H relay coil, R59*a* relay contacts, R58*a* relay contacts, to the line side 501. Referring now to Fig. 27*b*, it will be seen that energization of R59 relay opens R59*b* relay contacts to open the start relay 1 circuit from the line side 501, stop key contacts 503, through R63*a* relay contacts now transferred, through R59*b* relay contacts now open, R1*a* relay contacts to R1H relay coil to line side 500. The deenergization of the latter causes the card feed to stop.

To resume card feed operations after an automatic stopping of the card reader, the start key is operated to close contacts 502 (Fig. 27*b*) which complete an obvious circuit to pick up the R58 relay coil. Opening of R58*a* relay contacts (Fig. 27*f*) deenergizes the R59*b* relay coil. Upon depression of the start key, a circuit is completed from line side 501, start contacts 502, R15*a* relay contacts now transferred, R1P relay coil, to the line side 500. This is the start circuit for reinitiating card feeding operations of the machine.

39. *Circuits for setting up the racks 290 and total readout to represent a total and clearing the accumulator wheels (grand total)*

It is at times desirable to take and store a grand total from the accumulator, that is to say, transfer the digit representation from the selected accumulator to the total storage readout and then clear out the amount in the accumulator wheels. A total readout cycle may occur under two different conditions; one immediately following an adding or subtracting cycle, in which case an idle cycle of operation of the accumulator unit is interposed, as will be described, to complete the units carry operations. However, if the total readout cycle is deferred until all the carries are completed by a preceding idle cycle a total readout cycle may subsequently occur.

A grand total readout operation may be initiated by a multi-operation relay, class selector relay, the typewriter readout device, EM emitter, and at the desired column position where this total taking operation should be initiated, a plug connection 596 (Fig. 27*i*) completes a circuit through R216—3 relay contacts, R215P relay coil, line side 500, which relay R215P initiates total taking operations in connection with accumulator No. 1.

CR9 cam contacts (Fig. 27*k*) close at 300° to complete a circuit from the line side 501, through CR9 contacts, R215—2 relay contacts now closed, R46B interlock contacts now closed, to R48P relay coil to line side 500. R48H relay coil is held over until 10° of the next cycle by a circuit from the line side 501, through CR10 relay contacts, through R48a relay contacts now closed, R48H relay coil to line side 500.

The main clutch magnet 261 of the accumulator unit is energized at 325° of the preceding cycle by a circuit from the line side 501, through CR11 cam contacts, R48B relay contacts, clutch magnet 261 to line side 500. At 0° of the total taking cycle the main clutch will engage to effect a cycle of operation of the accumulator unit.

In order to transfer the values from the accumulator wheels to the related accumulator racks, magnet 353 is energized at the beginning of the cycle as described in "Grand Total Taking Operations" to move the accumulator wheels out of engagement with the carry sectors and into engagement with the accumulator racks 290 before the latter move upward. The circuit for this occurs at 2°–18° of the cycle by a circuit from the line side 501, through RC13—14 cam contacts, R215—3 relay contacts now closed, control magnet 353 for accumulator No. 1, to line side 500.

At 85° total readout clutch magnet 280 is energized so that the readout clutch engages to cause the total readout unit to move against the rack projections 475 and thereby set up the total readout to represent the total on the accumulator wheels taken therefrom by the accumulator racks. This circuit is from the line side 501, through RC16 cam contacts (Fig. 27k), R215—1 relay contacts now closed, clutch magnet 280, to the line side 500. It will be recalled that for grand total taking operations the accumulator wheels are moved out of engagement with the racks before the latter are restored downwardly, thus leaving the accumulator wheels at 0 position.

40. *Circuits for setting up the total readout to represent the total and retaining the amount in the accumulator wheels (subtotal)*

To take a subtotal from the selected accumulator, that is, to transfer the total amount on the selected accumulator wheels to the readout and reenter the amount in the accumulator wheels, as described in "Progressive or Subtotal Taking Operations," a plug connection 597 (Fig. 27i) is made instead of the plug connection 596 to complete a circuit through R218—3 relay contacts to the R217 progressive total control relay. The function of relay contacts 217—1 (Fig. 27k) is the same as that for R215—1, i. e. to energize the clutch magnet 280. The function of R217—2 contacts (Fig. 27k) is the same as that described for R215—2 relay contacts, i. e., to pick up R48 relay. Similarly, R217—3 relay contacts (Fig. 27k) pick up the accumulator control magnet 353, as do the previously described relay contacts 215—3. However, relay contacts R217—5 (Fig. 27k) again pick up the control magnet 353 by a circuit from the line side 501, through RC10—15 cam contacts which close at 174°, through relay contacts R217—5, magnet 353, to line side 500. This will, as previously described, retain the accumulator wheels in engagement with the racks 290 as they are returned downwardly to their normal position, thereby reentering the amount therein.

41. *Circuit for energizing total interlock relay R49*

At 2° of any total taking cycle a circuit is completed from line side 501, through RC13—14 cam contacts (Fig. 27k), R49P relay coil (Fig. 27j) to line side 500. The hold circuit for R49H is through the R49a relay contacts and CR2 cam contacts (Fig. 27h). This relay opens the R49b relay contacts (Fig. 27g) which are in the energizing circuit for the start delay relays and the function of these contacts is to open the circuit and thus delay cycling of the start delays during a total taking cycle until such time that they may be properly energized to perform their functions.

42. *Circuits for relays for terminating and preventing reoperation of total taking cycles, and initiating new operations*

Duo-wound relays R216 and R218 for both sub and grand total taking cycles are similar in operation and function to relays R212 for adding and R214 for subtracting cycles. It will be recalled, as previously described, that the R252 relay coil is picked up at the end of the total taking cycle so that, as before, in taking a grand total, it will pick up the R216P relay coil which closes the R216—1 contacts to pick up R216H relay coil. The latter closes the R216—2 contacts so as to complete a circuit from the line side 501, RC5 cam contacts, R216—2 relay contacts to plug socket 598. From plug socket 598 other operations may be initiated. The opening of R216—3 contacts deenergize the total taking relay R215.

In view of the above explanation it is thought unnecessary to describe the circuit connections for the R218 relay which is utilized for subtotal taking operations.

43. *Grand or subtotal delay circuits*

It will now be assumed that a total taking operation (either a grand total or subtotal) is called for directly after an adding or subtracting cycle. Of course, all of the transfers should be completed before the total is taken, or otherwise it would be incorrect. During this adding or subtracting cycle a circut is completed when RC1 contacts (Fig. 27k) close at 210° (Fig. 21) from the line side 501, through RC1 cam contacts (Fig. 27k), R211—1 relay contacts closed if there is an adding cycle being performed for accumulator No. 1, or contacts 213—1 if a subtracting cycle is being performed, through R46P (Fig. 27j) relay coil, to line side 500. R46H relay coil is held until 10° of the next cycle by a circuit from the line side 501, through CR1 cam contacts (Fig. 27k), R46a relay contacts now closed, R46H relay coil to line side 500. At 300° in this cycle there is an attempt to complete a circuit from line side 501, through CR9 cam contacts (Fig. 27k), R215—2 relay contacts now closed if a grand total taking operation is called for after an adding or subtracting cycle for accumulator No. 1, through R46B relay contacts, R48P relay coil to line side 500. However, the R46 relay coil previously opened the R46B (Fig. 27j) relay contacts and thus cam contacts CR9 are unable to transmit an impulse to the R48P relay coil. The latter cannot close R48B contacts (Fig. 27j) and thus energize the main clutch magnet 261 to initiate a grand total taking operation. Hence, no total taking operation will occur unless the machine is so conditioned that in the program of events the required intermediate cycle takes place to complete the transfers. After this idle cycle the series of events described for taking grand or subtotals takes place.

44. *Total readout and typing of totals*

At the end of a cycle wherein the amount represented on the accumulator wheels is transferred to the total readout there usually follows the reading out of the denominational orders of the total readout, column by column, beginning at the highest denominational order column and causing, according to each digit representation, the energization of the type bar solenoids 442 to type the digits of the total. To condition the machine to effect this total typing operation the multi-operation relay which is picked up at the completion of the total taking cycle picks up through a plug connection 600 (Fig. 27*f*) the total readout relays R47 and R100. Since typing of the total is also to be effected there is a plug connection 601 to simultaneously pick up the R38 type control relay. The present machine has eleven denominational orders for the readout (see Fig. 27*c*), the strips 531 representing the denominational order strips and the transversely arranged strips 532, the digit representing strips, as previously described. The digit representation in each column is effected, as previously described, by a contact between the denominational order strip 531 and the digit strip 532. Each of the strips 531 terminate at plug sockets 602 and from such pockets 602 there are plug connections 603 to the plug sockets 527 (Fig. 27*f*) of the readout strip of the typewriter where typing of the total is to be made. Thus, as the typewriter carriage moves step by step the digit representations of the total readout are successively read out, beginning at the highest denominational order (11) and terminating at the units order (1) (see Fig. 27*c*).

When a true balance is represented on the readout the contacts R98, 1-9, 10 are at normal and it will be seen, therefore, that the digit strips 532 each have a connection through the associated contacts of relay R98 to one of a series of digit lines 604. Since, for a total typing operation, R100 relay coil is now energized it is evident that such digit lines 604 have direct electrical connections through the contacts of R100 relay (Fig. 27*b*) to pick up the associated code analysis relays R110—R119. Assuming that the highest denominational order (11) represents the digit 8, a circuit for picking up the code analysis relay R118 is from line side 501, through R20*b* relay contacts now closed (Fig. 27*f*), through the typewriter readout strip, a plug socket 527, the plug connection 603 (Fig. 27*c*), plug socket 602 of the highest denominational order (11) of the readout, R97—1 relay contacts now in normal position, to the denominational strip 531 of the highest order. Its electrical contact with the 8 digit strip 532 made in the manner previously described then extends the circuit through R98—8 relay contacts now transferred, the connected digit line 604, R100—8 contacts now transferred, the R118 code analysis relay coil, to line side 500. The circuit for any other digit position is the same except that if the digit representation is 9 a circuit would extend through the "9" strip 532, through R97—2 contacts now in normal position, R98—9 contacts now in normal position, to the connected digit line 604, to code analysis relay R119. If a 0 is represented the 0 code analysis relay R110 is energized so as to cause the typing of 0.

Typing of a total is effected in the same manner as explained in section No. 11, Numeral Typing or Listing Circuits. Since total typing is called for the circuits to pick up the digit type bar solenoids is in this instance, closed through the R38*b* relay contacts (Fig. 27*f*). Thus, in accordance with the particular code analysis relays energized the digit type bar solenoids 442 will be energized to type the totals.

45. *Zero elimination for typing of totals*

There was previously described in Section No. 15 the circuit arrangemnt whereby typing of zeros at the left of the first significant digit is suppressed. The same operation may also be effected when totals are typed, the requirement being that before total typing operations are started the picked-up multi-operation relay has a plug connection 605 (Fig. 27*k*) to pick up the R104 relay or any one of the zero elimination control relays R103—R106 not previously used. Therefore, for the left-hand zeros of the total or balance no zeros are typed, and instead, the typewriter carriage will be merely spaced. When the first significant digit is typed the 0 suppression circuit is then rendered ineffective so that intermediate zeros may be typed.

46. *Typing of negative balances*

Whenever negative amounts entered in an accumulator exceed the additive amounts a negative total is represented on the total readout, it being well known that this condition is represented by a 9 digit in the highest order (11) of the readout. To test whether such order represents a 9 a test circuit is completed from line side 501, through RC9 cam contacts (Fig. 27*c*), R97 relay coil, line side 500. R97 is energized at 165° of the cycle. At 200° of the cycle R6 cam contacts close to complete a circuit from the line side 501, through RC6 cam contacts, R97—1 relay contacts now transferred, and if 9 is represented in the highest denominational order, the circuit extends through the 9 digit strip 532, then through R97—2 relay contacts now transferred, R98P relay coil to line side 500. A hold circuit for R98H is effected by R98—12 relay contacts and cam contacts RC7 to line side 501. At the end of the cycle the RC7 cam contacts come to rest in closed position (see Fig. 21), thereby retaining the R98H relay coil energized until the next cycle of operation of the RC cams. Understanding that R98 coil is now energized it will transfer its 1-9, 10 relay contacts, thereby establishing at 9's complementary relationship between the 0-9 digit strips 532 and the code analysis relays. Thus, if a 9 is represented in any order, instead of picking up the R119 code analysis relay the R110 code analysis relay will be picked up and 0 will be typed instead of 9. For a 5 digit representation on the readout, the code analysis relay R114 will be picked up to type 4. Thus, typing the 9's complement of the negative balance on the R0 readout will print the balance as a true balance amount.

It is pointed out that at 225° RC9 cam contacts open so as to deenergize R97 relay coil and the latter enables its R97—9 and R97—2 relay contacts to come back to normal positions. This enables the highest denominational order of the readout to be read out in the normal manner.

47. *Characterization of positive and negative balances*

It is desirable to designate, by typing distinctive symbols or characters, whether the total typed is a positive balance or a negative balance and to type this symbol after typing the last or unit digit of the balance. To this end the plug socket 527 (Fig. 27*f*) of the typewriter readout strip, which is next to the one related to the typing of the units digit, has a plug connection 606 therefrom to a plug socket 607, to complete a circuit through R47*b* relay contacts (Fig. 27*f*) and if the total is a positive balance indicated by the lack of energization of the R98 relay, a circuit extends from R98—11 relay contacts now in normal position, a wire 608 (Figs. 27*f*, 27*e*, 27*d*), thence to the asterisk printing solenoid to the line side 500. Energization of this solenoid will print an asterisk after the positive balance amount.

If the balance should be negative R88—(1) relay contacts transfer and the circuit extends by a wire 609 to the CR type bar solenoid 442 to print the symbol CR after the negative balance amount.

An interlock circuit is also provided which extends from the R47b relay contacts and a wire 610 to the R18 relay coil (Fig. 27f). This relay opens the R18b interlock contacts (Fig. 27f) to prevent interfering circuits to improperly energize other solenoids when * or CR symbols are being printed on total typing operations.

48. *Incidental circuits related to typing of totals*

In explaining the typing of totals it was assumed that there was a card in the second reading station and therefore the R15d card lever relay contacts (Fig. 27f) were in transferred position to complete the energizing circuit at this point to pick up the solenoids which type the total.

In the absence of a card at the second reading station card lever R15 relay coil (Fig. 27a) is deenergized and R15d relay contacts are at normal position. However, in total typing operations R47a relay contacts (Fig. 27f) are closed so that the circuit extends through R47a relay contacts, and R15d relay contacts in normal position, the rest of the energizing circuit being as previously described.

49. *Last card runout circuit*

When the last card feeds out from the supply magazine to the card pusher station the magazine contacts 242 (Fig. 27b) open and open the energizing circuit of the stop control relay R63. The R63a contacts transfer back to normal to open the holding circuit for the R1H relay coil. Deenergization of this relay causes card feed to be stopped with a card in the first reading station and one in the pusher station. Both of these cards must be completely fed through the second reading station but it is desirable to have the machine stopped under such conditions so that more cards may be added to the magazine to prevent the group control circuit from initiating operations as if there was a change in group numbers.

To restart the feed without adding cards to the magazine the start key is depressed to complete a circuit from the line side 501, through start key contacts 502, R15a contacts now transferred, R1P relay coil and R64P relay coil in shunt therewith. The R1 relay coil again starts the card feed. The hold circuit for R64H is back through R64a relay contacts, R15b relay contacts now closed, R63a relay contacts now in normal position, stop key contacts 503, back to line 501. A holding circuit for R1H relay coil is established, although R63a transfer contacts are at normal, this holding circuit extending through R64b relay contacts, to line side 501.

R60b relay contacts open the holding circuit for R64H if a change in group numbers occurs on the last reading cycle. Even though the start key is held depressed to pick up the R1PL relay coil and closing the R4d relay contacts, card feed will stop for a total taking cycle. R4d relay contacts prevent continuous feeding cycles after a runout unless the start key is held depressed.

The above circuits are merely provided to enable re-starting of the card feed upon exhaustion of cards and provide other proper operating conditions which would not occur if the above circuits were not provided.

While there have been shown and described and pointed out the fundamental novel features of the invention as applied to a preferred embodiment, it will be understood that various omissions and substitutions and changes in the form and details of the apparatus illustrated and in its operation may be made by those skilled in the art, without departing from the spirit of the invention. It is the intention, therefore, to be limited only as indicated by the scope of the following claims.

What is claimed is:

1. In a combined typewriter and computing machine, the combination of a set of digit types and individual operators for each type, means for successively feeding perforated records through a card reading station, analyzing means for analyzing digit representations on each record denominational column by denominational column, a denominational digit storage register, program means having column positions effective successively in consonance with the successive analysis of the record columns, means when rendered effective operable under control of said analyzing means for digitally setting up said register as the record columns are successively analyzed, other means when rendered effective operable under control of said analyzing means for selecting the individual operators to type the digits corresponding to the digits represented, said setting up means being additionally controlled by said program means to successively and denominationally set up said register as the successive columns are analyzed, and individual control means controlled by said program means for rendering said setting up means and said selecting means effective jointly or singly according to desired register setting-up operations and typing operations.

2. In a combined typewriter and computing machine, the combination of a set of digit types and individual operators for each type, analyzing means for analyzing a perforated record denominational column by denominational column, a denominational digit storage register, program means having column positions effective successively in consonance with the successive analysis of the card columns, means commonly under control of said analyzing means for digitally setting up said register according to the digits of the amount analyzed and for selecting the individual operators to type the digit corresponding to the digit set up, said setting-up means being additionally controlled by said program means to successively and denominationally set up said register as the successive columns are analyzed and the digits are typed, an accumulator, entering means therefor, readout means for reading out said register to control said entering means to enter an amount in said accumulator, means to initiate the operation of said readout means, and coordinating means for placing the operation of said initiating means under control of said program means to render said initiating means effective at a selected record column position.

3. In a combined typewriter and computing machine, the combination of a set of digit types and individual operators for each type, means for successively feeding perforated records through a card reading station, analyzing means for analyzing digit representations on each record denominational column by denominational column, a denominational digit storage register, program means having column positions effective successively in consonance with the successive analysis of the record columns, means when rendered effective operable under control of said analyzing means for digitally setting up said register as the record columns are successively analyzed, other means when rendered effective operable under control of said analyzing means for selecting the individual operators to type the digit corresponding to the digit represented, said setting-up means being additionally controlled by said program means to successively and denominationally set up said register as the succesive columns are analyzed, and individual control means controlled by said program means for rendering said setting-up means and said selecting means effective jointly or singly according to desired register setting-up operations and typing operations, an accumulator, entering means therefor, readout means for said register for controlling said entering means to enter in said accumulator the amount in said register, and other control means controlled by said program means for causing the operation of said readout means at a selected column position of said record after completion of the digit setting operation.

4. In a combined typewriter and computing machine, the combination of a set of digit types and individual operators for each type, means for successively feeding perforated records through a card reading station, analyzing means for reading each record denominational column by denominational column, a denominational digit storage register, program means having column positions effective successively in consonance with the successive analysis of the record columns, means under control of said analyzing means for digitally setting up said register as the record columns are successively analyzed and for selecting the individual operators to type the corresponding digits, said setting-up means for said register being additionally controlled by said program means to successively set up said register as the successive columns are analyzed, an accumulator, entering means therefor under control of said register, a plurality of operation control means, register readout means initiated in operation by one of said control means to control said entering means to enter the amount in said register into said accumulator, selective means for placing the effective operation of said one control means under control of said program means to render said register readout means effective at a selected column position after completion of the setting up of said digit register, and means controlled by said one control means upon completion of said entering operation to render another of said control means effective to initiate some other operation of the machine.

5. In a combined typewriter and computing machine, the combination of a set of digit types, and individual operators for each type, analyzing means for analyzing digit representations on each record denominational column by denominational column, a denominational digit storage register, program means having column positions effective successively in consonance with the successive analysis of the record columns, a plurality of means when rendered effective for setting up, as successive record columns are analyzed, said digit representations on the record, means when rendered effective operable under control of said plurality of means for selecting the individual operators to type digits corresponding to the digits represented, other means when rendered effective operable under control of said plurality of means and said program means for digitally setting up said register as the record columns are successively analyzed, and a plurality of individual control means selectively called into operation by said program means, one control means for rendering said plurality of means effective for setting up said digit representations, and two other individual control means each for rendering the associated setting-up means and selecting means effective according to desired register setting-up operations and typing operations jointly or singly.

6. In a combined typewriter and computing arrangement, the combination of digit type bars and individual operators therefor, a computing unit comprising an accumulator, accumulator actuating means for entering an amount in said accumulator, and a main operating means including a selectively operable clutch for operating said actuating means to effect an amount entry, a card reader unit comprising means for analyzing perforated records column by column, and means for feeding records successively through said analyzing means, an operation control emitter having column positions corresponding to said card columns and successively effective in consonance with the analysis of the record columns successively, a denominational storage register, a plurality of means, each of which is conditioned to represent each digit as said record columns are analyzed, a digit storage register, means under control of said digit representing means and said emitter for setting up said digit storage register denominational order by denominational order as said record columns are analyzed, means under control of said digit representing means to select said individual operators to type said digits as the corresponding digits are set up in said register, readout means for reading out all orders of said register concurrently to control said actuating means differentially to enter the amount in said accumulator, and means controlled by said emitter at a selected column position of said emitter which is effective after digit storage has been completed to cause an engagement of said clutch to effect the operation of said actuating means differentially to enter an amount in said accumulator.

7. In a combined record controlled typewriter and computing machine, the combination of means for analyzing a perforated record denominational column by denominational column, a typewriter including digit type bars and individual operators therefor, a denominational digit storage register, a plurality of accumulators, common actuating means therefor, means including separate accumulator engaging control instrumentalities for effecting, when rendered effective, engagement of said actuating means with an associated selected accumulator, program means having column positions successively effective as the record columns are analyzed, means under control of said analyzing means for effecting a digit storage in said register as each record column is analyzed and for selecting type bar operators to type the corresponding digit, said digit storage being additionally under control of said program means to effect, as the column positions are successively effective, digit storage in said register denominational order by denominational order, readout means for said register for controlling said actuating means to enter the amount in said register in a selected totalizer, and selective means for coordinating said program means and said accumulator engaging control instrumentalities for rendering a selected instrumentality effective at a column position of said program means which is effective after digit storage has been completed.

8. In a combined record controlled typewriter and computing machine, the combination of means for analyzing a perforated record denominational column by denominational column, a typewriter including digit type bars and individual operators therefor, a denominational digit storage register, a plurality of accumulators, actuating means therefor, means including separate accumulator control instrumentalities for each accumulator for effecting, when rendered effective, the actuation of an associated selected totalizer by said actuating means, program means having column positions successively effective as the record columns are analyzed, means under control of said analyzing means for effecting a digit storage in said register as each record column is analyzed and for selecting type bar operators to type the corresponding digit, said digit storage being additionally under control of said program means to effect, as the column positions are successively effective, digit storage in said register denominational order by denominational order, readout means for said register for controlling said actuating means to enter the amount in said register in a selected totalizer, selective means for coordinating said program means and said accumulator control instrumentalities for rendering a selected one effective at a column position of said program means which is effective after digit storage has been completed, and means under control of said program means to effect, at a selected column position of said program means, the operation of said readout means.

9. In a combined record controlled typewriter and computing machine, the combination of means for analyzing a perforated record denominational column by denominational column, a typewriter including digit type bars and individual operators therefor, a plurality of accumulators, actuating means therefor, means including separate accumulator selecting control instrumentalities for each accumulator for effecting, when rendered effective, the operation of a selected associated accumulator by said actuating means, program means having column positions successively effective as the record columns are analyzed, a digit storage register, means under control of said analyzing means for effecting a denominational digit storage in said register as each record column is analyzed and for selecting type bar operators to type the corresponding digit, said digit storage being under control of said program means to effect, as the column positions are successively effective, digit storage in said register denominational order by denominational order, readout means for said register rendered effective by said program means at a column position which is effective after digit storage has been completed, for controlling said actuating means to enter the amount in said register in a selected totalizer, selective means for coordinating said program means and said accumulator selecting control instrumentalities for rendering a selected one effective at a column position of said program means which is effective after digit storage has been completed, control means to initiate selected operations of the machine, and means associated with each of said accumulator selecting control instrumentalities operable at the completion of the entry in the associated accumulator to render said control means effective.

10. In a combined typewriter and computing arrangement, the combination of digit type bars and individual operators therefor, a computing unit comprising an accumulator, entering racks for entering an amount in said accumulator, and a main operating means including a selectively operable clutch for reciprocating said racks to effect an amount entry, a card reader unit comprising means for analyzing records which are perforated to represent digits by a decimal notation system column by column, means for feeding records with a column by column spacing through said analyzing means, an operation control readout emitter having column positions corresponding to said card columns and rendered effective in consonance with the analysis of the record columns, a digit storage register comprising denominational columns of storage relays, a group of code analysis relays, electrical means controlled by said analyzing means to energize said code analysis relays to represent the digits as said record columns are analyzed, means under control of said group of code analysis relays and said emitter for energizing the relays of said digit storage register according to a combination code, denominational column by denominational column, as said record columns are analyzed, other means under control of said group of code analysis relays to select said individual operators to type said digits as the digits are stored in said register, electrical translator readout means for concurrently reading out all of said register columns of relays and converting the combination code to differentially timed digit representing impulses of decimal system, means responsive to said impulses to determine the differential positioning of said entering racks, and means controlled by said emitter at a selected column position of said emitter after digit storage has been completed to cause an engagement of said clutch to effect reciprocation of said racks to said differential positions to actuate a selected totalizer.

11. In a combined typewriter and computing unit, the combination of a plurality of accumulators, common actuating means therefor, means for analyzing a plurality of amount representing fields of a perforated record and column by column for each field, digit storage means, a readout emitter operable in consonance with the analysis of said record columns, means under control of said analyzing means to effect digit storage in said digit storage means and under control of said readout emitter to enter the digits in denominational succession as the record columns of each field are analyzed, readout means for said register, operating means under control of said readout means to effect the operation of said common actuating means under control of said readout means to enter an amount from the register into a selected accumulator, a plurality of accumulator selecting instrumentalities, and selective means coordinating said accumulator selecting instrumentalities and said readout emitter to select an accumulator for an entry operation at predetermined column positions after analysis of each record field and digit storage has been completed, and means to effect, at said predetermined column positions, the operation of said readout means and said operating means to enter an amount in the selected totalizer.

12. In a combined typewriter and computing unit, the combination of a plurality of accumulators, common actuating means therefor, means for analyzing a pllurality of amount representing fields of a perforated record and column by column for each field, digit storage means, a readout emitter operable in consonance with the analysis of said record columns, means under control of said analyzing means to effect digit storage in said digit storage means and under control of said readout emitted to enter digits denominationally as the record columns of each field are analyzed, means under control of said register to effect the operation of said common actuating means to enter an amount from said register into a selected accumulator, a plurality of accumulator selecting instrumentalities, and selective means coordinating said accumulator selecting instrumentalities and said readout emitter to select an accumulator for an entry operation at predetermined column positions after analysis of each record field and digit storage has been completed.

13. In a computing machine, a total readout contact block comprising digit value contact members, denominational order contact members comprising flexible contact plates, each transversely arranged in front of the digit value contact members, but normally out of contact with each of them, and means for making selective contact for each denominational order comprising a series of individual movable digit representing members in front of the related flexible contact plate and each movable to press the associated contact plate against the digit value contact member corresponding in digit value to the moved digit representing member.

14. In an accounting machine, the combination of a series of denominationally ordered members differentially moved to represent the digits of a total, a series of digit value bars, a series of denominational flexible contact plates, each transversely arranged in front of said digit value bars and normally out of contact with all of them, a series of digit value latching contact plungers in front of the associated contact plate, each of which when in offset position moves said contact plate to make contact with a desired digit value bar, and means for causing the related member to move a contact plunger to an offset position to make contact between a denominational contact plate and a digit value bar corresponding to the digit representation of the member.

15. In a combined typewriter and computing machine, a plurality of accumulators, total taking means therefor, a typewriter including a platen carriage, digit type members individually movable to printing position to print digits of a total, a total digit storage readout, clearing-out means for said total digit storage and readout, means effective at predetermined column positions of said typewriter carriage to effect an operation of the clearing-out means and the operation of said total taking means to take totals from selected accumulators and under control of each accumulator to transfer the total thereon to the cleared-out total digit storage readout, and means effective at other predetermined column positions of said typewriter carriage and including elements under control of said total digit storage readout to actuate and select said type members according to the registration standing on said total digit storage readout.

16. In a combined typewriter and computing machine, a plurality of accumulators, a typewriter including a platen carriage, digit type members individually movable to printing position to print digits of a total, a total digit storage readout, total taking means for said accumulator, means effective at predetermined column positions of said typewriter carriage to select the accumulators for total taking operations and effect the operation of said total taking means under control of each selected accumulator to transfer the total thereon to said total digit storage readout, and means effective at other predetermined column positions of said typewriter carriage and including elements under control of said total digit storage readout to actuate and select said type members according to the registration standing on said total digit storage readout.

ALBERT W. MILLS.
FRANK J. FURMAN.
HAROLD L. READ.

No references cited.

Certificate of Correction

Patent No. 2,566,952 September 4, 1951

ALBERT W. MILLS ET AL.

It is hereby certified that error appears in the printed specification of the above numbered patent requiring correction as follows:

Column 53, line 13, for "succesive" read *successive*; column 57, line 4, for "pllurality" read *plurality*; line 11, for "emitted" read *emitter*;

and that the said Letters Patent should be read as corrected above, so that the same may conform to the record of the case in the Patent Office.

Signed and sealed this 13th day of November, A. D. 1951.

[SEAL]

THOMAS F. MURPHY,
*Assistant Commissioner of Patents.*